US011873419B2

(12) United States Patent
Jeon et al.

(10) Patent No.: US 11,873,419 B2
(45) Date of Patent: Jan. 16, 2024

(54) POLYURETHANE-SILICA COMPOSITE-BASED COATING COMPOSITION, POLYURETHANE-SILICA COMPOSITE FILM, AND METHOD OF PREPARING THE SAME

(71) Applicants: Hyundai Motor Company, Seoul (KR); Kia Corporation, Seoul (KR); UNIST (Ulsan National Institute of Science and Technology), Ulsan (KR)

(72) Inventors: Ho-Tak Jeon, Gyeonggi-do (KR); Choon-soo Lee, Seoul (KR); Minsoo Kim, Ulsan (KR); Hyunhyub Ko, Ulsan (KR)

(73) Assignees: Hyundai Motor Company, Seoul (KR); Kia Corporation, Seoul (KR); UNIST (Ulsan National Institute of Science and Technology), Ulsan (KR)

( * ) Notice: Subject to any disclaimer, the term of this patent is extended or adjusted under 35 U.S.C. 154(b) by 0 days.

(21) Appl. No.: 17/687,861

(22) Filed: Mar. 7, 2022

(65) Prior Publication Data

US 2022/0195212 A1 Jun. 23, 2022

Related U.S. Application Data

(62) Division of application No. 16/419,388, filed on May 22, 2019, now Pat. No. 11,299,640.

(30) Foreign Application Priority Data

Nov. 7, 2018 (KR) ........................ 10-2018-0136044

(51) Int. Cl.
*C09D 175/04* (2006.01)
*C08K 3/36* (2006.01)
(Continued)

(52) U.S. Cl.
CPC ................ *C09D 7/62* (2018.01); *B05D 1/00* (2013.01); *C08F 2/04* (2013.01); *C08F 4/04* (2013.01);
(Continued)

(58) Field of Classification Search
CPC .................................... C08K 3/36; C08K 9/04
See application file for complete search history.

(56) References Cited

U.S. PATENT DOCUMENTS

2012/0065309 A1 3/2012 Agrawal et al.
2014/0162022 A1 * 6/2014 Nowak .................. C09D 7/67
977/773

FOREIGN PATENT DOCUMENTS

CN 101838496 A 9/2010
CN 102504518 A 6/2012
(Continued)

OTHER PUBLICATIONS

Google-generated English-language translation of CN-106587075-A.*

(Continued)

*Primary Examiner* — Vu A Nguyen
(74) *Attorney, Agent, or Firm* — Fox Rothschild LLP

(57) ABSTRACT

Disclosed is a coating composition which includes: polyurethane; and amphiphilic nanoparticles having an amine functional group and a fluorine functional group in their structure. Further provided are a polyurethane-silica composite film including e coating composition and a method of preparing the same.

4 Claims, 82 Drawing Sheets

(51) Int. Cl.

| | |
|---|---|
| ***C08K 9/04*** | (2006.01) |
| ***C09D 7/62*** | (2018.01) |
| ***C09D 5/00*** | (2006.01) |
| ***C09C 1/30*** | (2006.01) |
| ***C09D 7/40*** | (2018.01) |
| ***C09D 5/16*** | (2006.01) |
| ***C08J 5/18*** | (2006.01) |
| ***C08F 12/08*** | (2006.01) |
| ***C08J 3/20*** | (2006.01) |
| ***B05D 1/00*** | (2006.01) |
| ***C08F 4/04*** | (2006.01) |
| ***C08F 2/04*** | (2006.01) |

(52) U.S. Cl.

CPC ................ *C08F 12/08* (2013.01); *C08J 3/20* (2013.01); *C08J 5/18* (2013.01); *C09C 1/3063* (2013.01); *C09C 1/3072* (2013.01); *C09C 1/3081* (2013.01); *C09D 5/00* (2013.01); *C09D 5/16* (2013.01); *C09D 5/1681* (2013.01); *C09D 5/1687* (2013.01); *C09D 7/67* (2018.01); *C09D 175/04* (2013.01); *C01P 2004/03* (2013.01); *C01P 2004/04* (2013.01); *C01P 2004/32* (2013.01); *C01P 2004/62* (2013.01); *C01P 2004/64* (2013.01); *C08K 3/36* (2013.01); *C08K 9/04* (2013.01); *C08K 2201/011* (2013.01)

(56) References Cited

FOREIGN PATENT DOCUMENTS

| | | | | | |
|---|---|---|---|---|---|
| CN | 102786061 | A | | 11/2012 | |
| CN | 104046217 | A | | 9/2014 | |
| CN | 104403453 | A | | 3/2015 | |
| CN | 105802465 | A | | 7/2016 | |
| CN | 106085173 | A | | 11/2016 | |
| CN | 106587075 | A | * | 4/2017 | ............ C01B 33/12 |
| CN | 106587075 | A | | 4/2017 | |
| CN | 106732221 | A | | 5/2017 | |
| CN | 107399740 | A | | 11/2017 | |
| CN | 109231218 | A | | 1/2019 | |
| CN | 109843260 | A | | 6/2019 | |
| DE | 102005005645 | A1 | | 8/2006 | |
| DE | 10 2009 040 868 | A1 | | 3/2011 | |
| EP | 3 066 164 | B1 | | 9/2016 | |
| JP | 9-183944 | A | | 7/1997 | |
| JP | 2009127057 | A | | 6/2009 | |
| JP | 2013142119 | A | | 7/2013 | |
| KR | 10-2005-0043160 | A | | 5/2005 | |
| KR | 100553314 | B1 | | 2/2006 | |
| WO | 2012/158610 | A1 | | 11/2012 | |

OTHER PUBLICATIONS

EPO-generated English-language translation of CN-106587075-A.*

German Patent Office Action for Application No. 102019115521.5, dated Sep. 14, 2022, with English translation, 14 pages.

Chinese Office Action issued in Chinese Patent Application No. 201910557421.7 dated Sep. 8, 2021, 11 pages of English Traslation and 10 pages of Chinese Office Action, 21 pages.

Tang Ye (Jun. 1, 2021) "Preparation of Particle Foam Stabilizer and Its Application in Waterborne Polyurethane Foam Coating", China Master's Theses Full-text Database (E-Journal), 1-86.

Tu et al., Nov. 18, 2016) "Pore Structure of Macroporous Polymers Using Polystyrene/Silica Composite Particles as Pickering Stabilizers", Langmuir, 32(48): 13159-13166.

Wang et al. May 31, 2018) "Preparation and Properties of Amphiphilic Silica Nanoparticles", Bulletin of the Chinese Ceramic Society, 37(5): 1727-1732.

Yang et al. (2018) "Fabrication of Nano-Sized Hybrid Janus Particles from Strawberry-Like Hierarchical Composites", Macromolecular Chemistry and Physics, 219(19): 1-6.

Zhao Yan (Jun. 15, 2008) "Generation of Polymer-Based Interface Materials with Special Wettabilities: Surface Chemistry and Topography", China Master's Theses Full-text Database (E-Journal) Engineering Technology I Series, 6:B020-2.

* cited by examiner

SILICA-PS PARTICLE AFTER
FIRST SURFACE TREATMENT

COMPOSITE 2

FILM CURING METHOD

SILICA PARTICLE
AFTER SURFACE
TREATMENT WITH
FLUORINE-AMINE
($F\text{-}NH_2$)

| SILICA NANOPARTICLE SIZE | TEMPERATURE | CURING METHOD | | |
|---|---|---|---|---|
| | | 1 | 2 | 3 |
| 20 nm | 80 ℃ | 100° | 100° | 100° |
| | 90 ℃ | 95° | 100° | 95° |
| 50 nm | 80 ℃ | 90° | 100° | 95° |
| | 90 ℃ | 90° | 90° | 90° |

SILICA PARTICLE AFTER SURFACE TREATMENT WITH FLUORINE-HYDROXY (F-OH)

| SILICA NANOPARTICLE SIZE | TEMPERATURE | CURING METHOD | | |
|---|---|---|---|---|
| | | 1 | 2 | 3 |
| 20 nm | 80 ℃ | 90° | 90° | 90° |
| | 90 ℃ | 85° | 90° | 90° |
| 50 nm | 80 ℃ | 85° | 90° | 90° |
| | 90 ℃ | 90° | 90° | 90° |

SILICA PARTICLE AFTER SURFACE TREATMENT WITH FLUORINE-AMINE
(F-$NH_2$)

POLYURETHANE-SILICA COMPOSITE-BASED COATING COMPOSITION, POLYURETHANE-SILICA COMPOSITE FILM, AND METHOD OF PREPARING THE SAME

CROSS-REFERENCE(S) TO RELATED APPLICATIONS

This application is a Divisional Application of U.S. application Ser. No. 16/419,388, filed May 22, 2029, which claims priority to Korean Patent Application No. 10-2018-0136044, filed on Nov. 7, 2018 which is incorporated herein by reference in its entirety.

FIELD OF THE INVENTION

The present invention relates to a polyurethane-silica composite-based heat-curable coating composition (the "coating composition"), a polyurethane-silica composite film and a method for preparing a polyurethane-silica composite film having improved anti-fingerprint properties. The present invention includes, for example, the polyurethane-silica composite-based heat-curable coating composition and the polyurethane-silica composite film having improved anti-fingerprint properties, which may be obtained by including the amphiphilic silica nanoparticles in a polyurethane base.

BACKGROUND OF THE INVENTION

Fingerprint contamination can cause user inconvenience by reducing the visibility of displays and touch screens. With the development of the automotive technology, not only automotive instrument panels and central information displays, but also operating panels such as navigation panels, radio panels, air conditioner panels and the like, have been replaced by displays and touch screens, and hence there has been an increasing need to provide anti-fingerprint and anti-contamination properties to various high-gloss treated surfaces. Therefore, areas that are likely to be contaminated with fingerprints have been expanded, and the necessity of anti-fingerprint surface treatment technology for automobiles has increased.

Components that leave fingerprints include sweat, sebum, dust and the like. Currently, to prevent fingerprints on the surface of displays or the like, methods of improving contact angle properties against contaminants by applying inorganic nanoparticles or fluorine coatings has been mainly used.

However, in the related art, continuous performance evaluation on the effectiveness of anti-fingerprint surface treatment has not been performed, and commercialization may not be realized due to complexity of surface treatment processes.

In the related art, studies on the application of acrylic resins, fluorine-based resins or surface structures for anti-fingerprint treatment of steel sheet or display surfaces have been conducted. For example, a method of improving anti-fingerprint properties by applying a fluorine-based polymer to a surface has been proposed, but this method may be disadvantageous, because the polymer is applied only to the surface, the polymer as an anti-contamination agent easily disappears and the anti-contamination durability is reduced. Furthermore, methods of forming an uneven surface structure using a mixture of a UV curing resin and inorganic oxide nanoparticles or preparing an anti-fingerprint film having a porous surface structure by forming/removing metal fine particles have been proposed. Likewise, the methods in the related art may have many limitations on effective productivity due to the complexity of the process of controlling the surface structure.

In addition, patents related to anti-finger treatment of a specific substrate using an acrylic resin or a surface structure have been reported. For example, a method for electroplating surface treatment of a substrate surface with zinc, chromium or the like, or on materials with improved anti-fingerprint properties, including a fluorine-containing resin and a photopolymerizable resin has been proposed. However, studies on anti-fingerprint surfaces with an uneven surface structure are still insufficient.

SUMMARY OF THE INVENTION

In preferred aspects, provided are methods including simplified processes. For instance, phase separation occurring in a polyurethane film may be prevented by using amphiphilic silica nanoparticles such that anti-fingerprint properties may be imparted and improved, and an uneven structure on the film surface may be provided.

The term "amphiphilic" or "amphiphilicity" as used herein refers to a property of material that possesses both hydrophobicity and hydrophilicity. For instance, the amphiphilic silica nanoparticles may include, or be modified to include, both the hydrophobic and hydrophilic groups on surfaces thereof or in the particles. Exemplary hydrophobic groups include, for example, saturate or unsaturated hydrocarbons such as alkyl, alkenyl or aryl groups. Exemplary hydrophilic groups include, for example, hydroxyl, amine, carboxyl, thiol, sulfonyl, carbonyl, acetyl, or phosphate groups.

The term "nanoparticle" or "nanoparticles" as used herein refers to a particle or particular material having a size of about 1 nm to 999 nm, about 1 nm to 900 nm, about 1 nm to 800 nm, about 1 nm to 700 nm, about 1 nm to 600 nm, about 1 nm to 500 nm, about 1 nm to 400 nm, about 1 nm to 300 nm, about 1 nm to 200 nm, or about 1 nm to 100 nm. The size may be measured at a diameter, which may be the longest length along the two distal points of the particles.

In an aspect, provided is a polyurethane-silica composite-based heat-curable coating composition, or a coating composition having improved anti-fingerprint properties.

The term "cure" or "curing" as used herein refers to a process of hardening or solidifying a polymeric resin, for example, from a mixture of one or more monomers and a curing agent (e.g., initiator). The curing may be performed by applying heat and/or UV light or by using chemical compounds. In certain embodiments, the coating composition may be cured by applying heat or raising a temperature.

The coating composition may include polyurethane with partially fluorinated surface-treated silica nanoparticles for ensuring anti-fingerprint properties. The coating composition may be used and coated on automotive interior display and interior surfaces to provide anti-fingerprint properties. In another aspect, provided is a polyurethane-silica composite film having improved anti-fingerprint properties, which has an uneven surface structure obtained by using surface-treated amphiphilic silica nanoparticles. In particular, the phase separation of a polyurethane-silica nanoparticle composite, which occurs during heat curing of the coating composition, may be controlled. In further aspect, provided is a method for preparing the composite film.

In an aspect, provided is a coating composition. The coating composition may be polyurethane-silica composite-based and heat-curable such that anti-fingerprint properties thereof may be improved. The coating composition may include: polyurethane; and amphiphilic silica nanoparticles having an amine functional group and a fluorine functional group.

The coating composition may include the amphiphilic silica nanoparticles in an amount of about 0.3 wt % to about 10.7 wt % based on the total weight of the coating composition.

The coating composition may further include a curing agent.

Preferably, the curing agent may suitably include one or more selected from among toluene diisocyanate, 4,4-diphenylmethane diisocyanate, hexamethylene diisocyanate, isophorone diisocyanate, dicyclohexyl methane diisocyanate, and polyfunctional isocyanates derived from these diisocyanates.

The curing agent may be suitably included in an amount of about 1 wt % to about 30 wt % based on the total weight of the coating composition. When the content of the curing agent in the coating composition is less than about 1 wt %, curing of the coating composition may not occur and the physical properties mechanical properties) of the coating layer may not be obtained. When the content of the curing agent is greater than about 30 wt %, the pot life may be shortened due to the excessively large amount of the curing agent, causing problems in operation. For this reason, it is preferable to satisfy the above-specified range, but the scope of the present invention is not limited to this range.

In addition, the coating composition having improved anti-fingerprint properties may further include one or more additives selected from the group consisting of curing accelerators, surface conditioners, UV absorbers, adhesion promoters, and defoamers.

In an aspect, provided is a polyurethane-silica composite film having improved anti-fingerprint properties. The polyurethane-silica composite film may include: a polyurethane film; and a silica layer formed on the polyurethane film. The silica layer may include amphiphilic silica nanoparticles that have an amine functional group and a fluorine functional group.

The polyurethane-silica composite film may suitably include the amphiphilic silica nanoparticles in an amount of about 0.3 wt % to about 10.7 wt % based on the total weight of the polyurethane-silica composite film.

Further provided, in another aspect, is a method for preparing a polyurethane-silica composite film having improved anti-fingerprint properties. The method may include the steps of: (a) preparing polystyrene particles; (b) preparing silica-polystyrene particles by admixing the polystyrene particles with silica nanoparticles; (c) preparing amphiphilic silica nanoparticles by subjecting the silica-polystyrene particles to a first surface treatment, removing the polystyrene particles, and then subjecting the remaining silica nanoparticles to a second surface treatment, (d) preparing a coating composition by admixing the amphiphilic silica nanoparticles with polyurethane; and (e) applying the coating composition to the surface of a substrate to form a coating layer, and curing the coating layer, thereby forming the polyurethane-silica composite film.

In the step (a), the method may further include the steps of: preparing a styrene fluid admixture by placing a styrene monomer and a solvent in a reactor and stirring under a nitrogen atmosphere for a predetermined time; and heating the styrene fluid admixture to a predetermined temperature, and adding an initiator to the reactor and reacting the styrene fluid admixture with the initiator.

Preferably, the solvent may suitably include one or more selected from the group consisting of water, ethanol, methanol, ethyl acetate, chloroform, and hexane. For instance, the solvent may include water or ethanol.

The styrene fluid admixture may further include a surfactant or a stabilizer. Preferably, the styrene fluid admixture may be prepared by stirring.

The styrene fluid admixture may be heated to a temperature of about 60° C. to about 70° C.

The initiator may suitably include 2,2'-azobis(2-methylpropionamidine)dihydrochloride. Preferably, the initiator may be 2,2'-azobis(2-methylpropionamidine)dihydrochloride.

The method may further include, in the step (b), preparing the silica-polystyrene particles by admixing and stirring a polystyrene solution including the polystyrene particles and a first silica solution including silica nanoparticles, at a volume ratio of about 1:1 for a predetermined time.

The method may further include, in the step (b), adding sodium chloride in a concentration of about 0.1 mM to about 10.0 mM to the admixture of the polystyrene solution and the first silica solution. The method in the step (b) may include the stirring the admixture and the sodium chloride.

The method may further include, in the step (c), may include the steps of: subjecting the silica-polystyrene particles to a first surface treatment by adding the silica-polystyrene particles either to i) a first compound having a carboxyl group and an amine group, or ii) a second compound having a carboxyl group and a fluorine functional group and stirring the same; adding the silica-polystyrene particles, after the first surface treatment, to tetrahydrofuran, and removing the polystyrene particles; and subjecting the silica particles, which remain after removal of the polystyrene particles after the first surface treatment, to second surface treatment by adding the silica particles to a compound, and stirring the silica particles and the compound. The compound may include the first compound or the second compound, which is not used in the first surface treatment.

The first compound may suitably include N-(tert-butoxycarbonyl)-β-alanine. The first compound may be N-(tert-butoxycarbonyl)-β-alanine.

The second compound may suitably include perfluorooctanoic acid. The second compound may be perfluorooctanoic acid.

The method may further include, in the step (d): preparing a second silica solution by dispersing the amphiphilic silica nanoparticles in tetrahydrofuran; preparing a polyurethane solution including polyurethane and a curing agent; and preparing the coating composition by admixing the polyurethane solution with the second silica solution.

Preferably, the coating composition may suitably include the silica nanoparticles in an amount of about 0.3 wt iii to about 10.7 wt % based on the total weight of the composition.

In the step (e), the curing the coating layer may be cured at a temperature of about 60° C. to about 90° C.

Further provided is a vehicle that may include the coating composition or the polyurethane-silica composite film as described herein.

Other aspects of the invention are disclosed infra.

DETAILED DESCRIPTION

Figure 1:
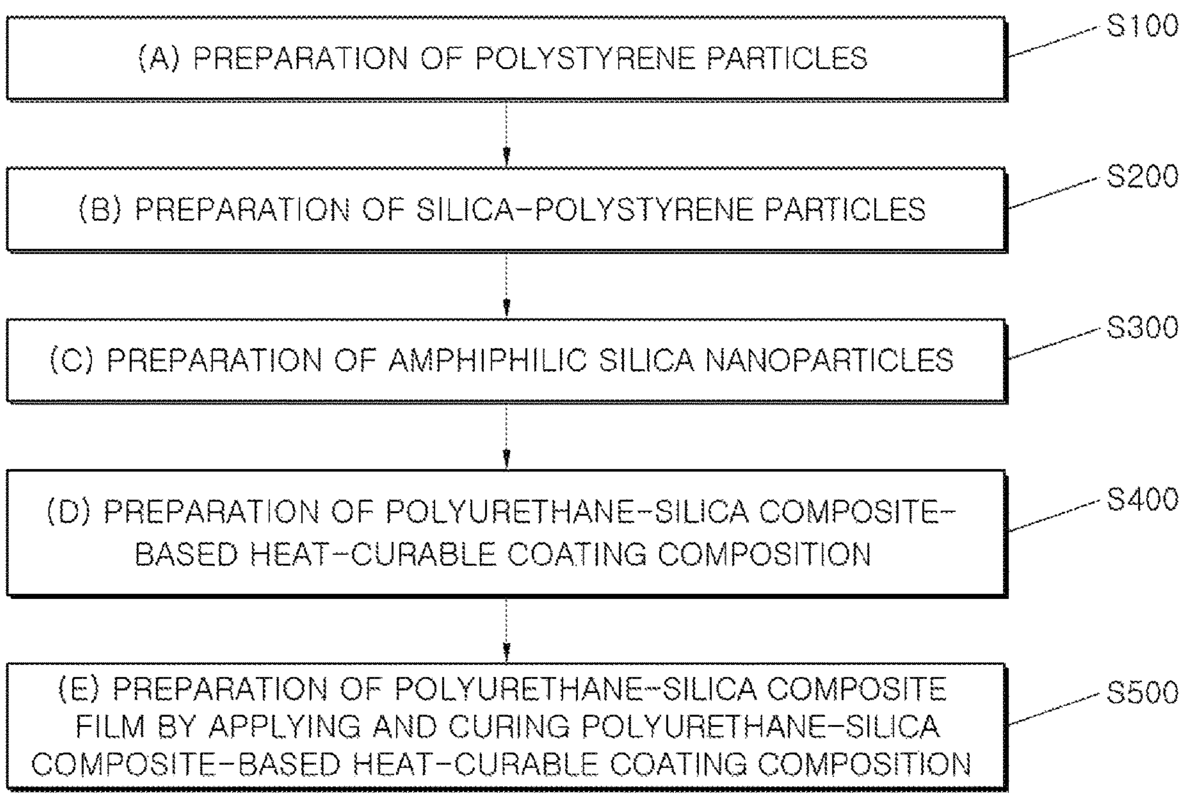
FIG. 1 shows an exemplary method for preparing a polyurethane-silica composite film according to an exemplary embodiment of the present invention.

The terminology used herein is for the purpose of describing particular embodiments only and is not intended to be limiting. As used herein, the singular forms “a,” “an” and “the” are intended to include the plural forms as well, unless the context clearly indicates otherwise. It will be further understood that the terms “comprise”, “include”, “have”, etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term “about” is understood as within a range of normal tolerance in the art, for example within 2 standard deviations of the mean. “About” can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term “about.”

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the present invention will be described in detail with reference to the accompanying drawings. Those skilled in the technical field to which the present invention pertains will appreciate that these embodiments are merely exemplary and the present invention may be embodied in a variety of different forms. Thus, the scope of the present invention is not limited to the embodiments disclosed herein.

The method for preparing the polyurethane-silica composite film may generally include the steps of: preparing amphiphilic silica nanoparticles; preparing a polyurethane-silica composite-based heat-curable coating composition (the "coating composition") by admixing the prepared amphiphilic silica nanoparticles with polyurethane at a predetermined ratio; and applying the prepared polyurethane-silica composite-based heat-curable coating composition, and then curing the composition, thereby forming the polyurethane-silica composite film.

FIG. 1 is a flow chart schematically showing an exemplary method of preparing a polyurethane-silica composite film according to an exemplary embodiment of the present invention. As shown in FIG. 1, the method includes the steps of: (a) preparing polystyrene particles (S100); (b) preparing silica-polystyrene particles (S200); (c) preparing amphiphilic silica nanoparticles (S300); (d) preparing a polyurethane-silica composite-based heat-curable coating composition (S400); and (e) applying the polyurethane-silica composite-based heat-curable coating composition, and then curing the applied composition, thereby forming the polyurethane-silica composite film (S500).

Preferably, in step (a) of preparing polystyrene particles (S100), polystyrene particles may be prepared by emulsion polymerization or dispersion polymerization. For instance, a styrene monomer and a solvent in a reactor may be placed in a reactor and stirred under a nitrogen atmosphere for a predetermined time, thereby preparing a styrene fluid admixture. Then, the prepared styrene fluid admixture may be heated to a predetermined temperature, and then an initiator may be added thereto and reacted therewith, thereby preparing positively charged polystyrene particles.

The process of preparing the polystyrene particles by emulsion polymerization may include the steps of: placing a styrene monomer and water in a reactor, followed by stirring under a nitrogen atmosphere for a predetermined time; thereby preparing a styrene fluid admixture; and heating the prepared styrene fluid admixture to a predetermined temperature; and then adding and reacting an initiator with the heated styrene fluid admixture, thereby preparing polystyrene particles.

The method may include preparing the polystyrene particles by dispersion polymerization and may further include the steps of: placing a styrene monomer, ethanol and a stabilizer in a reactor, followed by stirring under a nitrogen atmosphere for a predetermined time, thereby preparing a styrene fluid admixture; and heating the prepared styrene fluid admixture to a predetermined temperature, and then adding an initiator in the reactor and reacting the heated styrene fluid admixture with the initiator, thereby preparing polystyrene particles.

According to various exemplary embodiments of the invention, polystyrene particles may be prepared as demonstrated below.

Example 1

In an exemplary embodiments, polystyrene particles may be prepared by emulsion polymerization. For instance, 20 mL of a styrene monomer and 200 mL, of distilled water are placed in a 500-mL reactor, and then uniformly stirred at a speed of about 290 rpm under a nitrogen atmosphere. After stirring about 30 minutes, the reaction solution is heated to a reaction temperature of 70° C., and 0.2 g of 2,2'-azobis(2-methylpropionamidine)dihydrochloride (AIBA) as an initiator is added to the reactor and allowed to react for 12 hours or greater. After completion of the reaction, the remaining unreacted material is removed by centrifugation at about 3000 to 4000 rpm for about 1 hours, thereby preparing polystyrene particles having a final particle size of about 490 nm.

Example 2

In another exemplary embodiments, polystyrene particles may be prepared as the same manner as Example 1, except that the stirring speed of the styrene monomer and distilled water is changed to about 600 rpm, thereby preparing styrene particles having a final particle size of 200 nm.

Example 3

In another exemplary embodiments, polystyrene particles may be prepared as the same manner as Example 1, except that the reaction temperature is changed to 60° C., thereby preparing polystyrene particles having a final particle size of 580 nm.

Example 4

In an exemplary embodiments, 24 mL of a styrene monomer, 100 mL of distilled water and 0.12 g of hexadecyltrimethylammonium bromide (CTAB) as a surfactant are placed in a 250-mL reactor, and then uniformly stirred at a speed of 600 rpm under a nitrogen atmosphere. After stirring for about 30 minutes, the reaction solution is heated to a reaction temperature of 70° C., and 0.2 g of 2,2'-azobis(2-methylpropionamidine)dihydrochloride (AIBA) as an initiator is added to the reactor and allowed to react for 12 hours or more. After completion of the reaction, the remaining unreacted material is removed by centrifugation at 3000 to 4000 rpm for about 1 hour, thereby preparing polystyrene particles having a final particle size of 90 nm.

Example 5

In an exemplary embodiments, 20 mL of a styrene monomer, 200 mL of ethanol and 2.0 g of polyvinylpyrrolidone (PVP; molecular weight: 10000 g/mol) as a stabilizer are added to a 500-mL reactor, and then uniformly stirred at a speed of 160 rpm under a nitrogen atmosphere. After stirring for about 30 minutes, the reaction solution is heated to a reaction temperature of 70° C., and 0.2 g of 2,2'-azobis(2-methylpropionamidine)dihydrochloride (AIBA) as an initiator is added to the reactor and allowed to react for 12 hours or more. After completion of the reaction, the remaining unreacted material is removed by centrifugation at 2000 rpm for about 1 hour, thereby preparing polystyrene particles having a final particle size of 1300 nm.

Figure 2A:
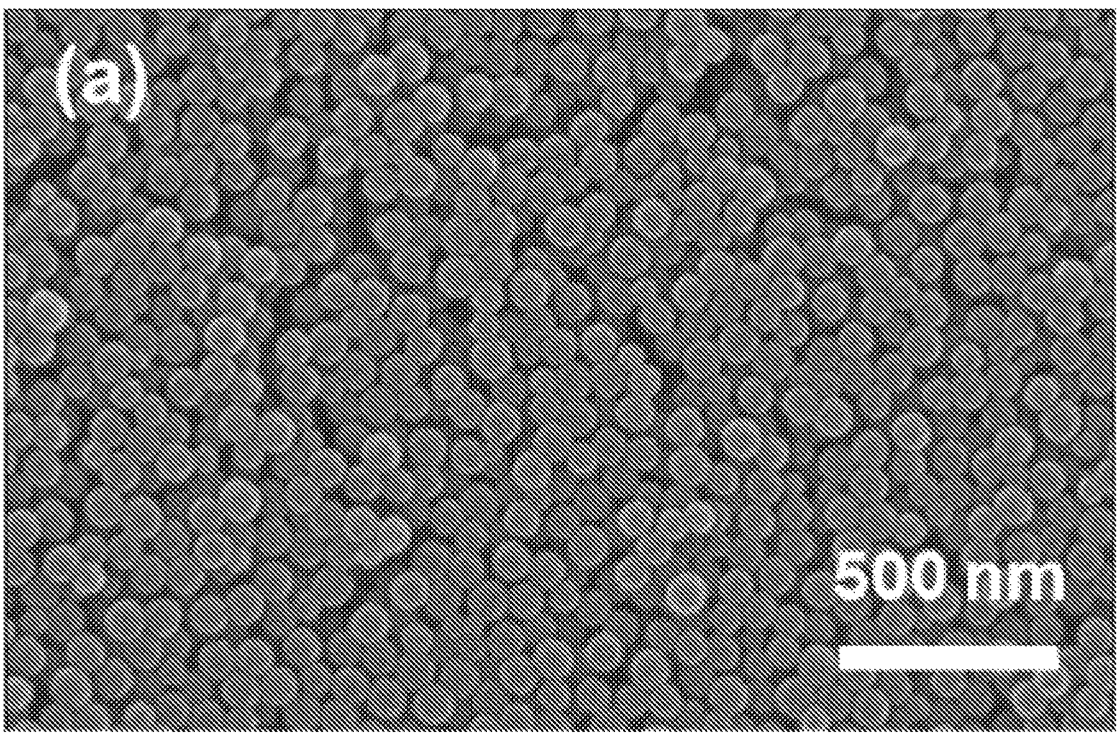
FIGS. 2A-2D show scanning electron microscope (SEM) photographs of exemplary polystyrene particles prepared according to an exemplary embodiment of the present invention.
Figure 2B:
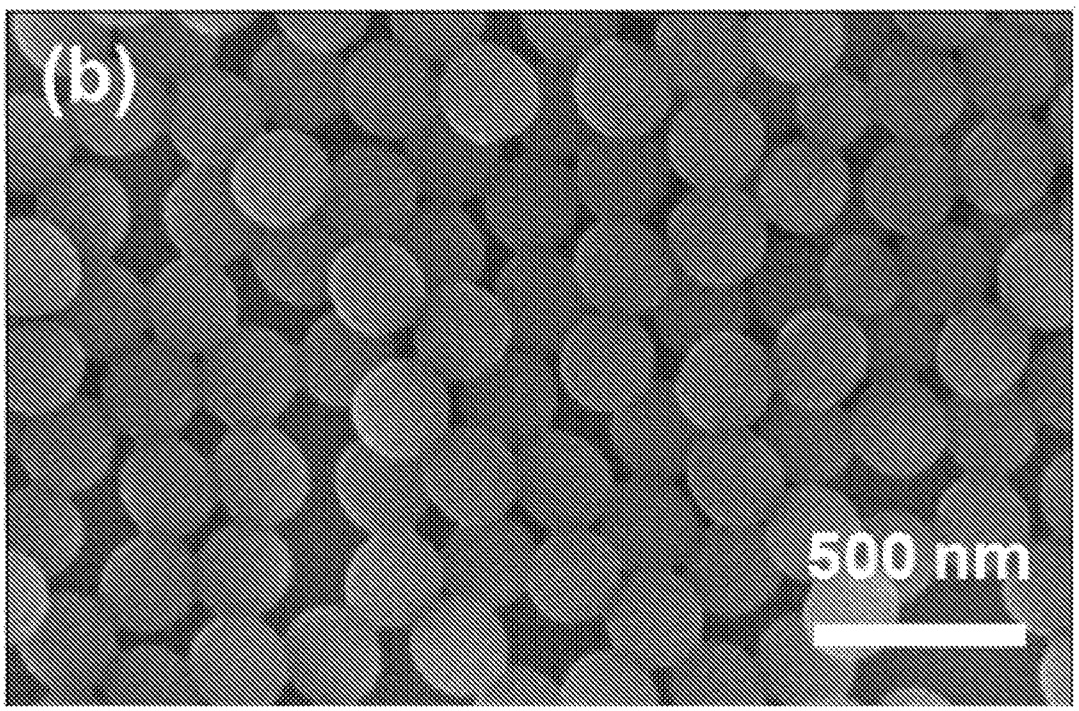
Figure 2C:
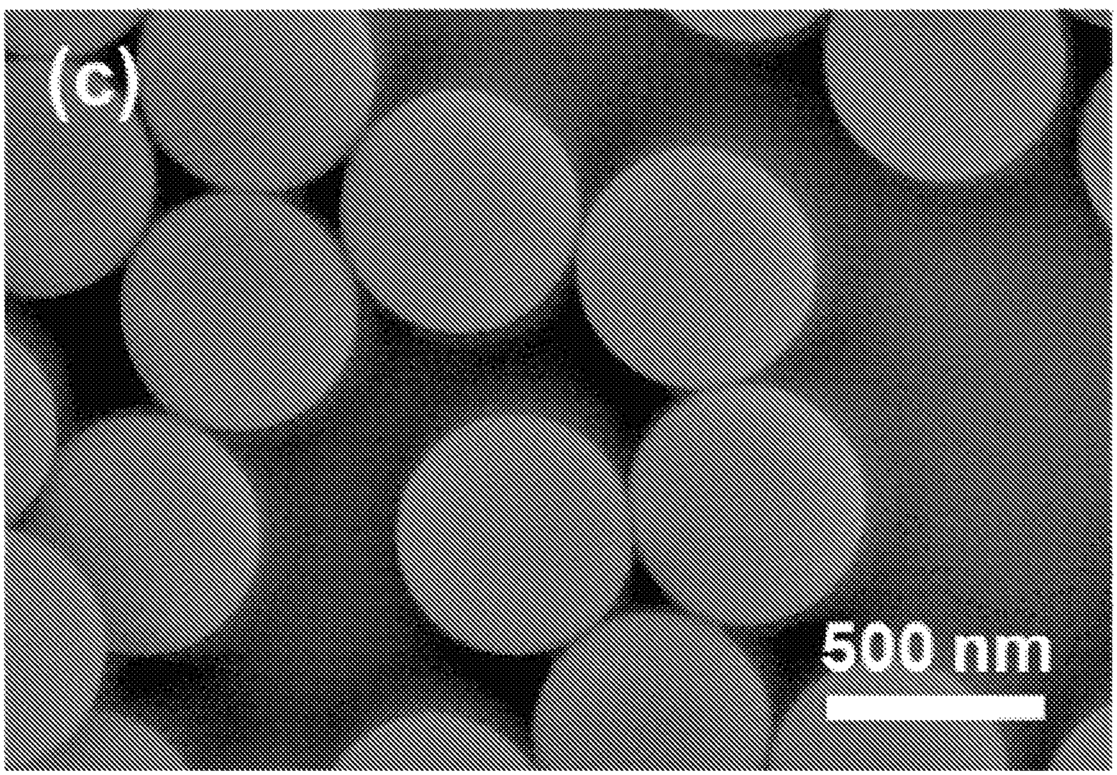
Figure 2D:
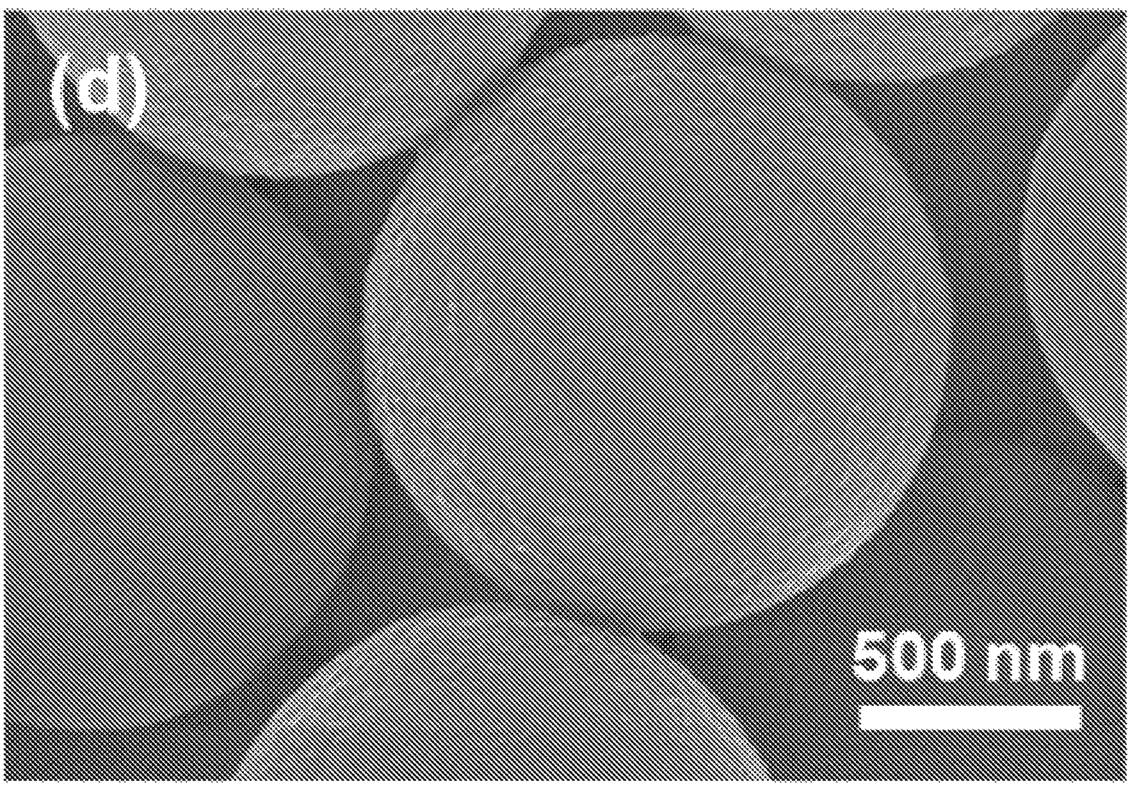

FIGS. 2A-2D show scanning electron microscope (SEM) photographs of the exemplary, polystyrene particles prepared according to the Examples of the present invention. As shown in FIG. 2A, the particle size of the polystyrene particles prepared using the surfactant CTAB according to Example 4 was about 90 nm, and as shown in FIG. 2B, the particle size of the polystyrene particles prepared according to Example 2 was about 200 nm. As shown in FIG. 2C, the particle size of the polystyrene particles prepared according to Example 3 was about 580 nm, and as shown in FIG. 2D, the particle size of the polystyrene particles prepared according to Example 5 was about 1300 nm.

In addition, the surface charge of each kind of polystyrene particles shown in FIGS. 2A-2D were measured by zeta potential measurement (Zetasizer, Malvern Instruments), and the results of the measurement are shown in Table 1 below. As shown in Table 1, the polystyrene particles prepared in the Examples of the present invention were all measured as having positive surface charges.

TABLE 1

| Kind of polystyrene particles | Particle diameter (nm) | Surface charge value (mV) |
|---|---|---|
| Example 4 | 90 | +38.5 |
| Example 2 | 200 | +43.4 |
| Example 3 | 580 | +51.4 |
| Example 5 | 1300 | +45.0 |

Thereafter, in step (b) of preparing silica-polystyrene particles (S200), the positively charged polystyrene particles, prepared in step (a) (S100), and negatively charged silica nanoparticles, may be bound to each other by electrostatic attraction, thereby preparing silica-polystyrene particles.

The silica nanoparticles used in the Examples of the present invention were YGS-30, YGS-40, YGS-4040 and YGS-4080, purchased from Young Chemical Industry Co., Ltd.

Figure 3A:
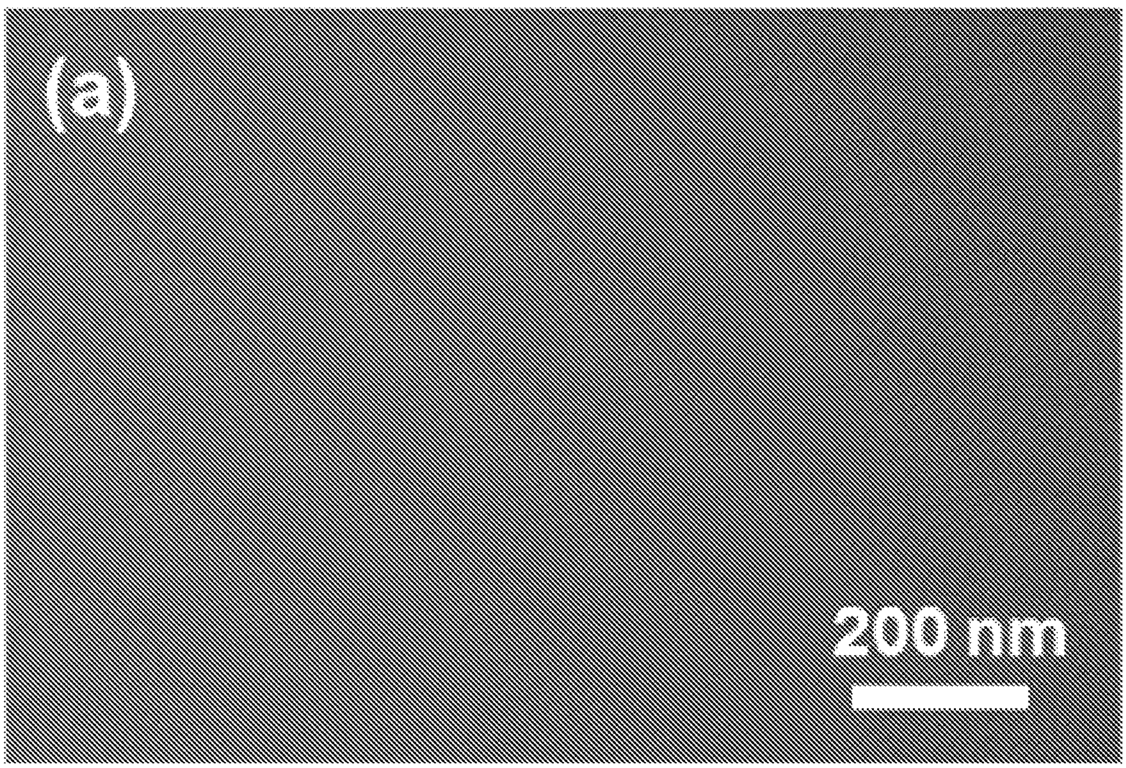
FIGS. 3A-3D show scanning electron microscope (SEM) photographs of exemplary silica nanoparticles used according to an exemplary embodiment.
Figure 3B:
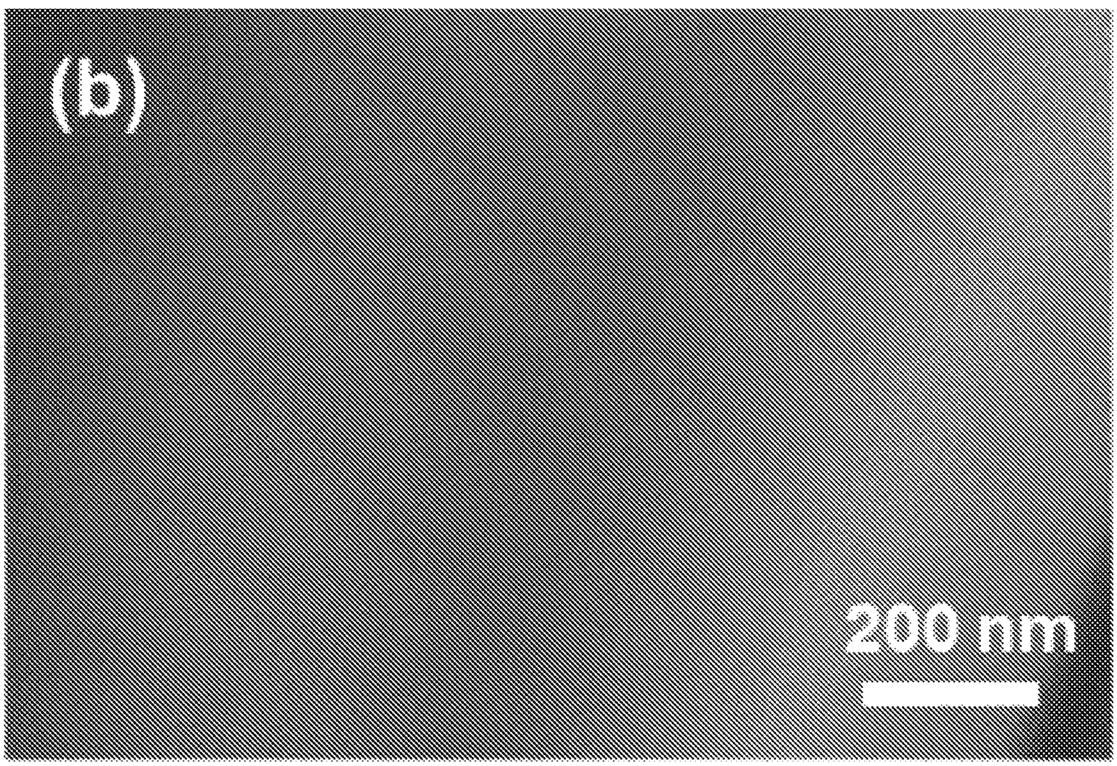
Figure 3C:
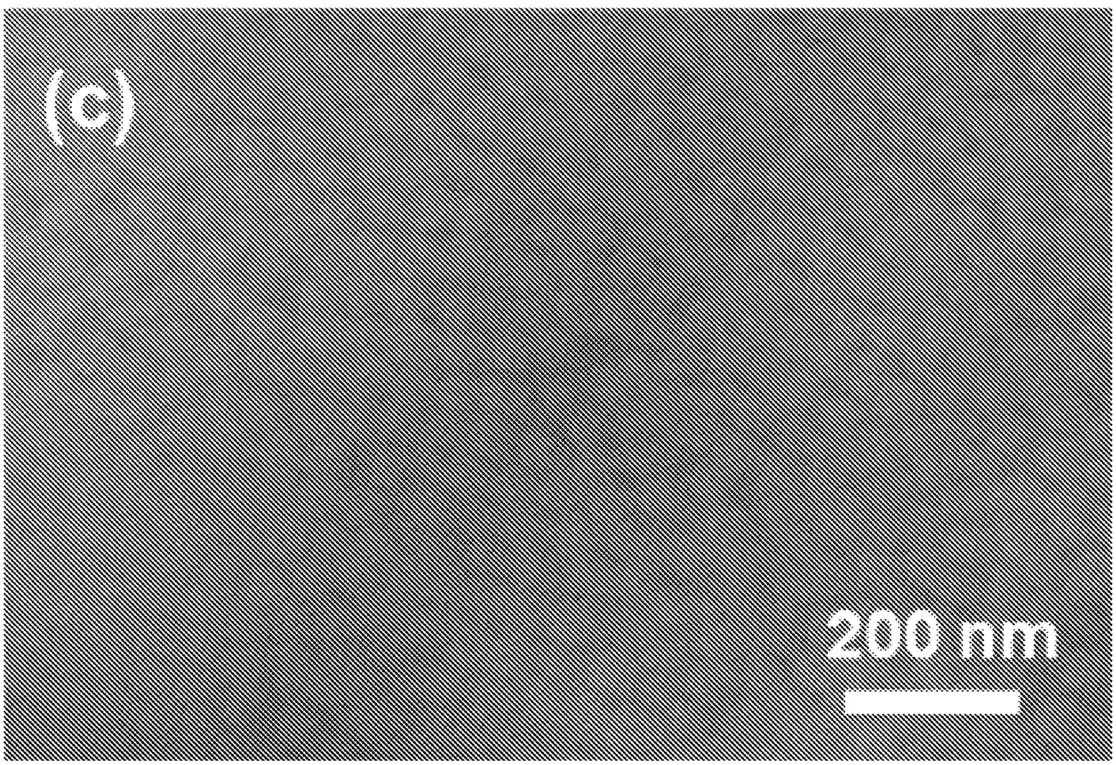
Figure 3D:
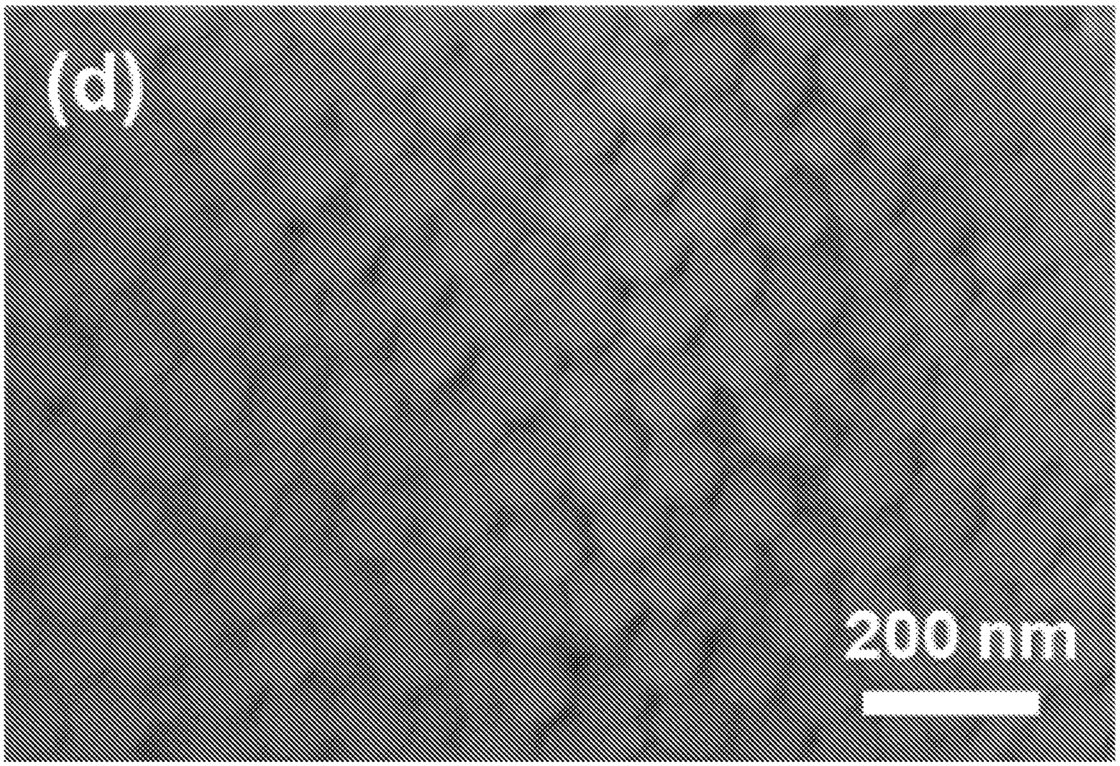

FIGS. 3A-3D show scanning electron microscope (SEM) photographs of the silica nanoparticles used in the Examples of the present invention. Particularly, FIG. 3A is an SEM photograph of YGS-30; FIG. 3B is an SEM photograph of YGS-40; FIG. 3C is an SEM photograph of YGS-4040; and FIG. 3D is an SEM photograph of YGS-4080.

In addition, the size of each type of silica nanoparticles was measured by dynamic light scattering (DLS), and the surface charges of the silica nanoparticles were measured by zeta potential measurement (Zetasizer, Malvern Instruments). The results of the measurement are shown in Table 2 below.

TABLE 2

| Type of silica nanoparticles | Particle diameter (nm) | Surface charge value (mV) |
|---|---|---|
| YGS-30 | 20.62 | −44.8 |
| YGS-40 | 20.26 | −44.3 |
| YGS-4040 | 56.77 | −46.3 |
| YGS-4080 | 93.61 | −48.9 |

In the method of preparing the silica-polystyrene particles according to the present invention, the silica nanoparticles and the polystyrene particles may be stirred at a volume ratio of about 1:1, and then an excess of silica nanoparticles that remain without binding may be removed by centrifugation, thereby preparing silica-polystyrene particles. An exemplary process of preparing the silica-polystyrene particles is demonstrated in the following Example 6.

Example 6

1 mL of a 0.4 wt % silica nanoparticle solution obtained by dispersing silica nanoparticles (YGS-40 or YGS-4040) in distilled water, and 1 mL of a 0.04 wt % polystyrene particle solution prepared by dispersing the polystyrene particles (prepared in Example 2) in distilled water, are vortex-stirred at a temperature of 25° C. for 1 minute, and then centrifuged three times at 6000 rpm for 20 minutes each time to remove an excess of the silica nanoparticles, thereby preparing silica-polystyrene particles.

Here, the volume of each of the silica nanoparticle solution and the polystyrene particle solution may, if necessary, be changed to 3 mL or 6 mL such that the volume ratio of the two solutions is 1:1.

Figure 4A:
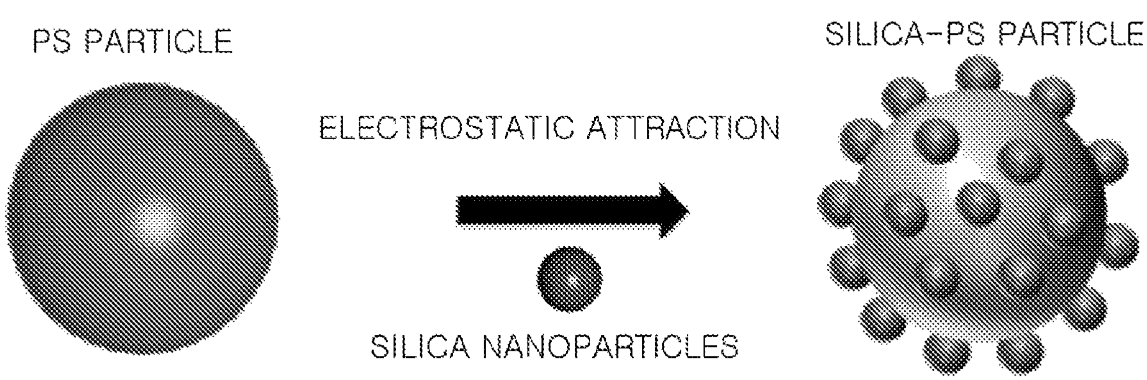
FIGS. 4A-4D show exemplary silica-polystyrene particles according to an exemplary embodiment of the present invention.
Figure 4B:
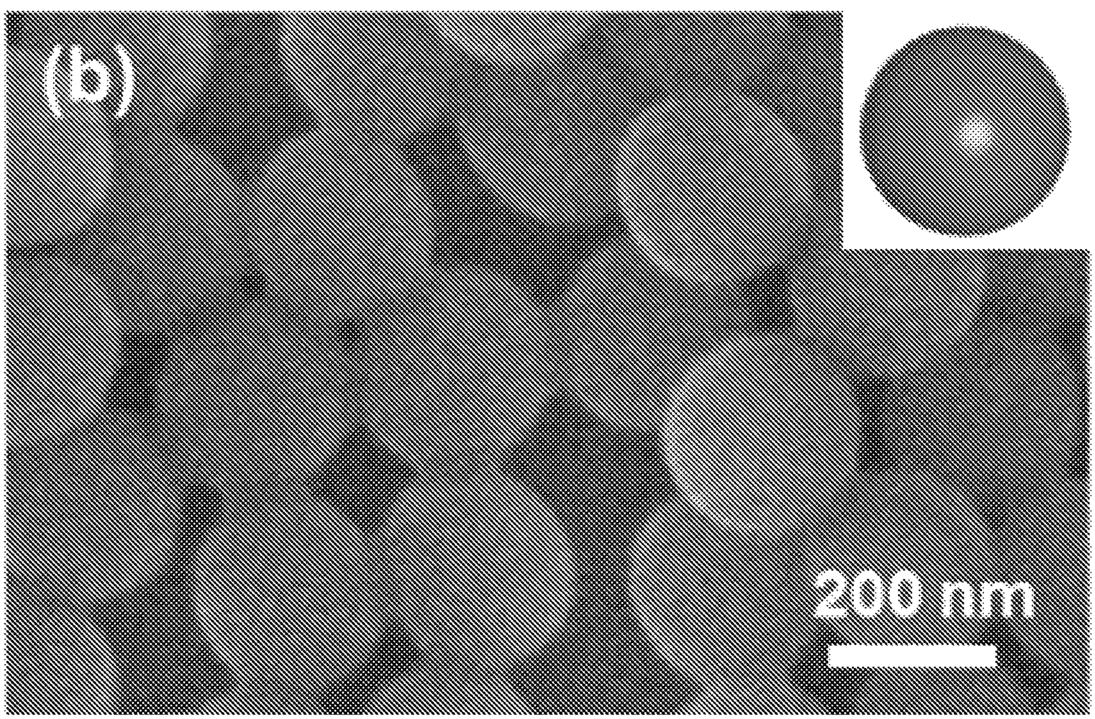
Figure 4C:
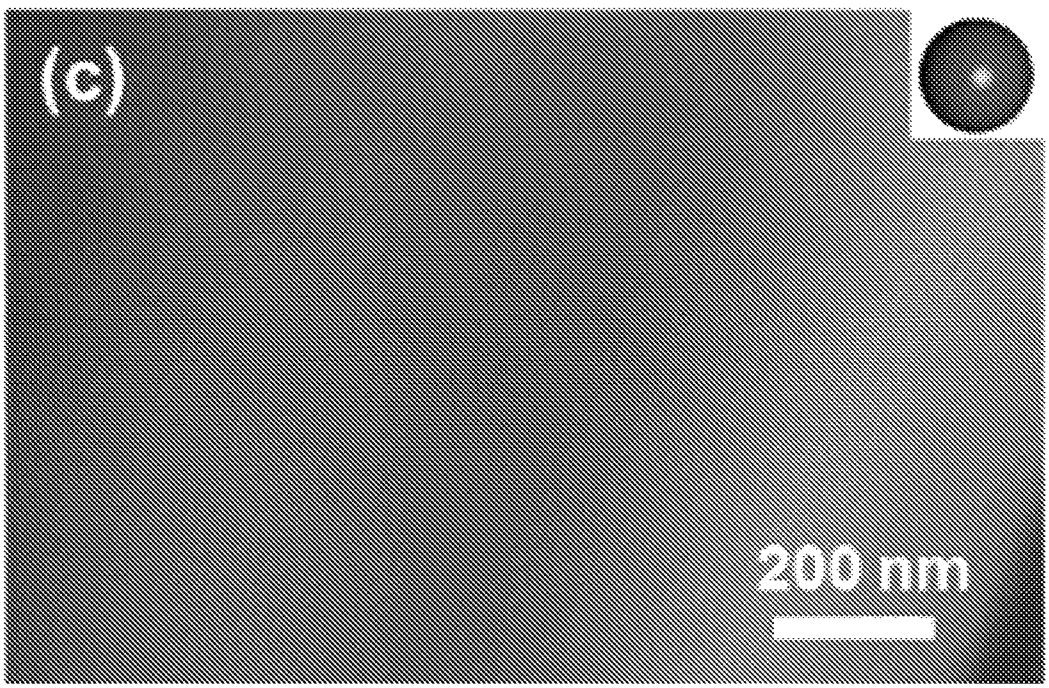

FIGS. 4A-4D shows silica-polystyrene particles according to the present invention. FIG. 4A is a schematic view showing a process of preparing silica-polystyrene particles, and FIGS. 4B to 4D sequentially show scanning electron microscope (SEM) photographs of polystyrene particles, silica particles, and the silica-polystyrene particles prepared in Example 6.

As shown in FIG. 4A, in the step (S200) of preparing silica-polystyrene particles, when negatively charged silica nanoparticles are mixed with positively charged polystyrene particles and vortex-stirred for 1 minute, silica-polystyrene particles may be obtained by electrostatic attraction between the two types of particles.

Figure 4D:
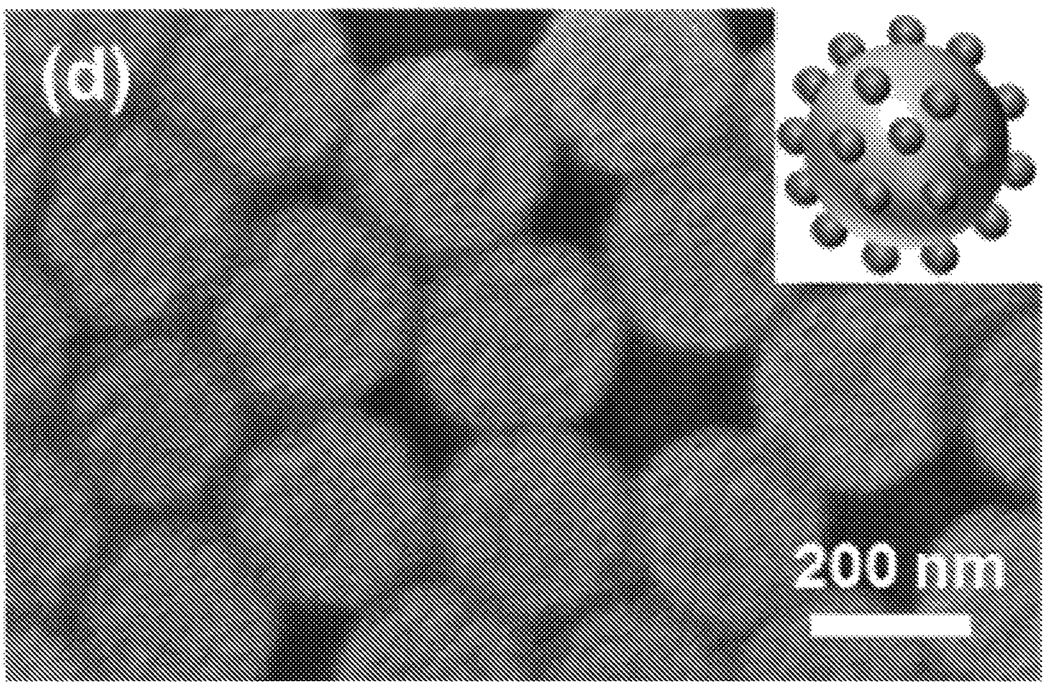

As can be seen in FIG. 4D, raspberry-shaped silica-polystyrene particles having the silica nanoparticles attached to each polystyrene particle are formed.

In addition, the surface charge of each type of particles before and after stirring in the step (S200) of preparing the silica-polystyrene particles was measured. As a result, as shown in FIGS. 3A-3D, it could be seen that silica-polystyrene particles were formed by the positively charged polystyrene particles and the negatively charged silica nanoparticles. This result suggests that the polystyrene particles having the silica nanoparticles attached thereto were successfully prepared.

TABLE 3

| | PS particles | Silica nanoparticles | Silica-polystyrene particles |
|---|---|---|---|
| Surface charge value (mV) | +43.4 | −44.3 | −43.1 |

Furthermore, factors having an effect on the method of preparing the silica-polystyrene particles were examined, and the results are shown in FIGS. 5 to 7.

FIGS. 5A-5F show scanning electron microscope (SEM) images of the shapes of exemplary silica-polystyrene particles prepared using various stirring methods and reaction temperatures in the step of preparing the silica-polystyrene particles according to the present invention.

Figure 5A:
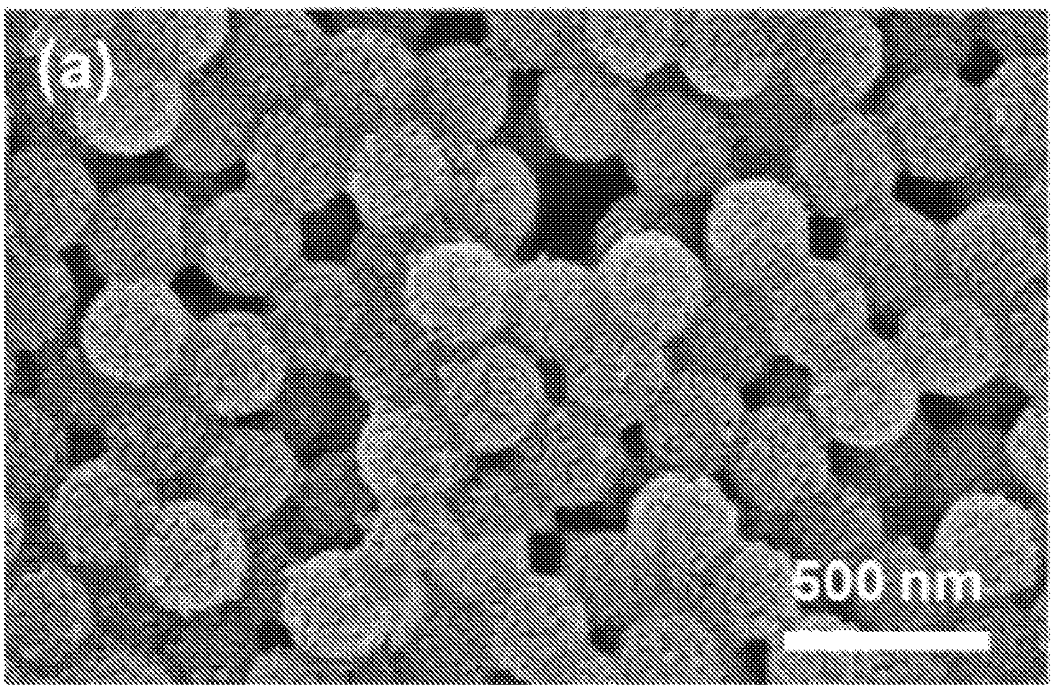
FIGS. 5A-5F show scanning electron microscope (SEM) photographs of exemplary silica-polystyrene particles prepared under various stirring conditions in a step of preparing silica-polystyrene particles according to an exemplary embodiment of the present invention.
Figure 5B:
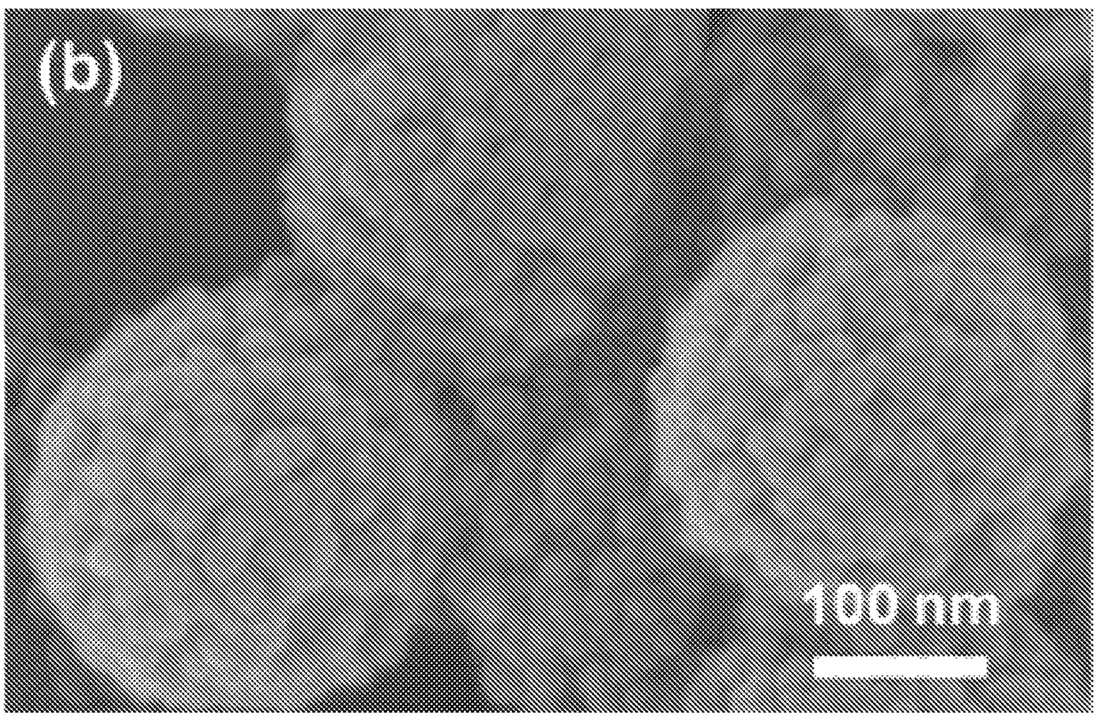

Specifically, FIGS. 5A and 5B show the shape of silica-polystyrene particles prepared by vortex stirring at a temperature of 25° C. for 1 minute by the method of stirring silica nanoparticles and polystyrene particles according to Example 6 as described above.

Figure 5C:
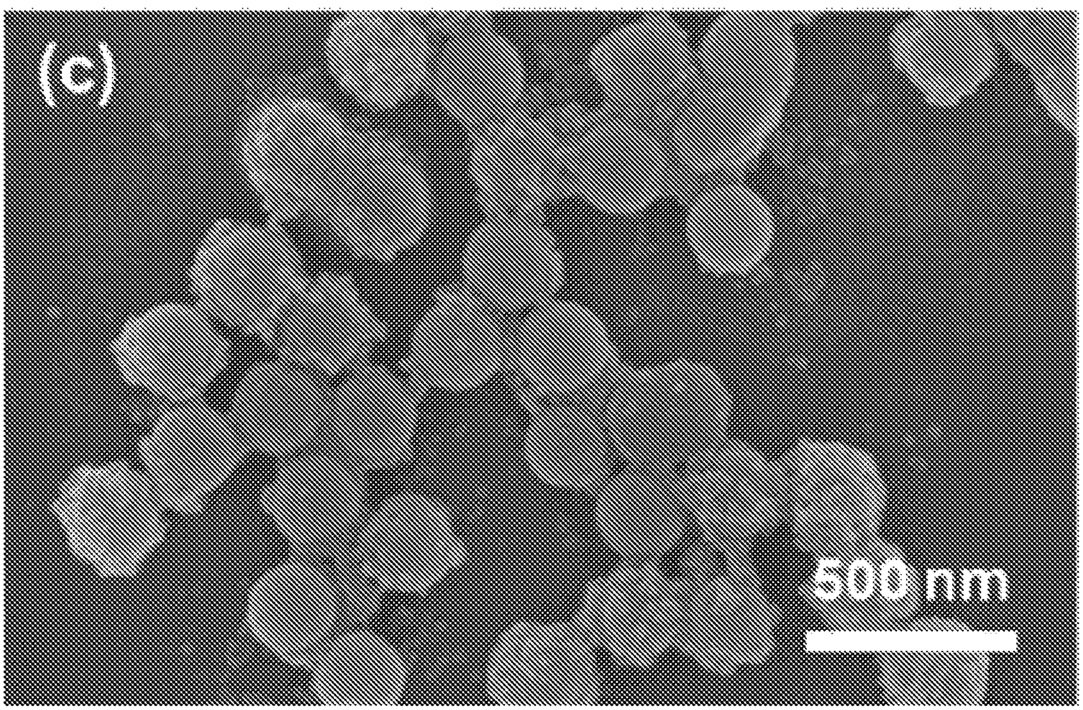
Figure 5D:
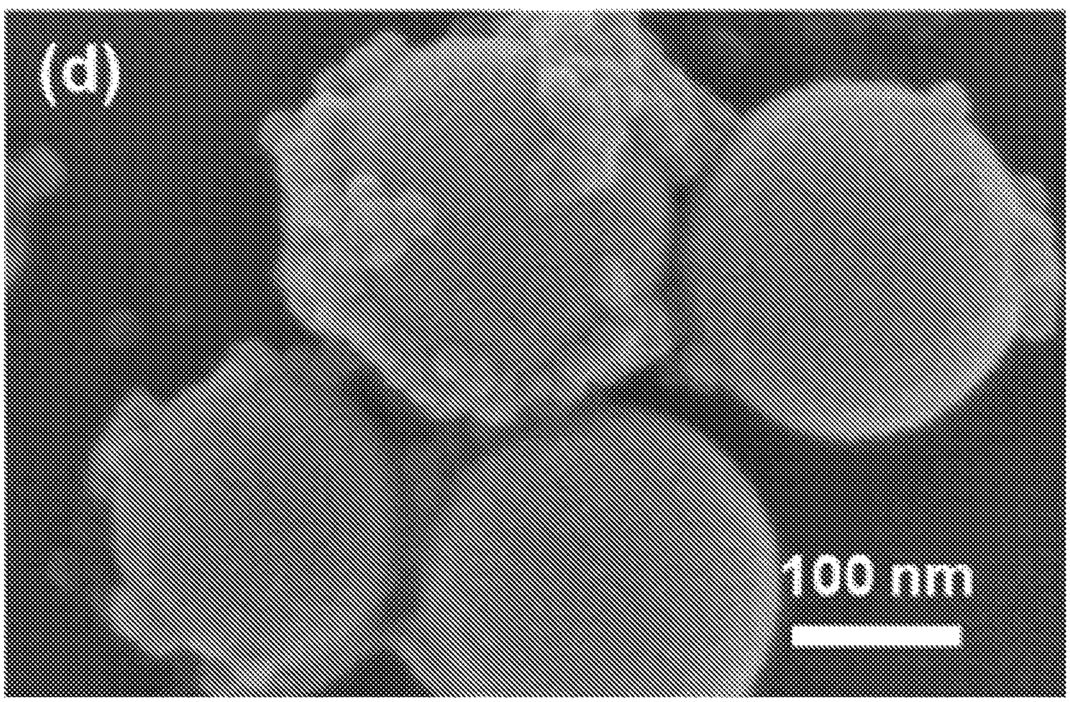

FIGS. 5C and 5D show the shape of silica-polystyrene particles prepared by sonication stirring at a temperature of 25° C. for 1 minute by the method of stirring silica nanoparticles (YGS-40) and polystyrene particles in the same manner as Example 6. When comparing with FIGS. 5A and 5B, it can be seen that silica-polystyrene particles having silica nanoparticles attached partially to each polystyrene particle are formed, indicating that the desired silica-polystyrene particles are not properly formed.

When sonication is applied, electrostatic attraction between silica nanoparticles and polystyrene particles may be reduced, and hence the desired silica-polystyrene nanoparticles are not formed.

Figure 5E:
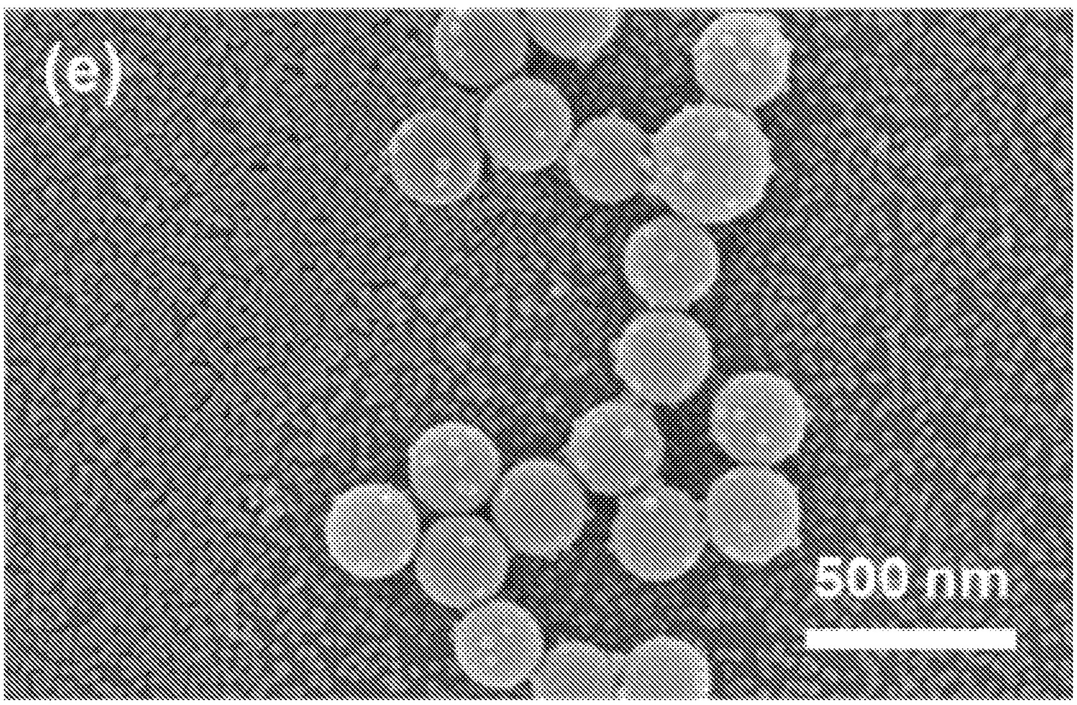
Figure 5F:
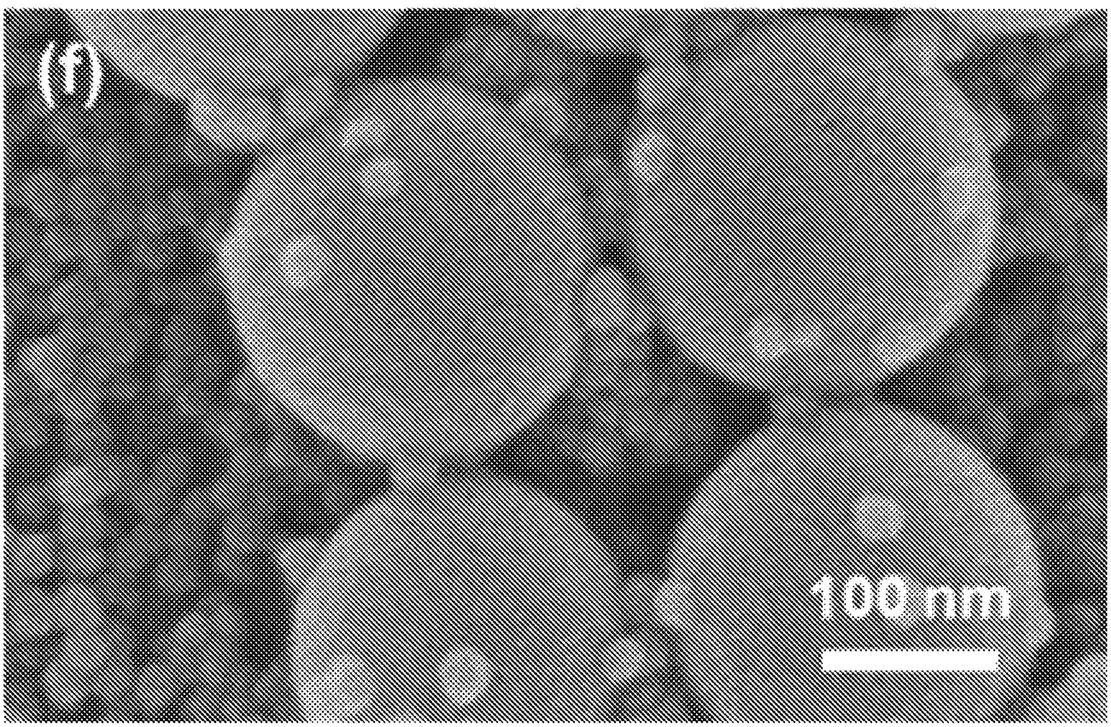

FIGS. 5E and 5F show the shape of exemplary silica-polystyrene particles prepared by vortex stirring at a temperature of 100° C. for 1 minute in the step of stirring silica nanoparticles and polystyrene particles in the same manner as Example 6. Particularly, silica-polystyrene particles having silica nanoparticles attached partially to each polystyrene particle may be formed, indicating that the desired silica-polystyrene particles are not properly formed.

Therefore, it can be confirmed that the method of silica nanoparticles and polystyrene particles in the step (S200) of preparing the silica-polystyrene particles according to the present invention is preferably vortex stirring at a reaction temperature of 25° C.

FIGS. 6A-6G show scanning electron microscope (SEM) photographs of the shape of exemplary silica-polystyrene particles prepared using varying ratios of the size of polystyrene particles to that of silica nanoparticles in the step of preparing the silica-polystyrene particles according to various exemplary embodiments of the present invention.

For instance, FIGS. 6A to 6D show silica-polystyrene particles prepared using silica nanoparticles having a particle size of 20 nm together with polystyrene particles having particle sizes of 90 nm (FIG. 6A), 200 nm (FIG. 6B), 580 nm (FIG. 6C) and 1300 nm (FIG. 6D), respectively.

Figure 6A:
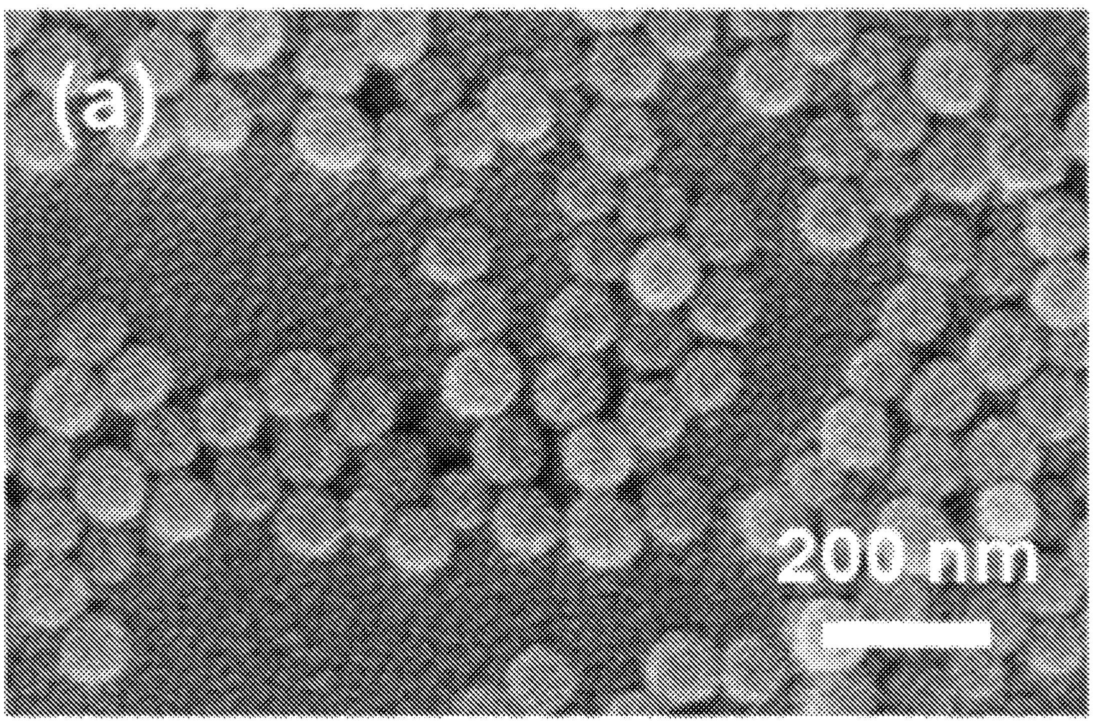
FIGS. 6A-6G show scanning electron microscope (SEM) photographs of exemplary silica-polystyrene particles prepared using varying ratios of the size of polystyrene particles to that of silica nanoparticles in a step of preparing silica-polystyrene particles according to an exemplary embodiment of the present invention.
Figure 6B:
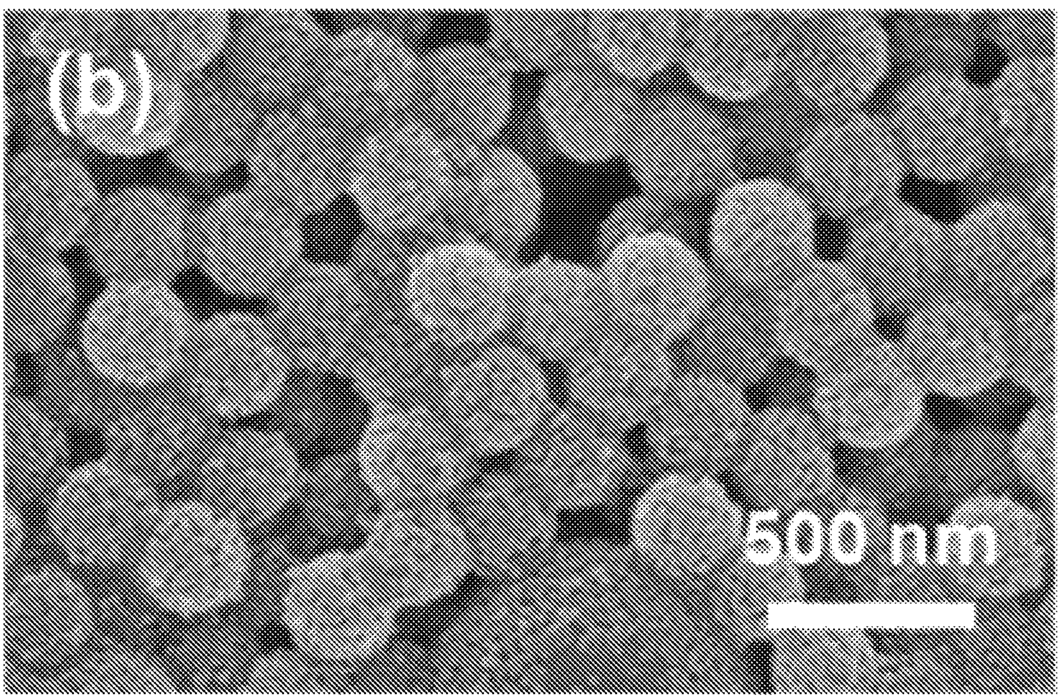
Figure 6C:
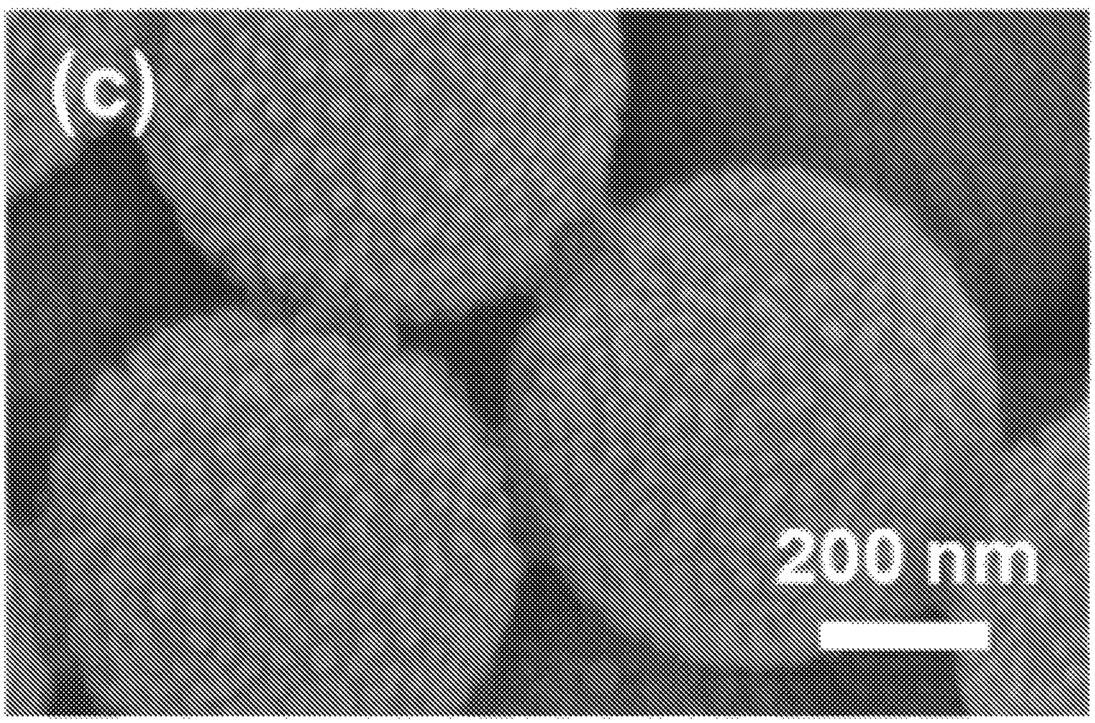
Figure 6D:
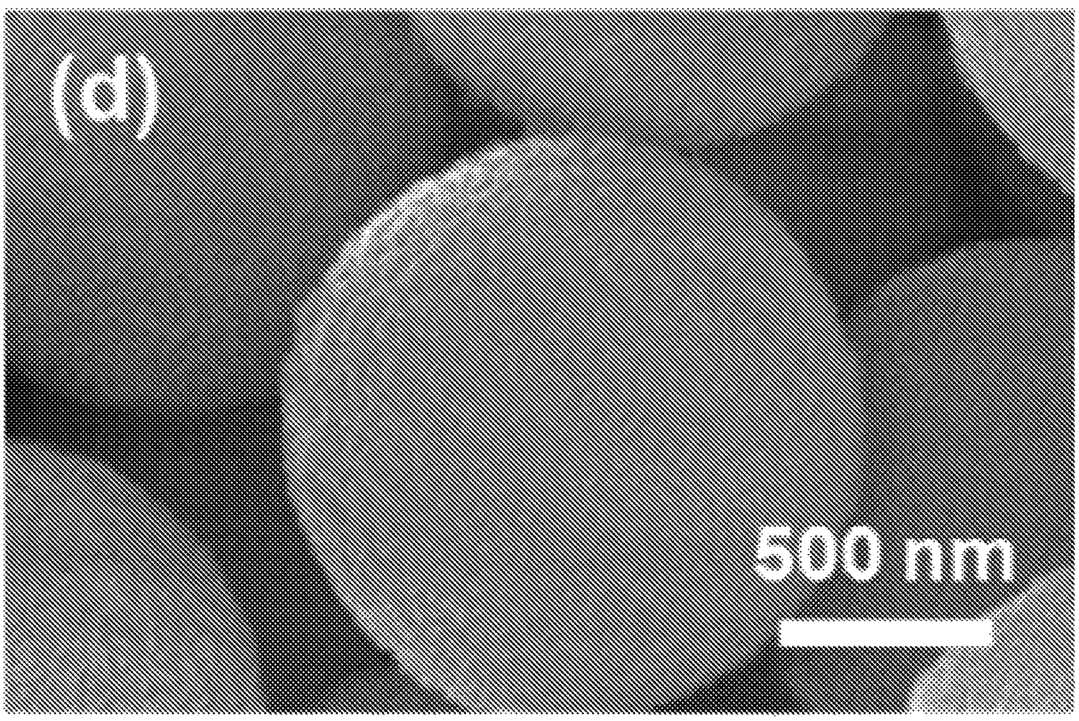
Figure 6E:
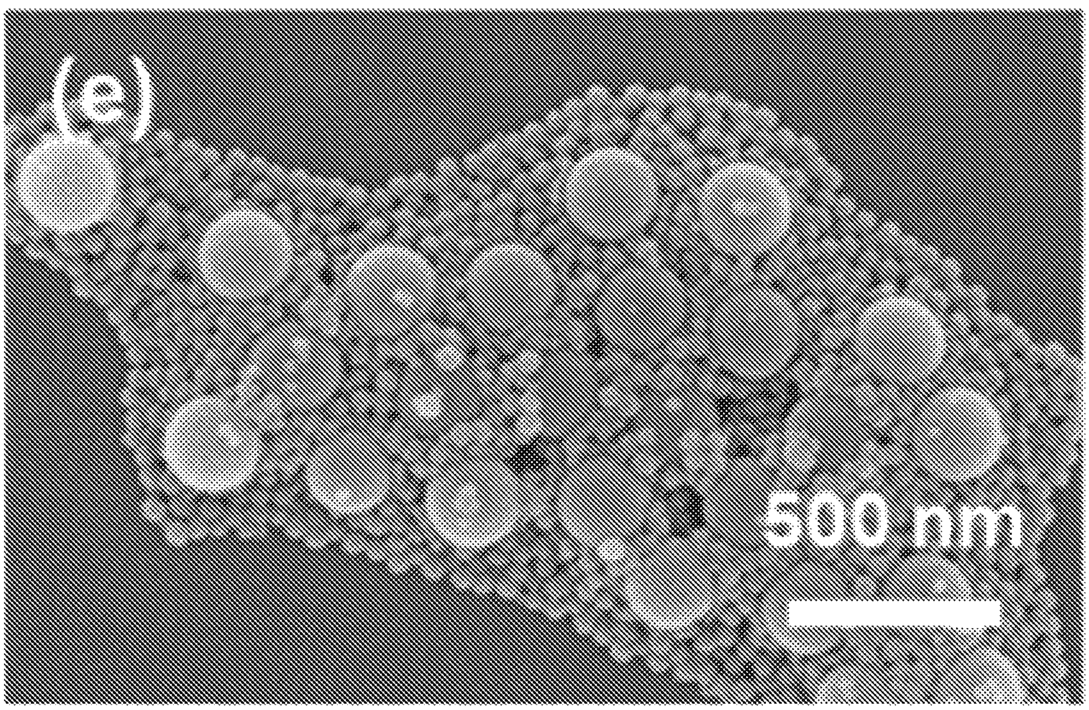
Figure 6F:
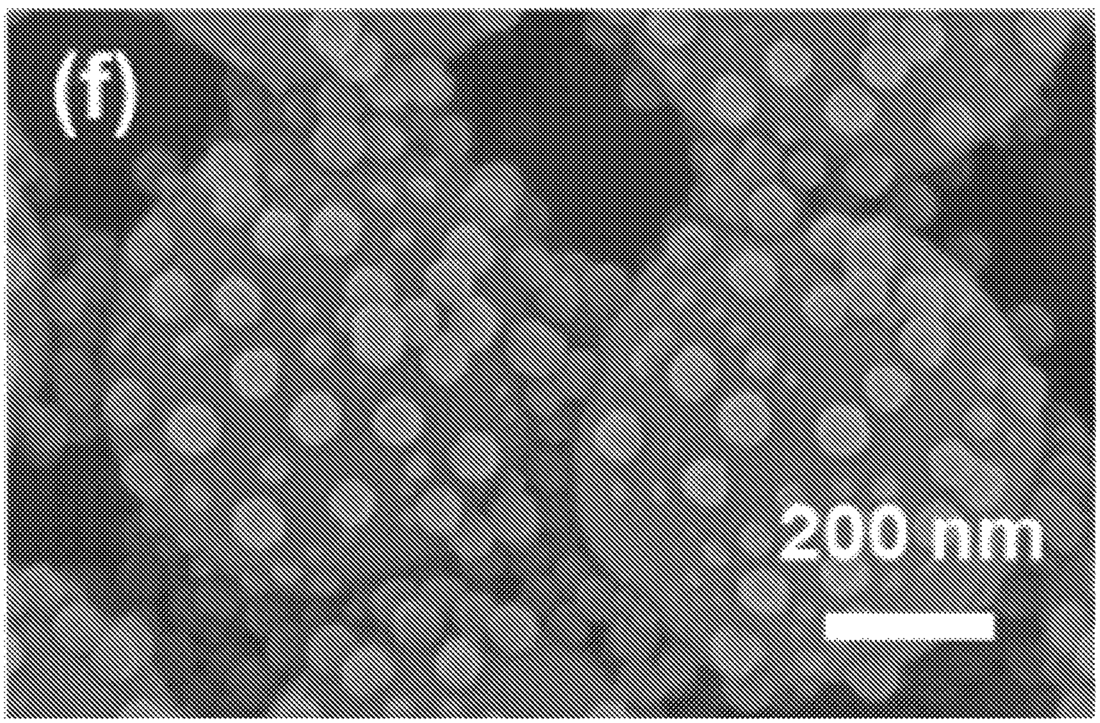
Figure 6G:
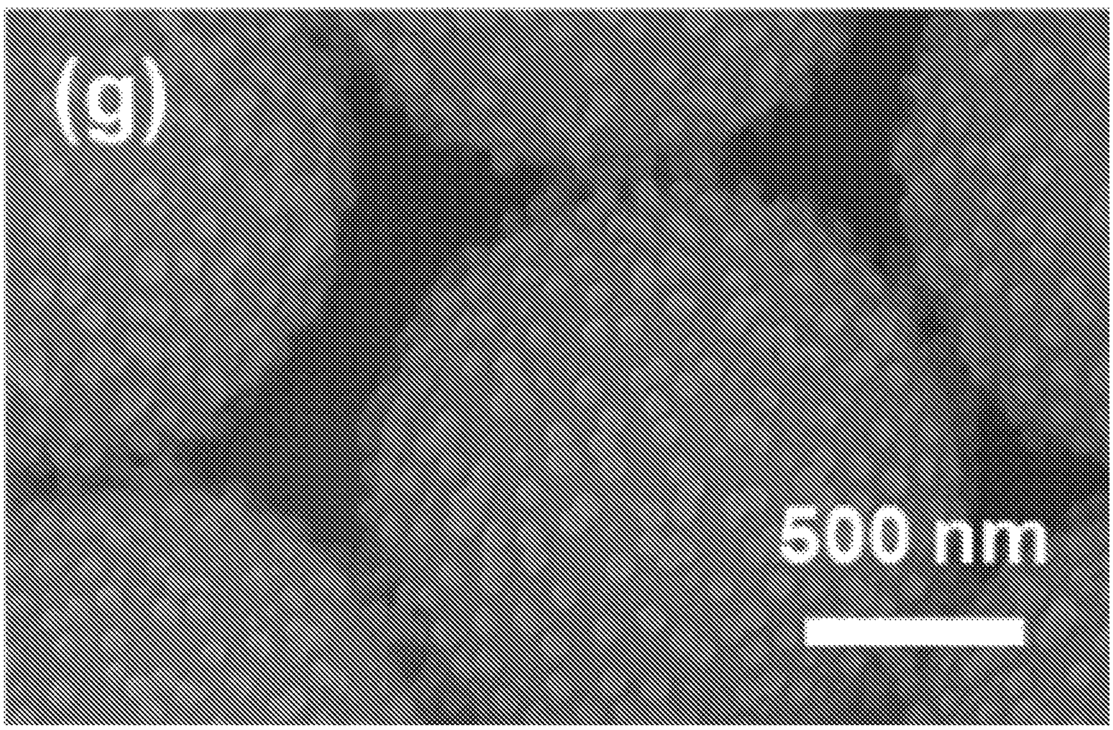

FIGS. 6E to 6G show silica-polystyrene particles prepared using silica nanoparticles having a particle size of 50 nm together with polystyrene particles having particle sizes of 200 nm (FIG. 6E), 580 nm (FIG. 6F) and 1300 nm (FIG. 6G), respectively.

As shown in FIGS. 6A-6G, in the case in which polystyrene particles having a size of 90 nm were used, it could be seen that, except for when the ratio of the size of polystyrene particles to that of silica nanoparticles was 4.5 (FIG. 6A), when the ratio of the size of polystyrene particles to that of silica nanoparticles was 10 or more (FIGS. 6B to 6D), raspberry-shaped silica-polystyrene particles were formed. In addition, in the case in which silica nanoparticles having a particle size of 50 nm were used, it could be seen that, except for when polystyrene particles having a particle size of 200 nm and the ratio of the size of polystyrene particles to that of silica nanoparticles was 4 (FIG. 6E), when the ratios of the size of polystyrene particles to that of silica nanoparticles were, respectively, 10 and 26 (FIGS. 6F and 6G), raspberry-shaped silica-polystyrene particles were formed.

Therefore, it could be confirmed that when the ratio of the size of polystyrene particles to that of silica nanoparticles was 10 or greater, silica-polystyrene particles were successfully formed.

FIGS. 7A-7H show scanning electron microscope (SEM) images of the shapes of silica-polystyrene particles prepared using various concentrations of aqueous sodium chloride (NaCl) solution in the step of preparing the silica-polystyrene particles according to the present invention.

Figure 7A:
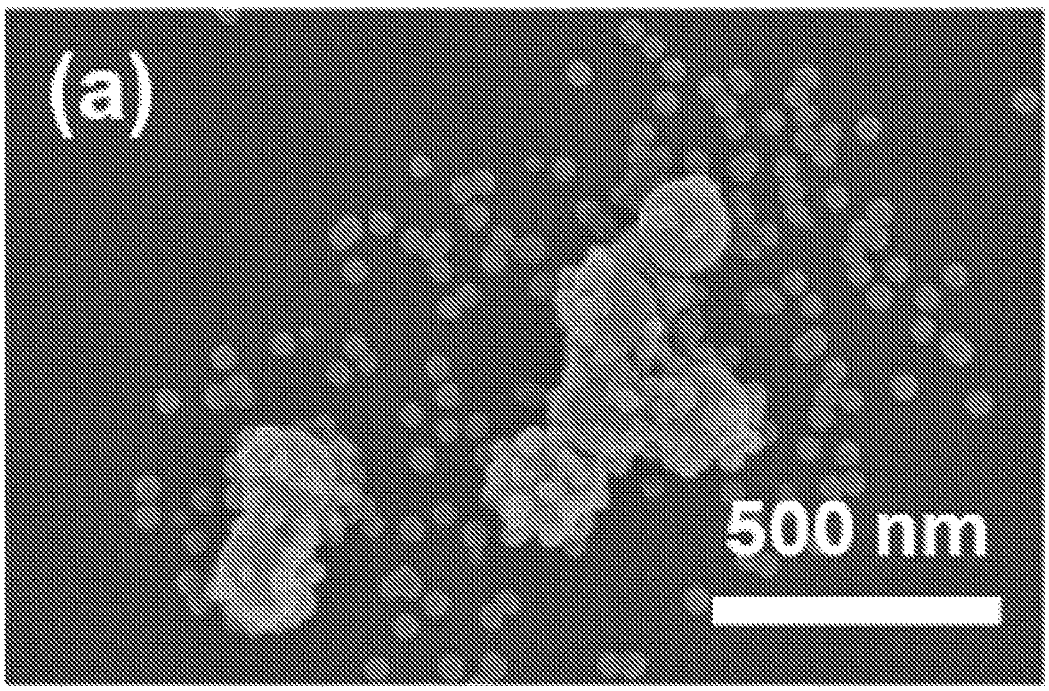
FIGS. 7A-7H show scanning electron microscope (SEM) photographs of exemplary silica-polystyrene particles prepared using varying concentrations of sodium chloride (NaCl) aqueous solution in a step of preparing silica-polystyrene particles according to an exemplary embodiment of the present invention.
Figure 7B:
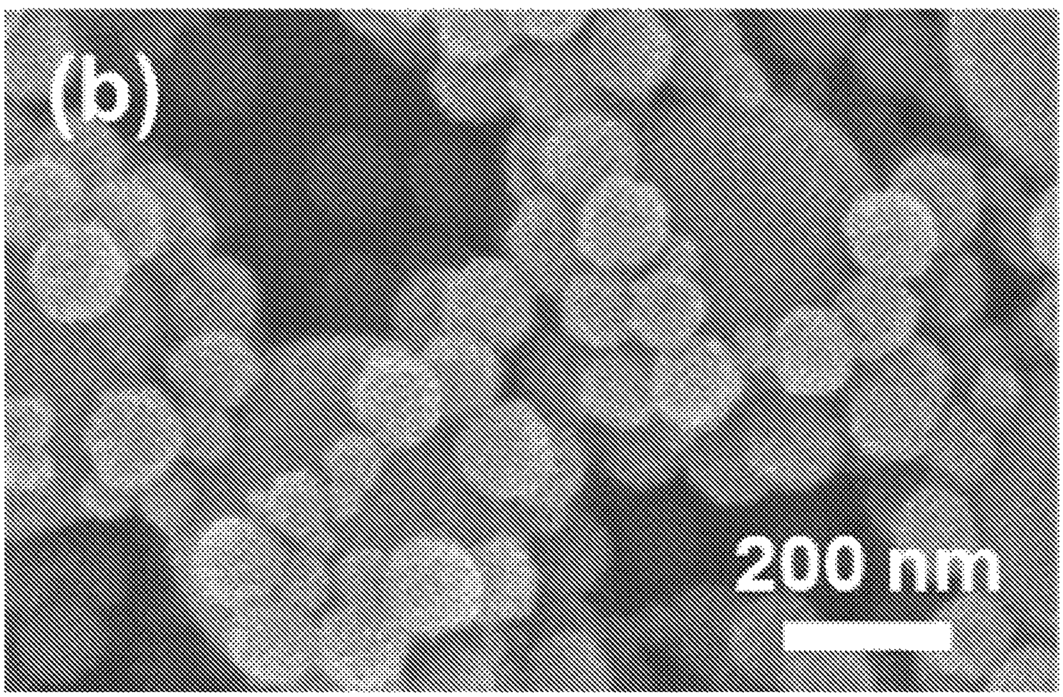
Figure 7C:
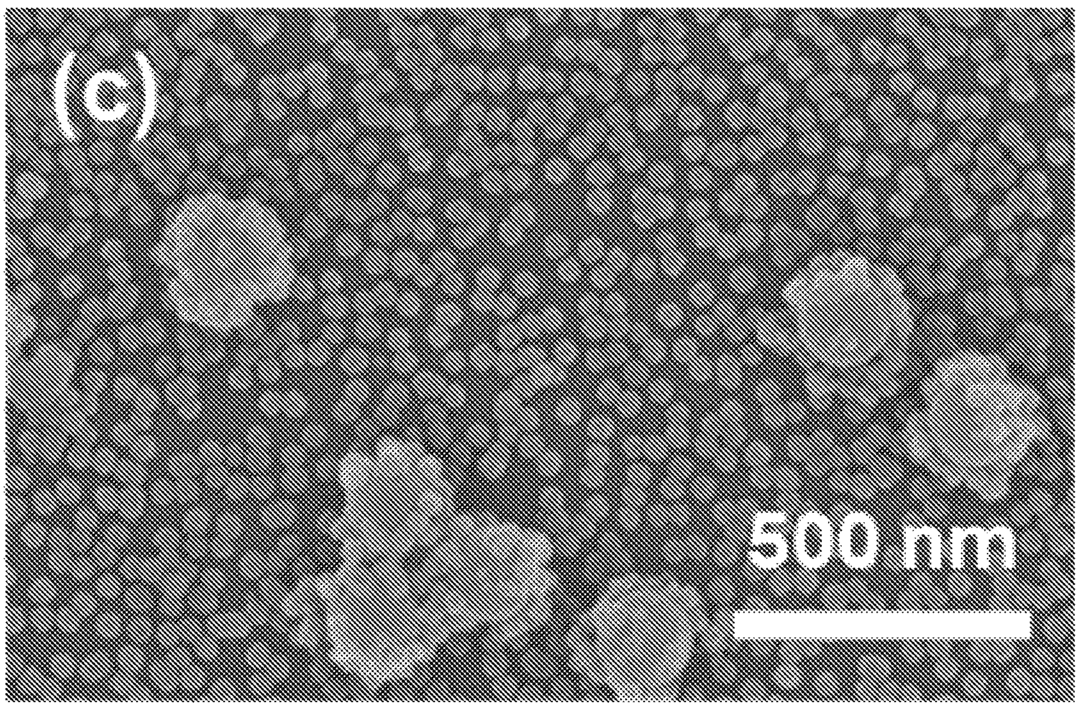
Figure 7D:
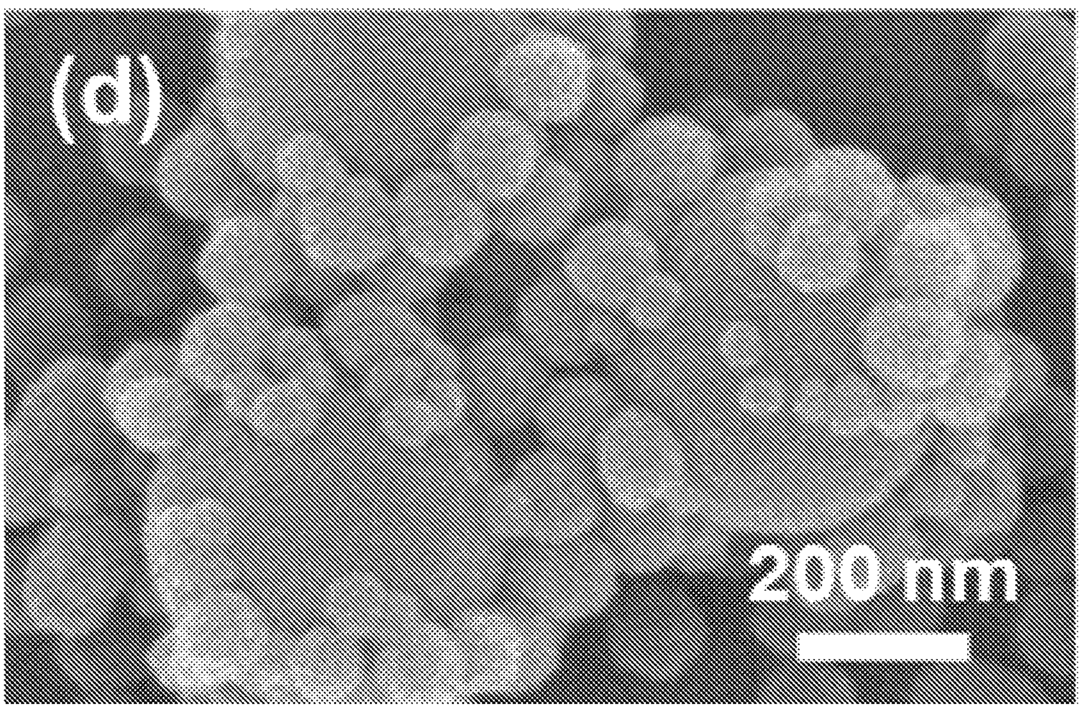
Figure 7E:
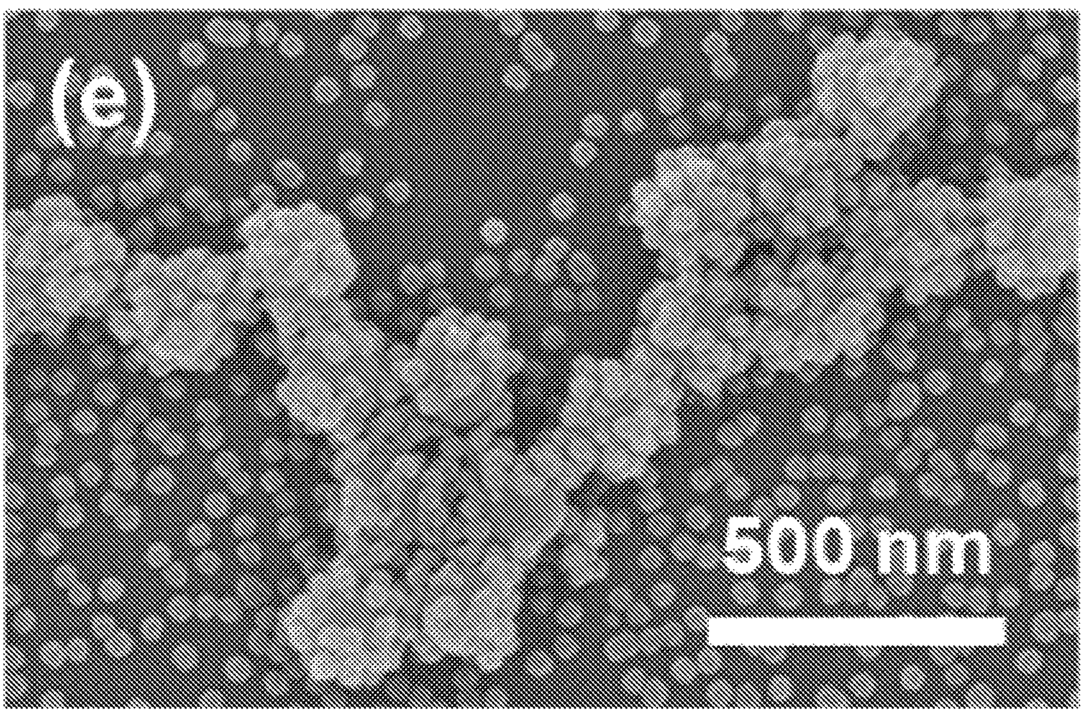
Figure 7F:
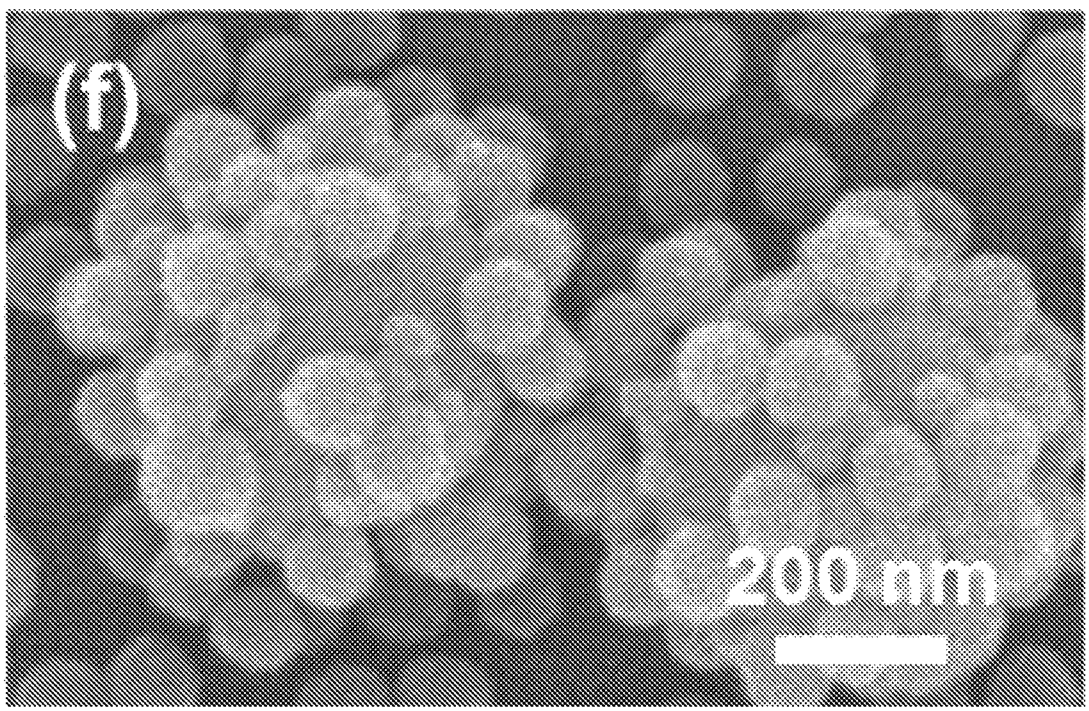
Figure 7G:
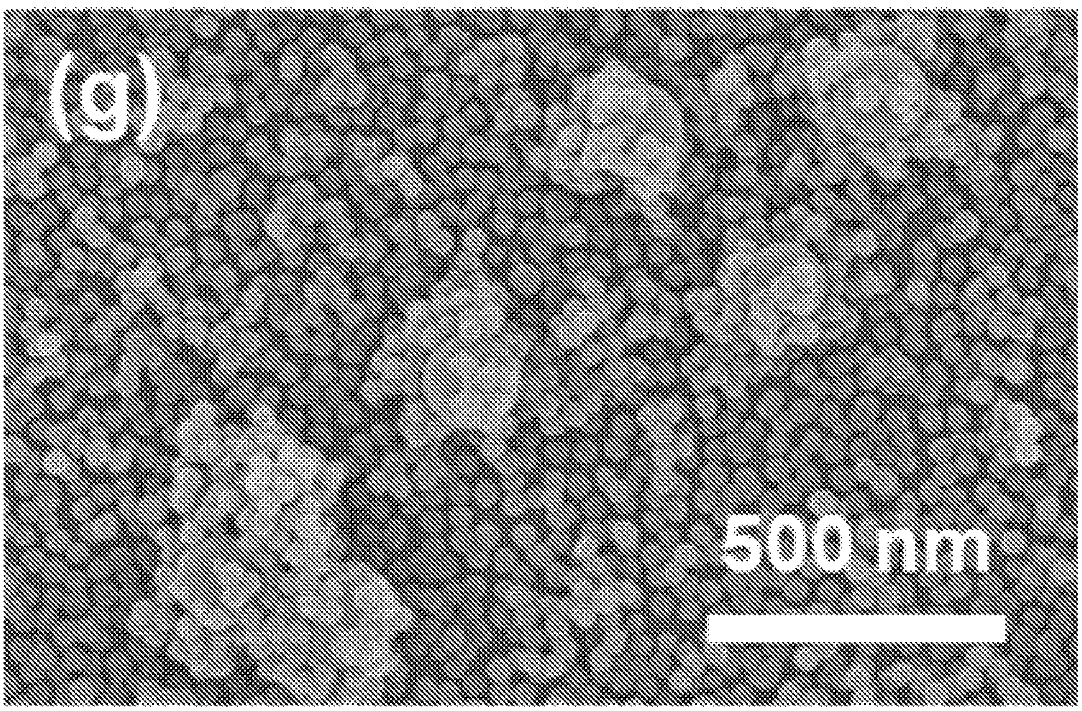
Figure 7H:
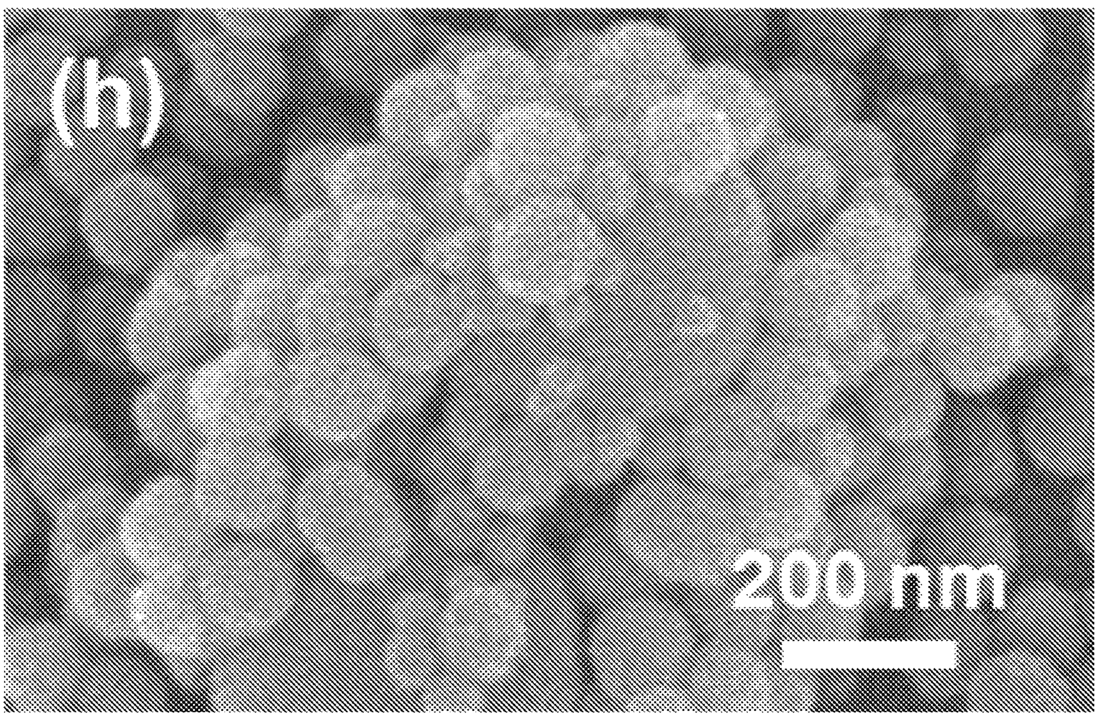

In order to examine the effect of ion intensity between polystyrene particles and silica particles on the preparation of raspberry-shaped silica-polystyrene particles, various concentrations of aqueous sodium chloride (NaCl) solution were added to a mixture solution of silica nanoparticles (YGS-4040) having a size of 50 nm and polystyrene particles having a size of 200 nm (Example 2), thereby preparing silica-polystyrene particles. FIGS. 7A and 7B show silica-polystyrene particles prepared by adding 0.1 mM sodium chloride aqueous solution; FIGS. 7C and 7D show silica-polystyrene particles prepared by adding 1.0 mM sodium chloride aqueous solution; FIGS. 7E and 7F show silica-polystyrene particles prepared by adding 10.0 mM sodium chloride aqueous solution; and FIGS. 7G and 7H show silica-polystyrene particles prepared by adding 100.0 mM sodium chloride aqueous solution.

As can be seen in FIG. 6E, when aqueous sodium chloride solution was added, silica particles were not attached to polystyrene particles, whereas, as can be seen in FIGS. 7A-7H, when aqueous sodium chloride solution was added, raspberry-shaped silica-polystyrene particles were formed.

In particular, it could be seen that as the concentration of sodium chloride aqueous solution increased from 0.1 mM (FIGS. 7A and 7B to 10.0 mM (FIGS. 7E and 7F), the number of silica nanoparticles attached to polystyrene particles increased. However, as can be seen in FIGS. 7G and 7H, when 100.0 mM sodium chloride aqueous solution was added, the agglomeration of the particles appeared.

Therefore, it was confirmed that the addition of a suitable concentration of aqueous sodium chloride solution could have an effect on the formation of silica-polystyrene particles. It is preferable to add less than about 100.0 mM sodium chloride solution.

Figure 8:
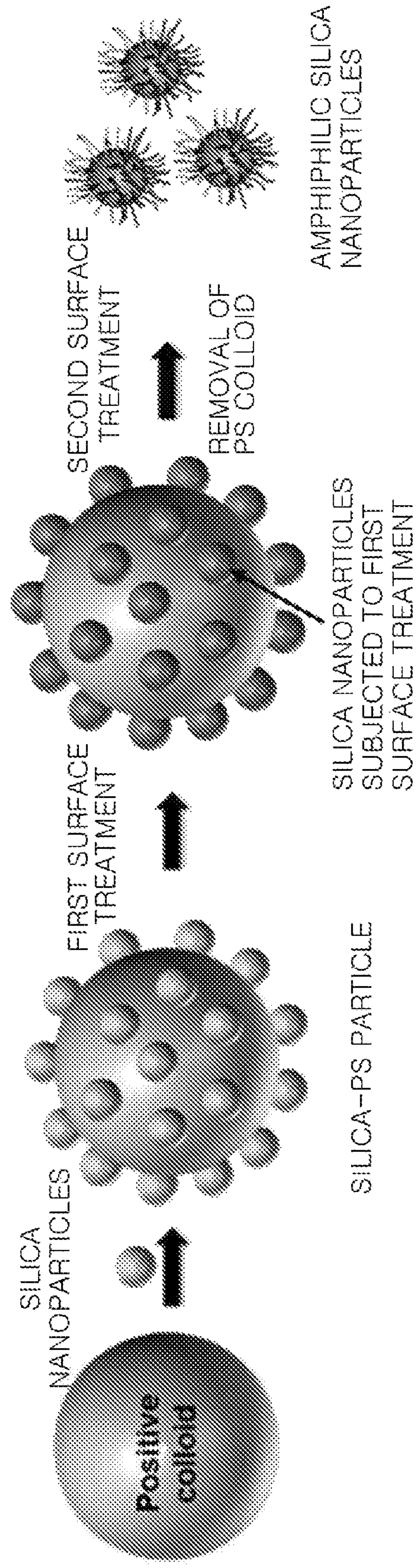
FIG. 8 shows an exemplary process of preparing amphiphilic silica nanoparticles according to an exemplary embodiment of the present invention.
Figure 9:
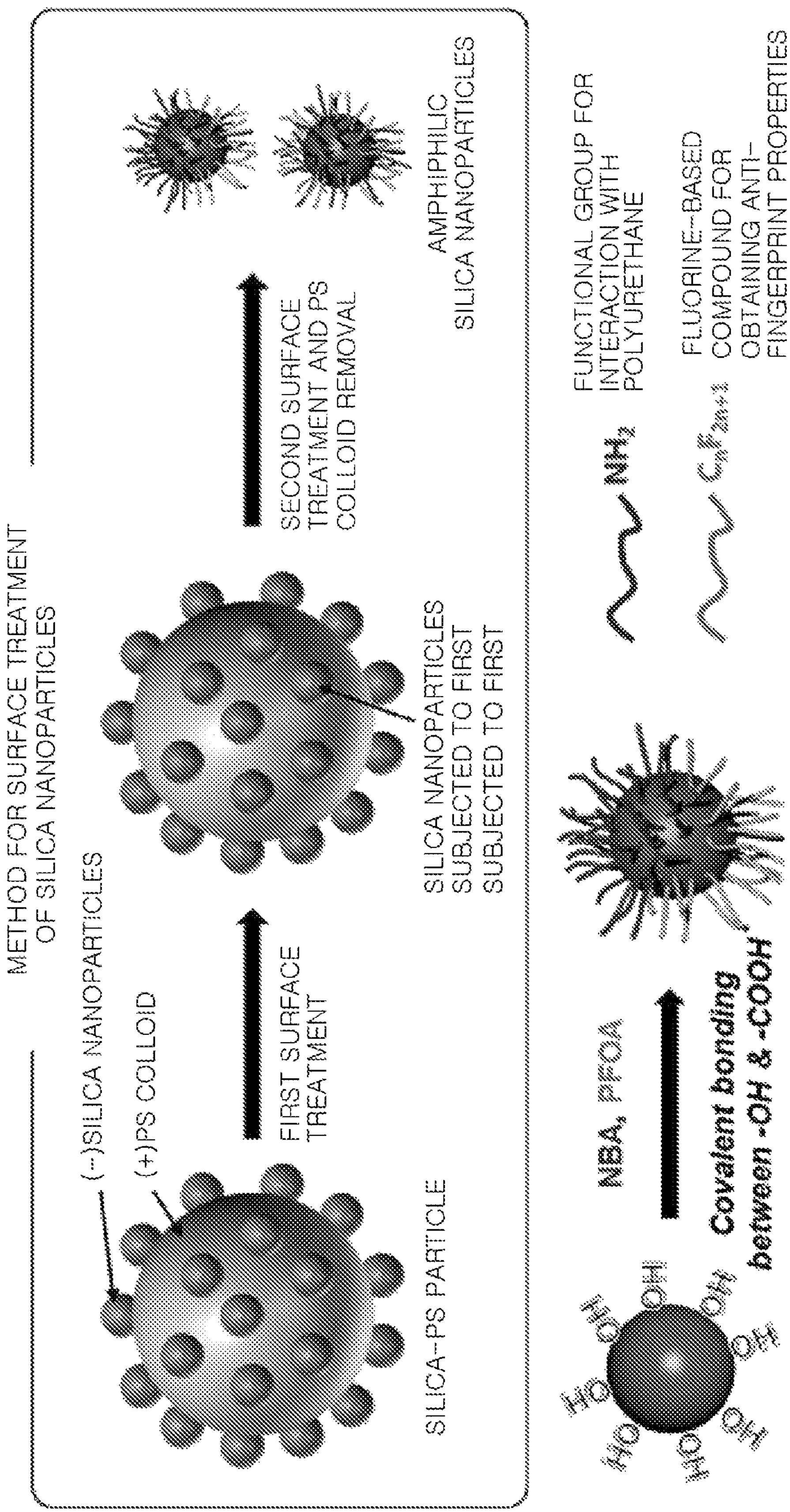
FIG. 9 shows an exemplary process of preparing amphiphilic silica nanoparticles according to an exemplary embodiment of the present invention.

In step (c) of preparing amphiphilic silica nanoparticles (S300), as shown in FIG. 8, amphiphilic silica nanoparticles may be prepared by subjecting the silica-polystyrene particles (prepared in step (b) (S200) to first surface treatment, followed by second surface treatment while removing the polystyrene particles.

From the measurement results shown in Table 2 above, silica nanoparticles may have a negative surface charge value due to the presence of a hydroxyl group (—OH) on the particle surface.

Thus, amphiphilic silica nanoparticles may be prepared by using the coupling reaction between an organic material having a carboxyl group (—COOH) and N,N'-dicyclohexylcarbodiimide (DCC) to chemically couple the silica nanoparticle surface with a functional ligand.

For example, in order to prepare the amphiphilic silica nanoparticles of the present invention, each of N-(tert-butoxycarbonyl)-β-alanine (NBA), which has a carboxyl group together with an amine group for interaction with polyurethane, and perfluorooctanoic acid (PFOA) which has a fluorine functional group for improving anti-fingerprint properties, may be used as a functional ligand for the organic material.

Figure 10:
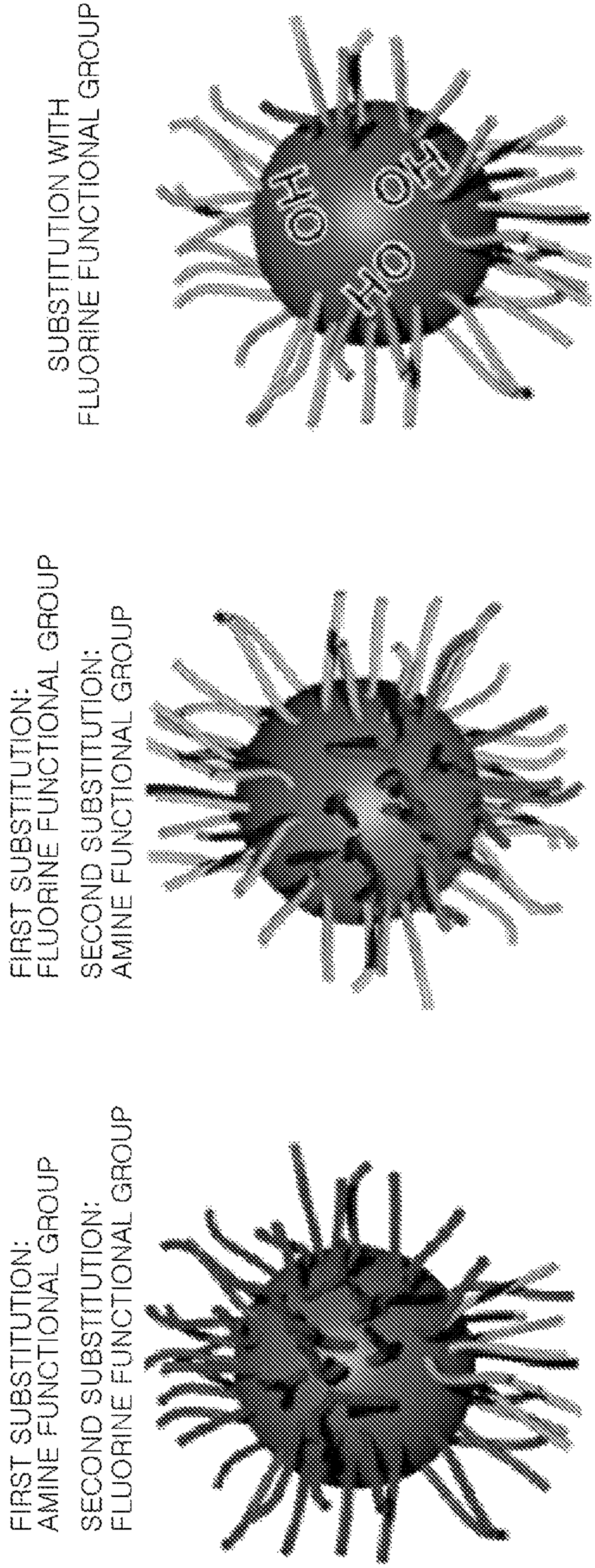
FIG. 10 shows different kinds of amphiphilic silica nanoparticles prepared according to an exemplary embodiment of the present invention.

According to an exemplary embodiment, as surface-treated amphiphilic silica nanoparticles, three types of amphiphilic silica nanoparticles as shown in FIG. 10 may be prepared depending on the kinds of functional groups that are substituted in the first surface treatment and second surface treatment processes.

In an exemplary embodiment, amine-fluorine amphiphilic silica particles having an amine functional group introduced in the first surface treatment and a fluorine functional group introduced in the second surface treatment are prepared as follows. For instance, in the first surface treatment, N-(tert-butoxycarbonyl)-β-alanine (NBA), 1-ethyl-3-(3-dimethylaminopropyl)carbodiimide (EDAC) and 4-dimethylaminopyridine (DMAP) may be added to the silica-polystyrene particles, and the mixture may be stirred at room temperature for 24 hours, An excess of the remaining reagents may be removed by centrifugation.

Thereafter, the silica-polystyrene particles subjected to the first surface treatment may be added to a tetrahydrofuran (TI-IF) solvent, and then perfluorooctanoic acid (PRA), N,N'-dicyclohexylcarbodiimide (DCC) and 4-dimethylaminopyridine (DMAP) are added thereto. The mixture may be stirred at room temperature (about 20° C. to 30° C.) for 24 hours, thereby subjecting the silica nanoparticles to second surface treatment while removing the polystyrene particles. An excess of the reagents remaining after the second surface treatment may be removed by centrifugation.

Exemplary processes of preparing the amine-fluorine surface-treated amphiphilic silica particles are demonstrated below.

Example 7

For first surface treatment, 18.9 mg of NBA, 19.17 mg of EDAC and 12.22 mg of DMAP are added to 1 mL of a silica-polystyrene particle solution, and the mixture is stirred at room temperature (about 20° C. to 30° C.) for 24 hours. After completion of the stilling, an excess of the reagent is removed by centrifugation three times at 6000 rpm for 20 minutes each time. For second surface treatment, the silica-polystyrene particles subjected to the first surface treatment are added to 1 mL of a THF solvent, and 41.4 mg of PFOA, 20.6 mg of DCC and 12.22 mg of DMAP are added thereto, followed by stirring at room temperature for 24 hours. After completion of the stirring, an excess of the reagents is removed by centrifugation three times at 6000 rpm for 20 minutes each time.

Example 8

The amine-fluorine surface-treated amphiphilic silica particles may be prepared in the same manner as Example 7, except that the amounts of materials that are added in each step are changed, thereby preparing amine-fluorine surface-treated amphiphilic silica particles. For instance, for first surface treatment, 56.7 mg of NBA, 57.51 mg of EDAC and 36.33 mg of DMAP are added to 3 mL of a silica-polystyrene particle solution, and the mixture is stirred at room temperature for 24 hours. After completion of the stirring, an excess of the reagents is removed by centrifugation three times at 6000 rpm for 20 minutes each time. For second surface treatment, the silica-polystyrene particles subjected to the first surface treatment are added to a 3 mL of a THF solvent, and 124.2 mg of PFOA, 61.8 mg of DCC and 36.66 mg of DMAP are added thereto, followed by stirring at room temperature for 24 hours. After completion of the stirring, an excess of the reagents is removed by centrifugation three times at 6000 rpm for 20 minutes each time.

Example 9

The amine-fluorine surface-treated amphiphilic silica particles may be prepared in the same manner as Example 7, except that the amounts of materials that are added in each step are changed, thereby preparing amine-fluorine surface-treated amphiphilic silica particles. For instance, for first surface treatment. 113.4 mg of NBA, 115.02 mg of EDAC and 72.66 mg of DMAP are added to 6 mL of a silica-polystyrene particle solution, and the mixture is stirred at room temperature for 24 hours. After completion of the stirring, an excess of the reagents is removed by centrifugation three times at 6000 rpm for 20 minutes each time. For second surface treatment, the silica-polystyrene (PS) particles subjected to the first surface treatment are added to 3 mL of a THF solvent, and 248.4 mg of PFOA, 123.6 mg of DCC and 73.32 mg of DMAP are added thereto, followed by stirring at room temperature for 24 hours. After completion of the stirring, an excess of the reagents is removed by centrifugation three times at 6000 rpm for 20 minutes each time.

In another embodiment of the present invention, the method for preparing amphiphilic silica particles, fluorine-amine surface-treated amphiphilic silica particles having a fluorine functional group introduced in first surface treatment and an amine functional group in second surface treatment may be prepared as follows. For instance, for first surface treatment, PFOA, DCC and DMAP reagents may be added to the silica-polystyrene particles dispersed in an ethanol solvent, and the mixture is stirred at room temperature (about 20° C. to 30° C.) for 24 hours. An excess of the reagents may be removed by centrifugation. Subsequently, for second surface treatment, the silica-polystyrene particles subjected to the first surface treatment may be added to a tetrahydrofuran (THE) solvent, and NBA, DCC and DMAP reagents may be added thereto, followed by stirring at room temperature (about 20° C. to 30° C.) for 24 hours. An excess of the reagents may be removed by centrifugation.

Exemplary processes of preparing the fluorine-amine surface-treated amphiphilic silica particles are demonstrated below.

Example 10

For first surface treatment, 41.4 mg of PFOA, 20.6 mg of DCC and 12.22 mg of DMAP are added to 1 mL of a solution of the silica-polystyrene particle dispersed in an ethanol solvent, and the mixture is stirred at room temperature for 24 hours. After completion of the stirring, an excess of the reagents is removed by centrifugation three times at 6000 rpm for 20 minutes each time. For second surface treatment, the silica-polystyrene particles subjected to the first surface treatment are added to 1 mL of a THF solvent, and 18.9 mg of NBA, 20.6 mg of DCC and 12.22 mg of DMAP are added thereto, followed by stirring at room temperature for 24 hours. After completion of the stirring, an excess of the reagents is removed by centrifugation three times at 6000 rpm for 20 minutes each time.

Example 11

The fluorine-amine surface-treated amphiphilic silica particles may be prepared by the same manner as Example 10, except that the amounts of materials that are added in each step are changed, thereby preparing amine-fluorine surface-treated amphiphilic silica particles. For instance, for first surface treatment, 124.2 mg of PFOA, 61.8 mg of DCC and 36.66 mg of DMAP are added to 3 mL of a solution of the silica-polystyrene particles dispersed in an ethanol solvent, and the mixture is stirred at room temperature for 24 hours. After completion of the stirring, an excess of the reagents is removed by centrifugation three times at 6000 rpm for 20 minutes each time. For second surface treatment, the silica-polystyrene particles subjected to the first surface treatment are added to 3 mL of a THF solvent, and 56.7 mg of NBA, 61.8 mg of DCC and 36.66 mg of DMAP are added thereto, followed by stirring at room temperature for 24 hours. After completion of the stirring, an excess of the reagents is removed by centrifugation three times at 6000 rpm for 20 minutes each time.

Example 12

The fluorine-amine surface-treated amphiphilic silica particles may be prepared by the same manner as Example 10, except that the amounts of materials that are added in each step are changed, thereby preparing amine-fluorine surface-treated amphiphilic silica particles. For instance, for first surface treatment, 248.4 mg of PFOA, 123.6 mg of DCC and 72.66 mg of DMAP are added to 6 mL of a solution of the silica-polystyrene particles dispersed in an ethanol solvent, and the mixture is stirred at room temperature for 24 hours. After completion of the stirring, an excess of the reagents is removed by centrifugation three times at 6000 rpm for 20 minutes each time. For second surface treatment, the silica-polystyrene particles subjected to the first surface treatment are added to 3 mL of a THF solvent, and 113.4 mg of NBA, 123.6 mg of DCC and 73.32 mg of DMAP are added thereto, followed by stirring at room temperature for 24 hours, After completion of the stirring, an excess of the reagents is removed by centrifugation three times at 6000 rpm for 20 minutes each time.

In another embodiments, the method for preparing amphiphilic silica particles, fluorine-hydroxy surface-treated amphiphilic silica nanoparticles having a fluorine functional group introduced in first surface treatment are prepared as follows. For instance, for first surface treatment, PFOA, DCC and DMAP reagents are added to the silica-polystyrene particles dispersed in an ethanol solvent, and the mixture is stirred at room temperature (about 20° C. to 30° C.) for 24 hours. An excess of the reagents is removed by centrifugation. The silica-polystyrene particles subjected to the first surface treatment are added to a tetrahydrofuran (THF) solvent, and then stirred at room temperature (about 20° C. to 30° C.) for 24 hours to remove the polystyrene particles. Silica nanoparticles surface-treated with a fluorine-hydroxyl functional group are collected by centrifugation.

Exemplary processes of preparing fluorine-hydroxy surface-treated amphiphilic silica nanoparticles demonstrated below.

Example 13

First surface treatment, 41.4 mg of PFOA, 20.6 mg of DCC and 12.22 mg of DMAP are added to 1 mL of a solution of the silica-polystyrene particles dispersed in an ethanol solvent, and the mixture is stirred at room temperature for 24 hours. After completion of the stirring, an excess of the reagents is removed by centrifugation three times at 6000 rpm for 20 minutes each time. The silica-polystyrene particles subjected to the first surface treatment are added to a tetrahydrofuran solvent, and then stirred at room temperature for 24 hours to remove the PS particles. Fluorine-hydroxy surface-treated amphiphilic silica particles are collected by centrifugation three times at 13000 rpm for 20 minutes each time.

Example 14

The fluorine-hydroxy surface-treated amphiphilic silica nanoparticles may be prepared by the same manner as Example 13, except that the amounts of materials that are added in each step are changed, thereby preparing fluorine-hydroxy surface-treated amphiphilic silica particles. For instance, for first surface treatment, 124.2 mg of PFOA, 61.8 mg of DCC and 36.66 mg of DMAP are added to 3 mL of a solution of the silica-polystyrene particles dispersed in an ethanol solvent, and the mixture is stirred at room temperature for 24 hours. After completion of the stirring, an excess of the reagents is removed by centrifugation three times at 6000 rpm for 20 minutes each time. The silica-polystyrene particles subjected to the first surface treatment are added to a tetrahydrofuran (THF) solvent, and then stirred at room temperature for 24 hours to remove the polystyrene particles. Fluorine-hydroxy surface-treated amphiphilic silica particles are collected by centrifugation three times at 13000 rpm for 20 minutes each time.

Example 15

The fluorine-hydroxy surface-treated amphiphilic silica nanoparticles may be prepared by the same manner as Example 13, except that the amounts of materials that are added in each step are changed, thereby preparing fluorine-hydroxy surface-treated amphiphilic silica particles. For instance, for first surface treatment, 248.4 mg of PFOA, 123.6 mg of DCC and 72.66 mg of DMAP are added to 6 ml, of a solution of the silica-polystyrene particles dispersed in an ethanol solvent, and the mixture is stirred at room temperature for 24 hours. After completion of the stirring, an excess of the reagents is removed by centrifugation three times at 6000 rpm for 20 minutes each time. The silica-polystyrene particles subjected to the first surface treatment are added to a tetrahydrofuran (THF) solvent, and then stirred at room temperature for 24 hours to remove the polystyrene particles. Fluorine-hydroxy surface-treated amphiphilic silica particles are collected by centrifugation three times at 13000 rpm for 20 minutes each time.

FIGS. 11A-11D show scanning electron microscope (SEM) photographs of exemplary, particles prepared through the first surface treatment and second surface treatment processes in the step of preparing the amphiphilic silica nanoparticles of the present invention.

Figure 11A:
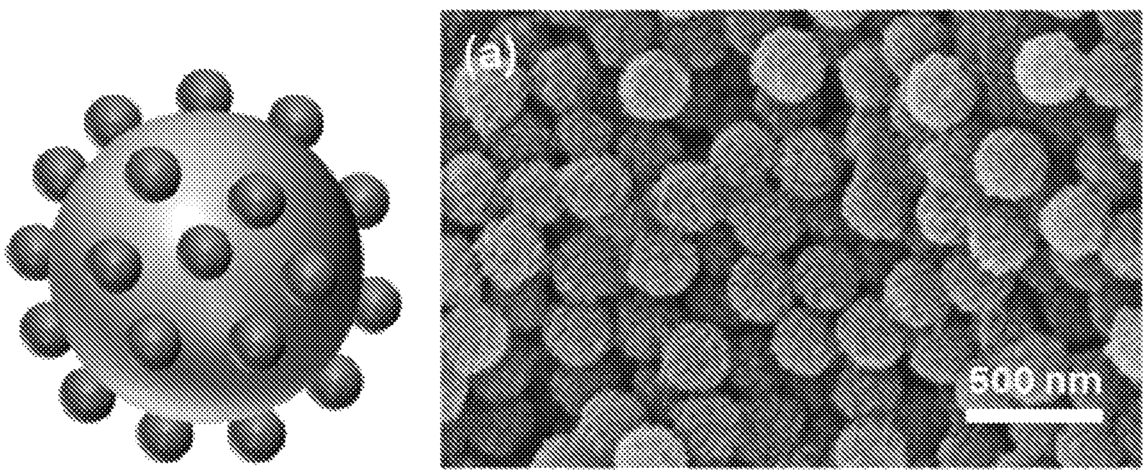
FIGS. 11A-11D show scanning electron microscope (SEM) photographs of exemplary particles prepared through the first surface treatment and second surface treatment processes in a step of preparing amphiphilic silica nanoparticles according to an exemplary embodiment of the present invention.
Figure 11B:
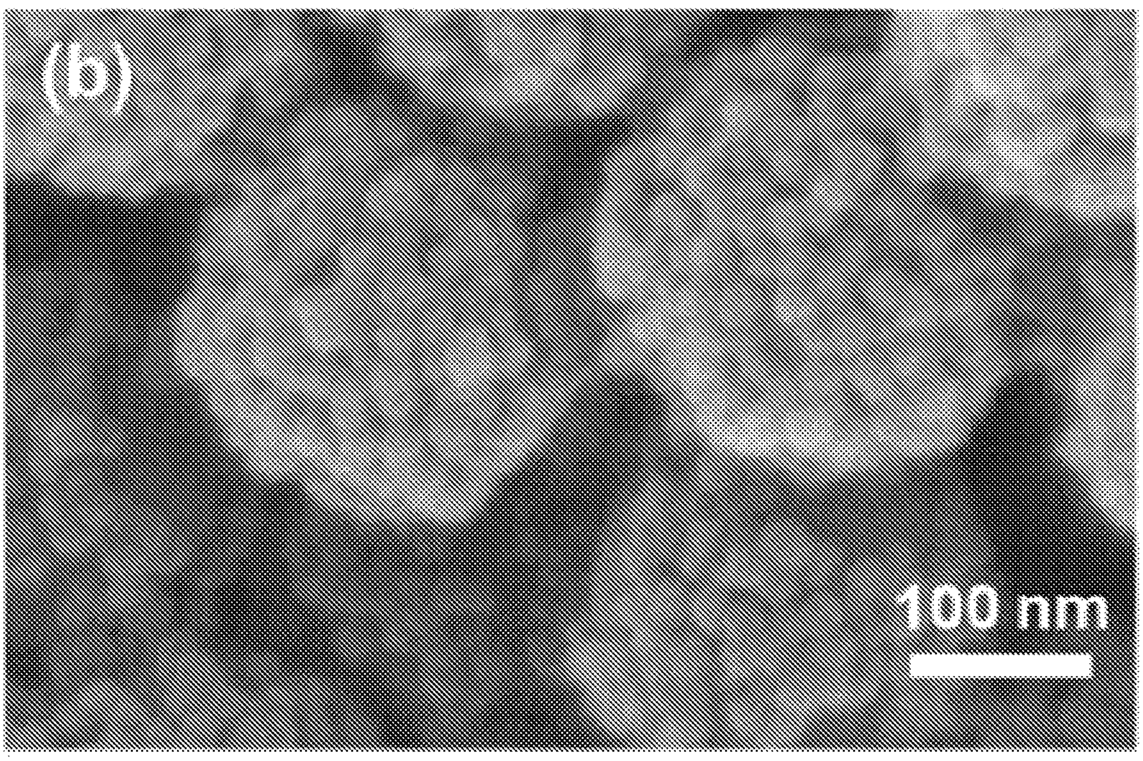
Figure 11C:
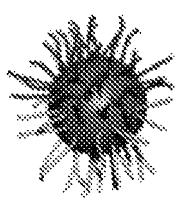
Figure 11C:
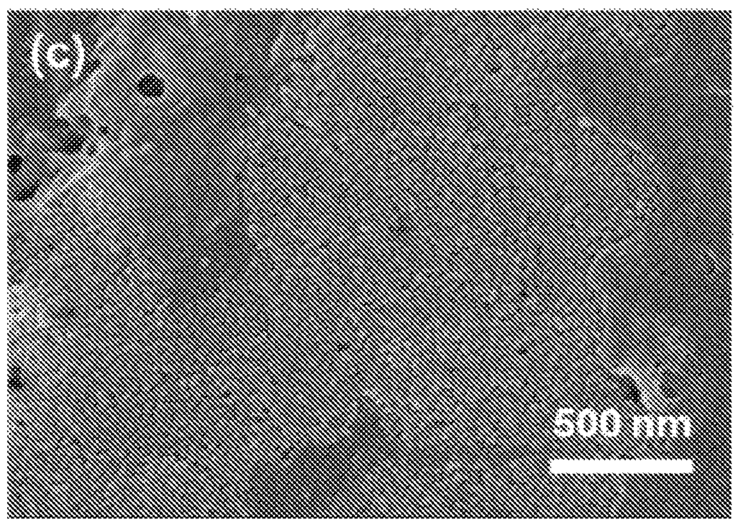
Figure 11D:
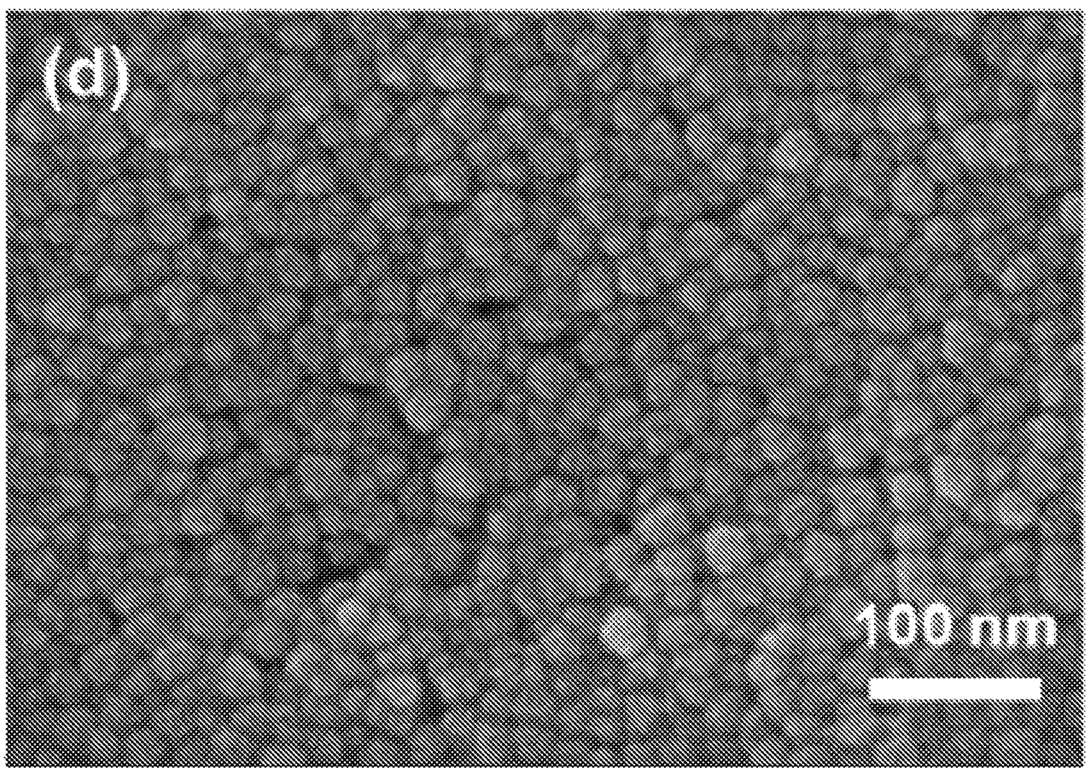

FIGS. 11A and 11B show the results of observing the shape of particles remaining after subjecting the silica-polystyrene particles to first surface treatment. As can be seen therein, the raspberry-shaped silica-polystyrene particles having silica particles attached to polystyrene particles were maintained. FIGS. 11C and 11D shows the shape of particles remaining after removing the polystyrene particles and performing second surface treatment, and as can be seen therein, the polystyrene particles were removed and only the silica nanoparticles remained.

In order to examine whether the silica nanoparticles prepared by surface treatment as described above would have amphiphilicity (hydrophobicity and hydrophilicity), a polar-nonpolar emulsion test was performed, and the results of the test are shown in FIGS. 12A-12E.

When the prepared silica nanoparticles have amphiphilicity, they function as a surfactant and hence the amphiphilicity may be indirectly confirmed by whether an emulsion is formed at the polar (water)/nonpolar (oil) interface. For this emulsion test, water as a polar solution and chloroform as a nonpolar solution were used.

Figure 12A:
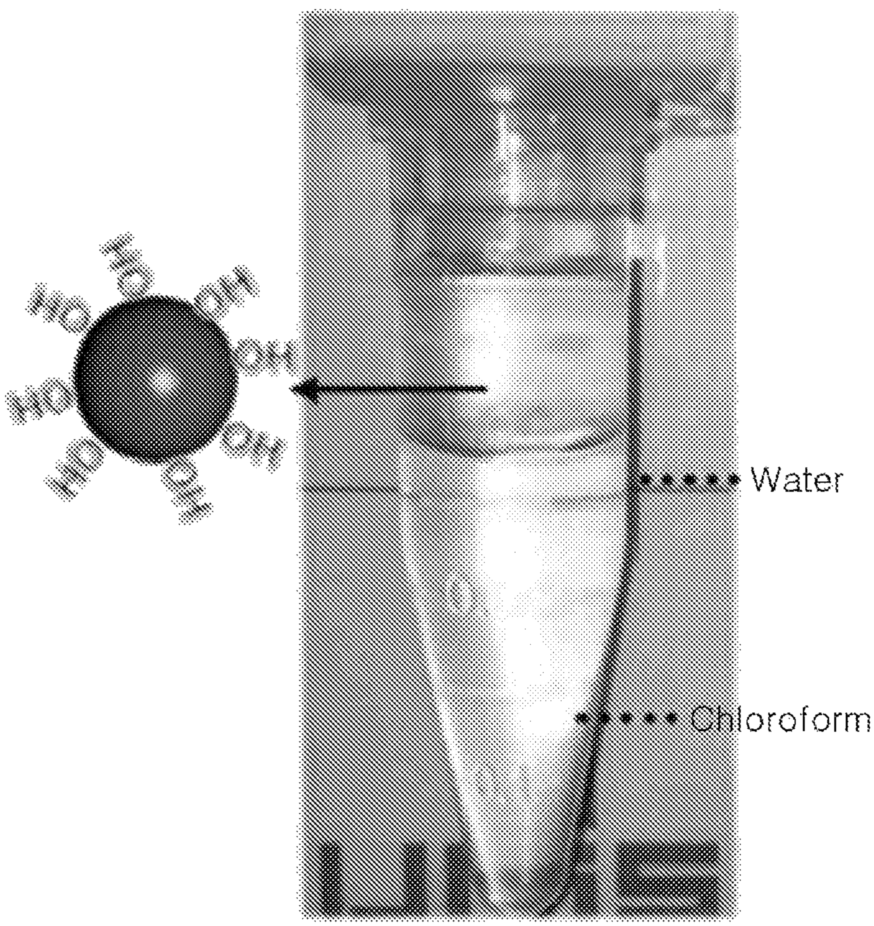
FIGS. 12A-12E show the results of testing exemplary silica nanoparticle emulsions before and after surface treatment processes in a step of preparing amphiphilic silica nanoparticles according to an exemplary embodiment of the present invention.
Figure 12B:
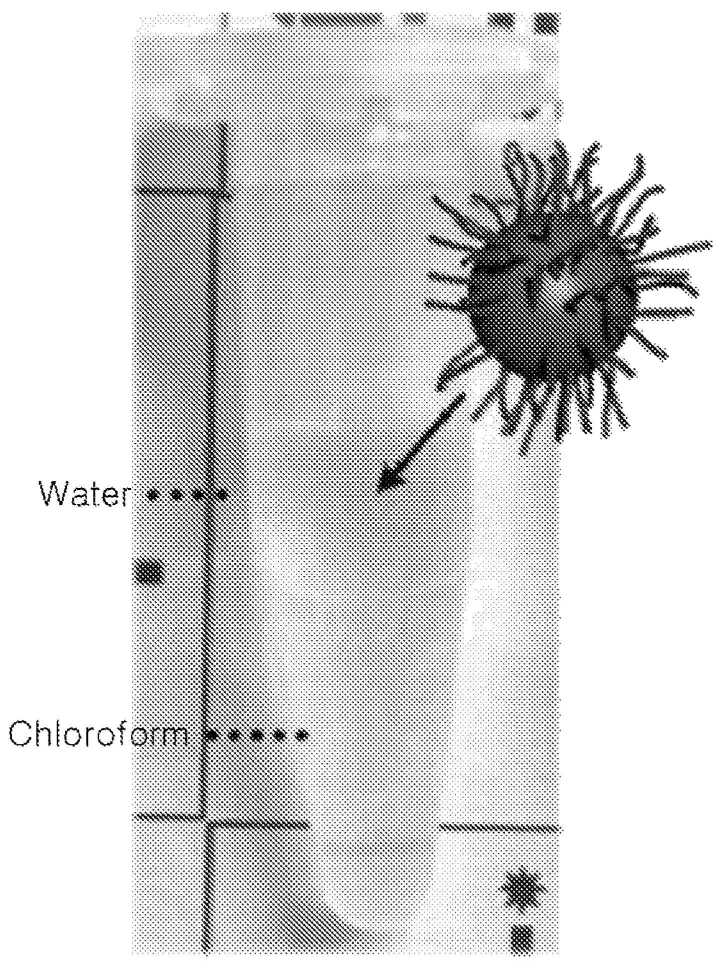
Figure 12C:
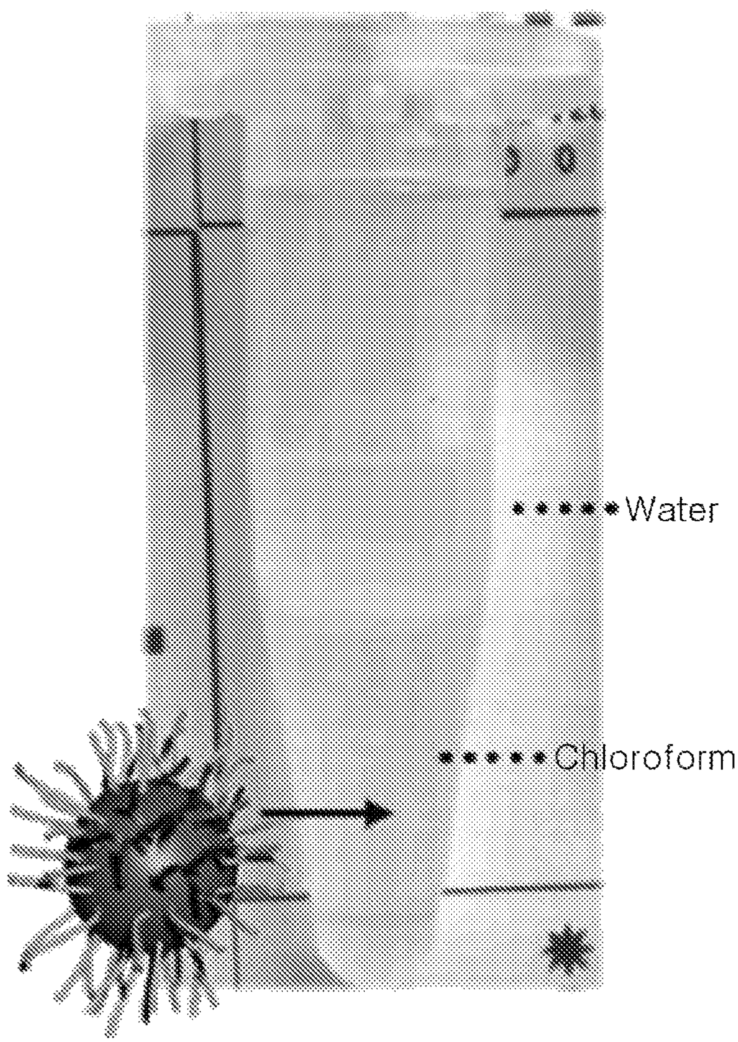
Figure 12D:
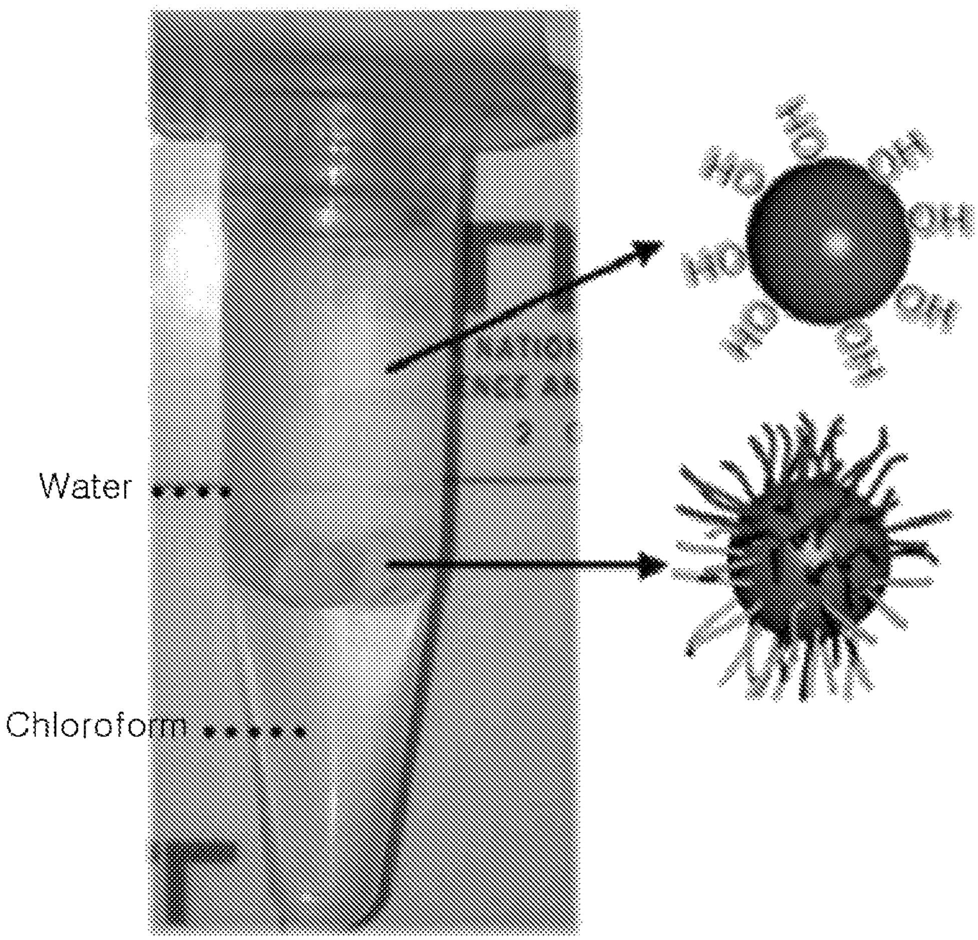
Figure 12E:
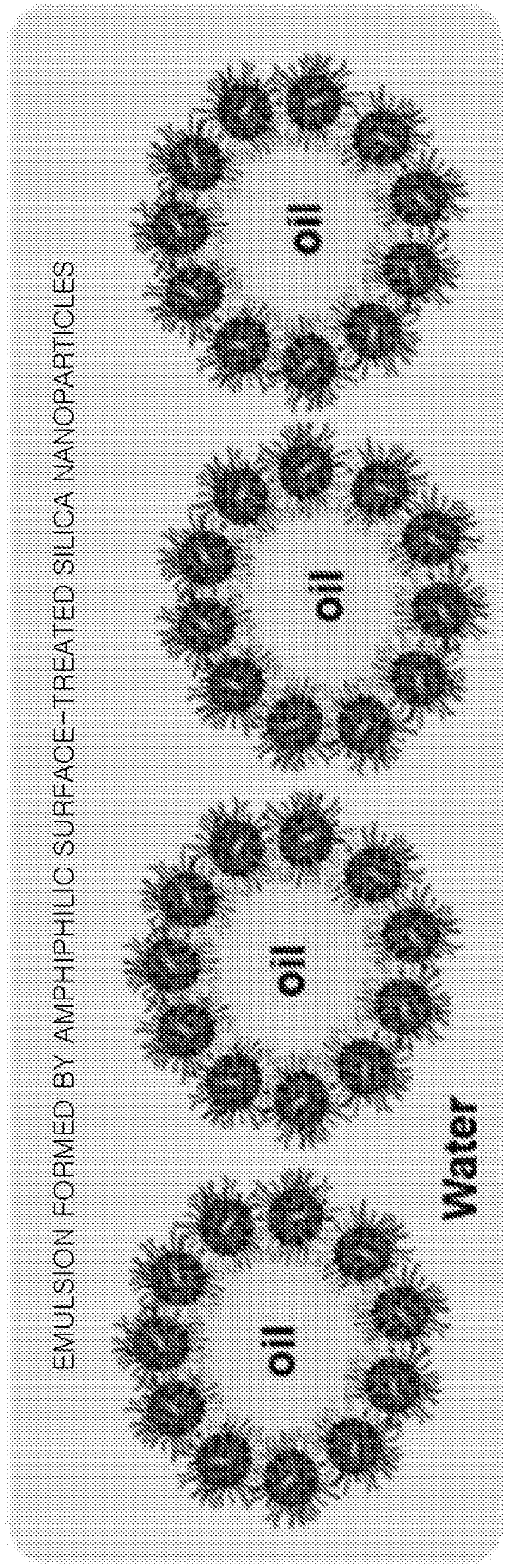

FIG. 12A shows silica nanoparticles before surface treatment; FIG. 12B shows silica nanoparticles surface-treated only with an amine functional group; FIG. 12C shows silica nanoparticles surface-treated only with a fluorine functional group; FIG. 12D shows amphiphilic silica nanoparticles surface-treated with amine-fluorine; and FIG. 12E is a schematic view showing an emulsion formed by amphiphilic surface-treated silica nanoparticles.

As a result, as shown in FIG. 12D, it can be seen that only amphiphilic surface-treated silica nanoparticles formed an emulsion. This result suggests that amphiphilic silica nanoparticles were successfully formed by the Examples of the present invention.

In step (d) of preparing the polyurethane-silica composite-based heat-curable coating composition (S400), the amphiphilic silica nanoparticles prepared in the step (S300) of preparing the amphiphilic silica nanoparticles may be mixed with polyurethane, thereby preparing polyurethane-silica composite-based heat-curable coating composition.

In an exemplary embodiment, the polyurethane-silica composite-based heat-curable coating composition may be prepared by mixing polyurethane (provided from Noroo Bee Chemical Co., Ltd.) with a curing agent at a predetermined ratio, and adding and mixing surface-treated silica nanoparticles, dispersed in 0.5 mL of tetrahydrofuran (THF), with the mixture solution. Particularly, the components and their contents of each polyurethane-silica composite-based heat-curable coating composition are shown in Table 4 below.

Next, in step (e) of forming the polyurethane-silica composite film (S500), the polyurethane-silica composite film may be formed by applying the prepared polyurethane-silica composite-based heat-curable coating composition to the surface of a specific substrate and curing the applied composition.

Figure 13:
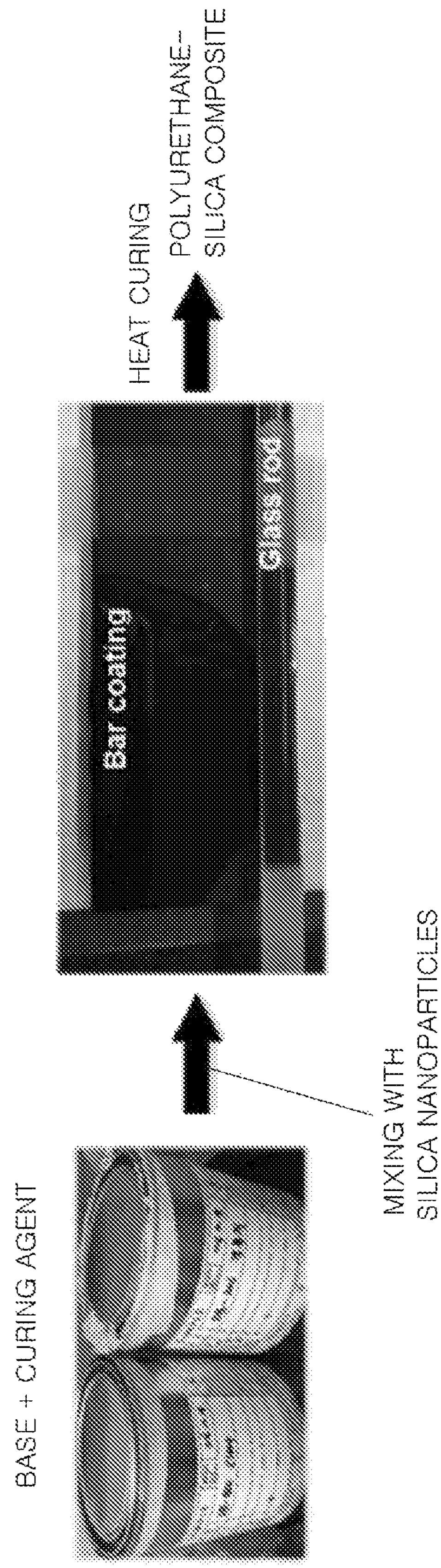
FIG. 13 shows an exemplary process of an exemplary polyurethane-silica composite film by bar coating according to an exemplary embodiment of the present invention.

In an exemplary embodiment, as shown in FIG. 13, each polyurethane-silica composite-based heat-curable coating composition prepared to have the components and contents shown in Table 4 below may be bar-coated on an acrylonitrile-butadiene-styrene (ABS) substrate by a glass rod and cured at a temperature of about 60 to 90° C., thereby obtaining a polyurethane-silica composite film.

Here, the thickness of the obtained polyurethane-silica composite film varies depending on the amounts of polyurethane and curing agent used and the weight proportion of the silica nanoparticles in the polyurethane-silica composite-based heat-curable coating composition.

TABLE 4

| | Composite 1 | Composite 2 | Composite 3 | Composite 4 |
|---|---|---|---|---|
| Polyurethane | 1.5 g | 0.3 g | 0.3 g | 0.15 g |
| Curing agent | 0.5 g | 0.1 g | 0.1 g | 0.05 g |
| Silica nanoparticles | 0.006 g | 0.006 g | 0.024 g | 0.024 g |
| Film thickness | 40 μm | 20 μm | 20 μm | 10 μm |
| Weight proportion of silica nanoparticles | 0.3 wt % | 1.5 wt % | 5.7 wt % | 10.7 wt % |

Figure 14A:
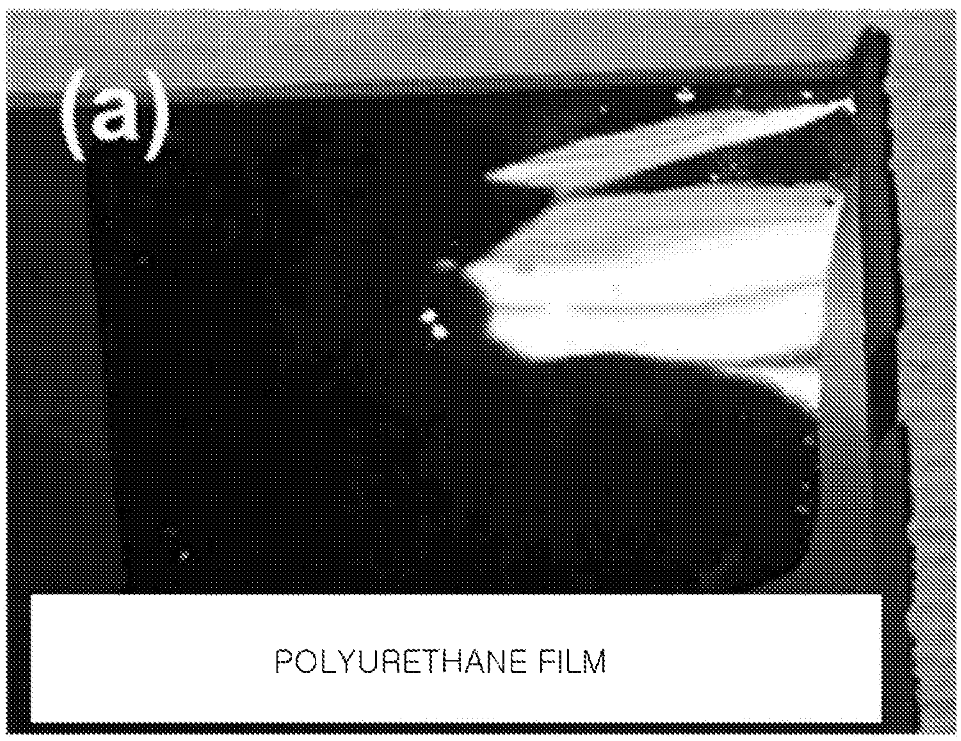
FIGS. 14A-14E and 15A-15B show the results of measuring the transmittances of exemplary polyurethane-silica composite films according to an exemplary embodiment of the present invention.
Figure 14B:
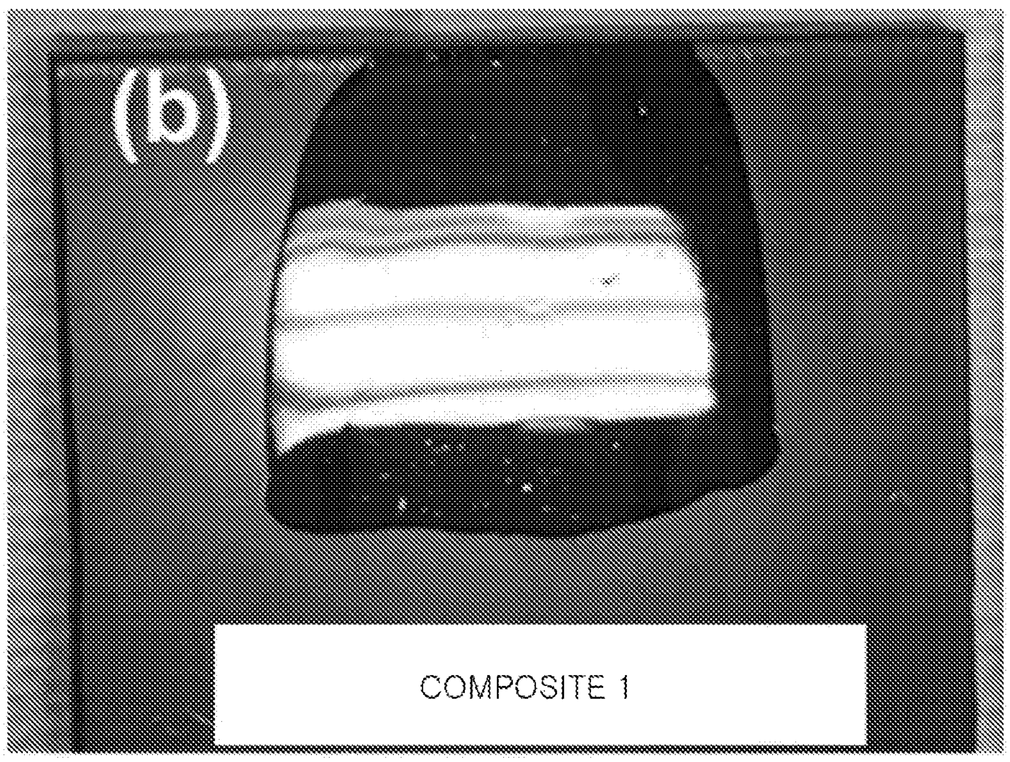
Figure 14C:
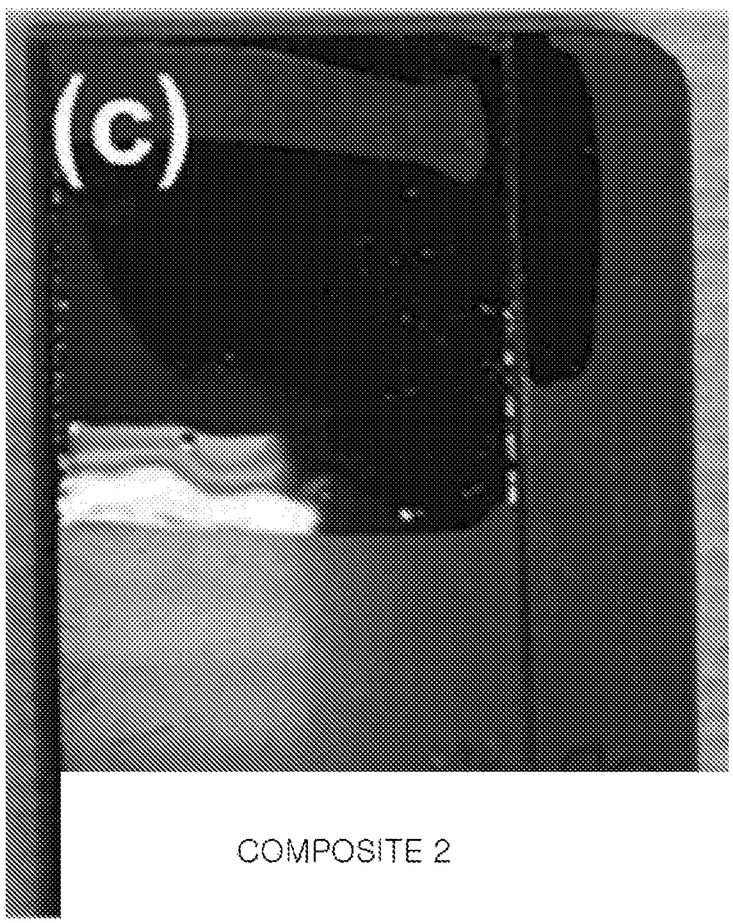
Figure 14D:
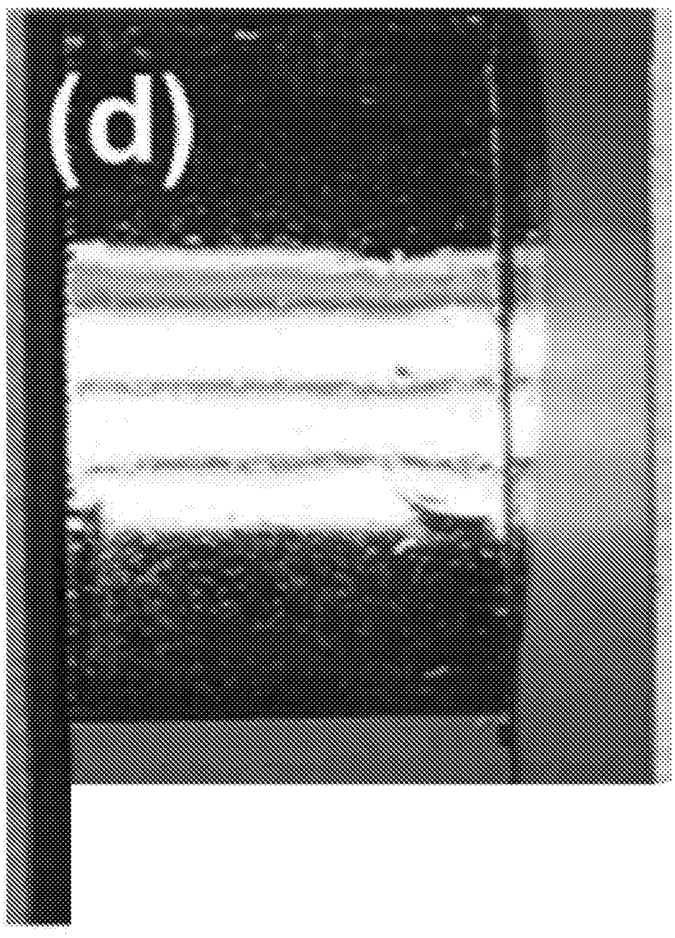
Figure 14E:
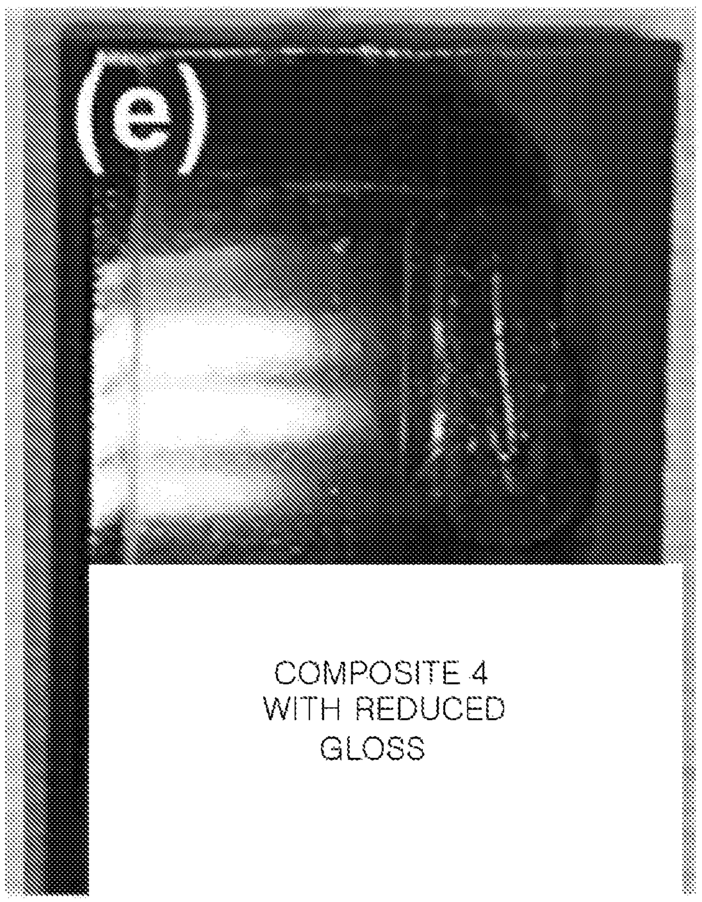

FIGS. 14A-14E show the change in gloss of the polyurethane-silica composite film with a change in the weight proportion of amphiphilic silica nanoparticles. For instance, FIG. 14A shows the transmittance of a conventional polyurethane film; FIG. 14B shows the transmittance of the polyurethane-silica composite film formed using the polyurethane-silica composite-based heat-curable coating composition of composite 1; FIG. 14C shows the transmittance of the polyurethane-silica composite film formed using the polyurethane-silica composite-based heat-curable coating composition of composite 2; FIG. 14D shows the transmittance of the polyurethane-silica composite film formed using the polyurethane-silica composite-based heat-curable coating composition of composite 3; and FIG. 14E shows the transmittance of the polyurethane-silica composite film formed using the polyurethane-silica composite-based heat-curable coating composition of composite 4. Here, the transmittance was measured by UV-Vis spectroscopy.

As shown in FIGS. 14A to 14E, apparently transparent films were prepared regardless of the type of amphiphilic silica nanoparticles.

Figure 15A:
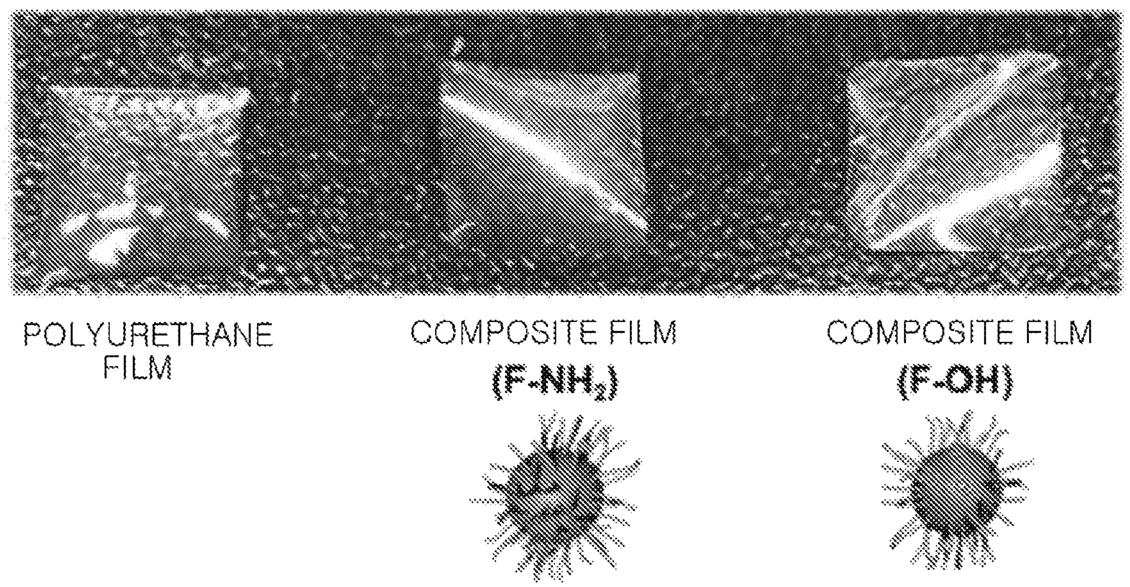
Figure 15B:
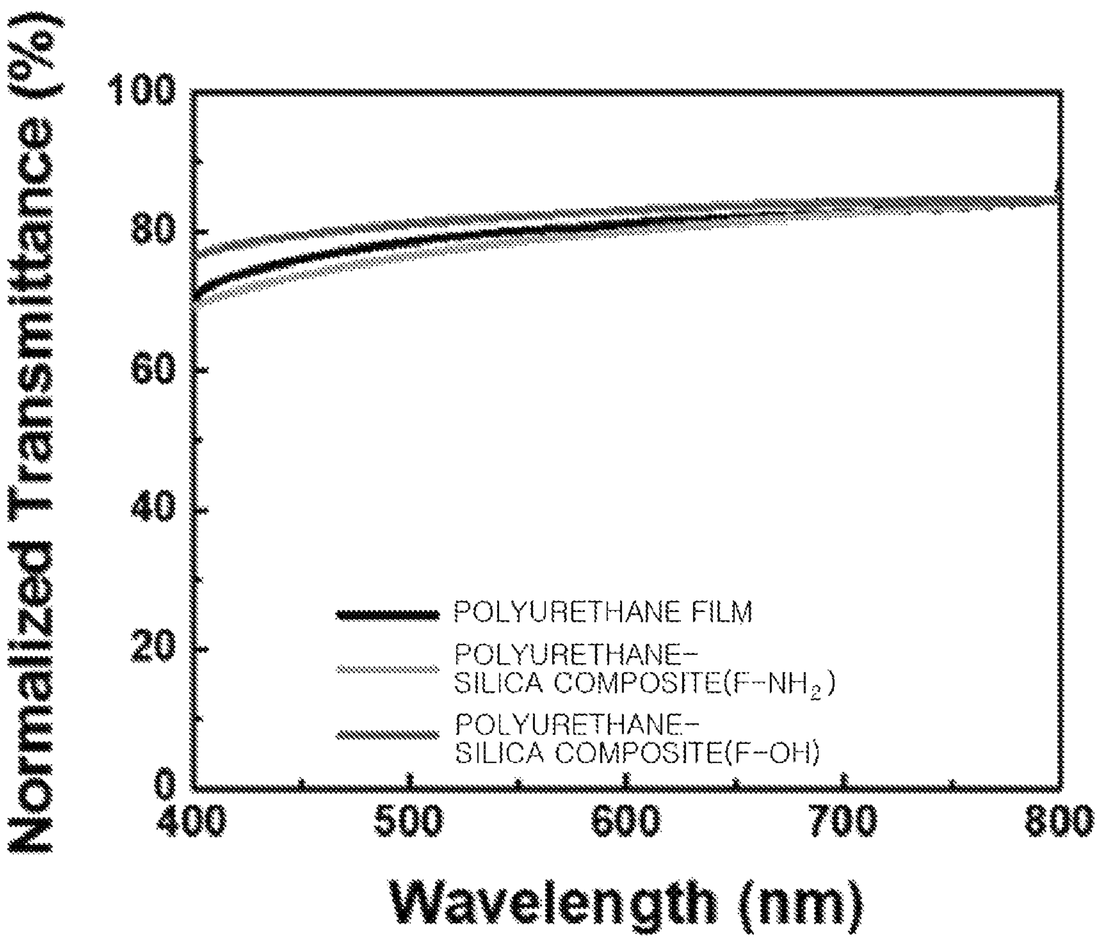

As shown in FIGS. 15A-15B, the films showed a similar tendency. This suggests that the amphiphilic silica nanoparticles have no effect on the transparency of the polyurethane film.

However, the polyurethane-silica composite film corresponding to composite 4 containing 10.7 wt % of the silica nanoparticles showed apparently low gloss. Here, the thickness of the formed film was measured to be 10 μm.

Accordingly, since the polyurethane-silica composite film which is prepared in the present invention should retain the gloss of a conventional polyurethane film, the surface characteristics of films formed using the coating compositions of composites 1 to 3 and the phase separation of the polyurethane-silica composite films formed using different types of silica nanoparticles were examined.

Figure 16:
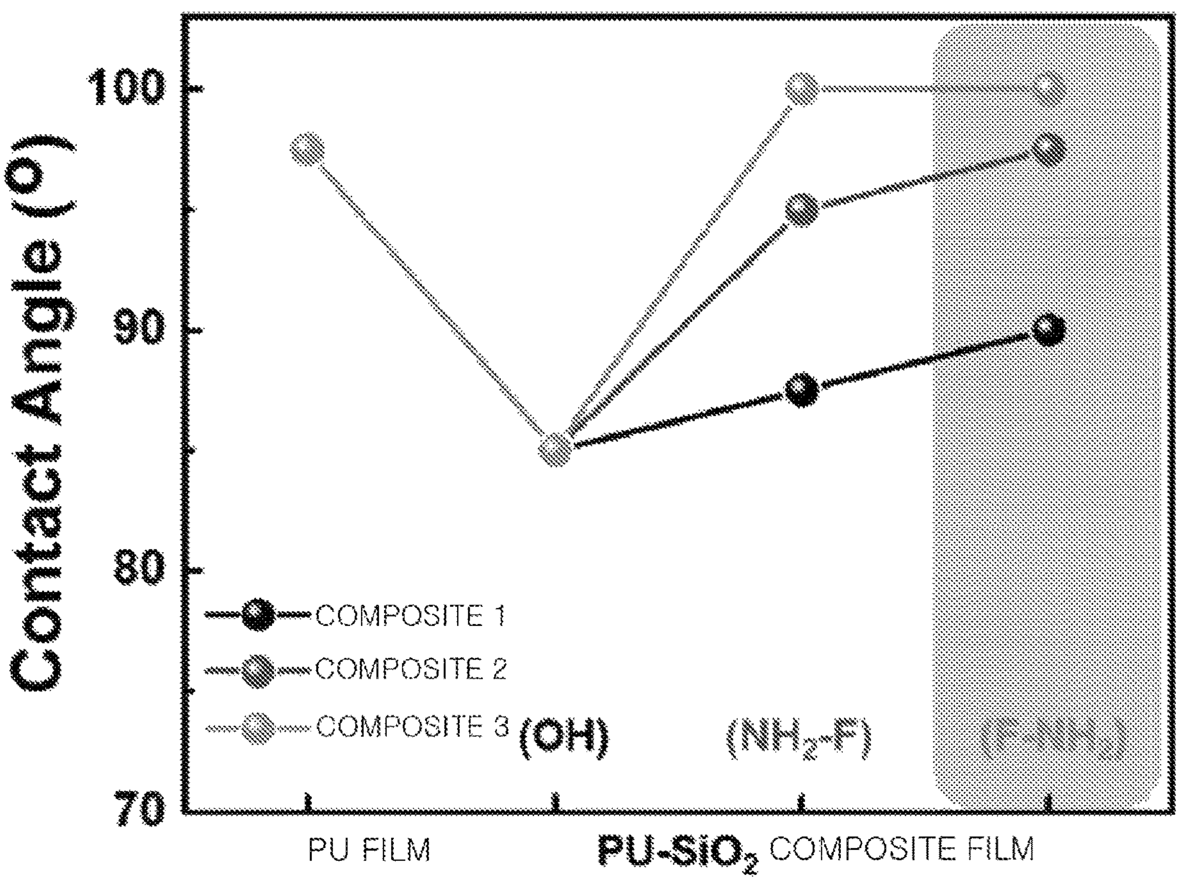
FIG. 16 shows the results of measuring contact angles of exemplary polyurethane-silica composite films according to an exemplary embodiment of the present invention.

FIG. 16 shows the results of measuring the water contact angles of polyurethane-silica composite films. Particularly, FIG. 16 shows the contact angle properties of polyurethane-silica composite films formed by using non-surface-treated silica nanoparticles (hereinafter also referred to as 'OH'), amine-fluorine surface-treated amphiphilic silica nanoparticles (hereinafter also referred to as '$NH_2$—F'), or fluorine-amine surface-treated amphiphilic silica nanoparticles (hereinafter also referred to as 'F—$NH_2$') and curing at a temperature of 80° C.

As shown in FIG. 16, the contact angle of the surface of the polyurethane-silica composite film formed using surface-treated amine-fluorine surface-treated amphiphilic silica nanoparticles ($NH_2$—F) or fluorine-amine surface-treated amphiphilic silica nanoparticles (F—$NH_2$) was measured to be greater than that of the polyurethane-silica composite film formed using the non-surface-treated silica nanoparticles (OH). Among these films, the polyurethane-silica composite film formed using the fluorine-amine surface-treated amphiphilic silica nanoparticles (F—$NH_2$) surface-treated with a relatively large amount of a fluorine functional group was measured to have a relatively high contact angle. In addition, as the amount of the surface-treated amphiphilic silica nanoparticles increased, the contact angle of the polyurethane-silica composite film showed a tendency to increase.

These results of measurement of the contact angle properties indirectly suggest that phase separation of the amphiphilic silica nanoparticles in the exemplary polyurethane-silica composite film may occur.

In order to examine the surface characteristics of the polyurethane-silica composite film, the image of the surface of the film was observed by atomic force microscopy (AFM), and the results are shown in FIGS. 17 and 18.

Figure 17A:
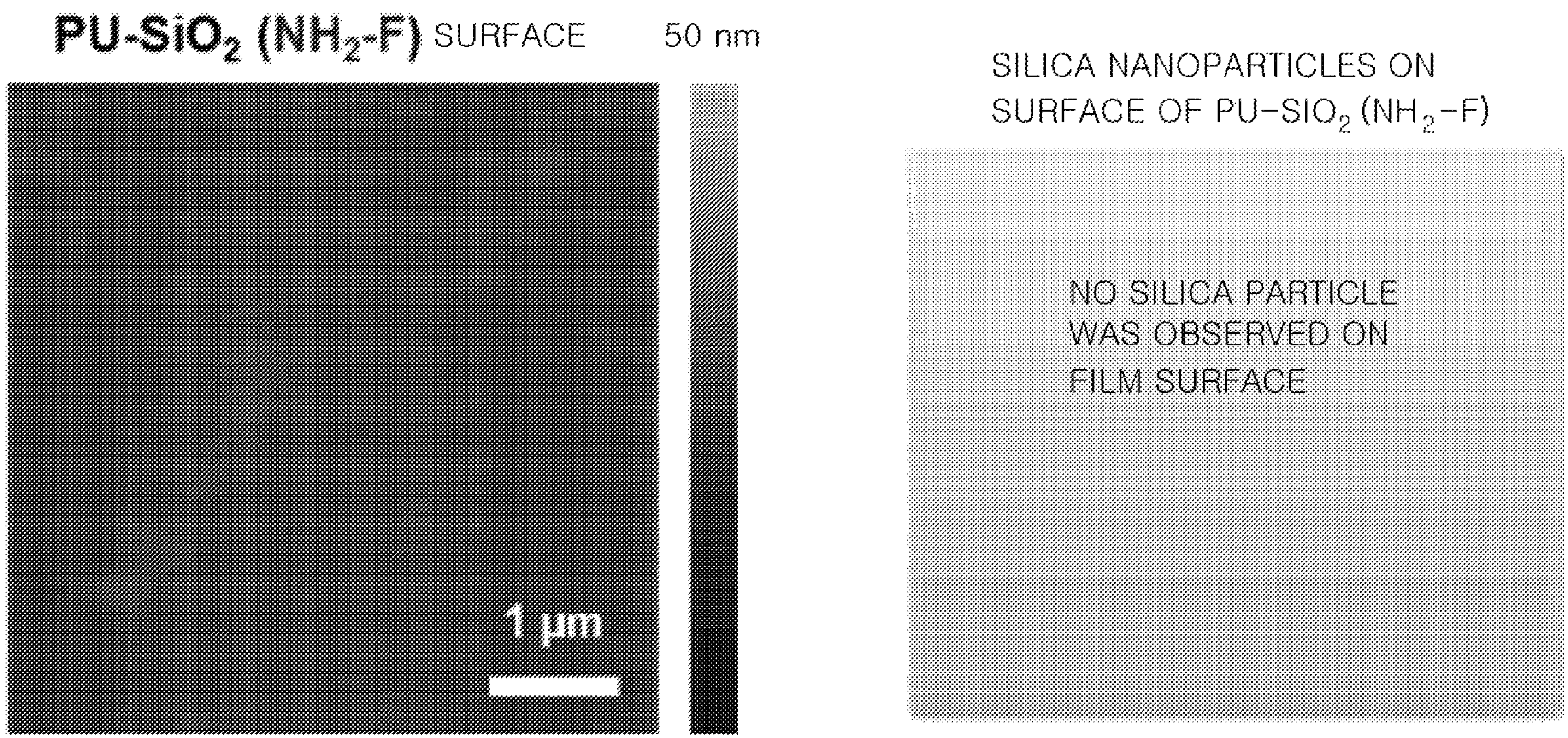
FIGS. 17A, 17B, 18A and 18B show atomic force microscopy (AFM) photographs of exemplary polyurethane-silica composite film surfaces according to an exemplary embodiment of the present invention.
Figure 17B:
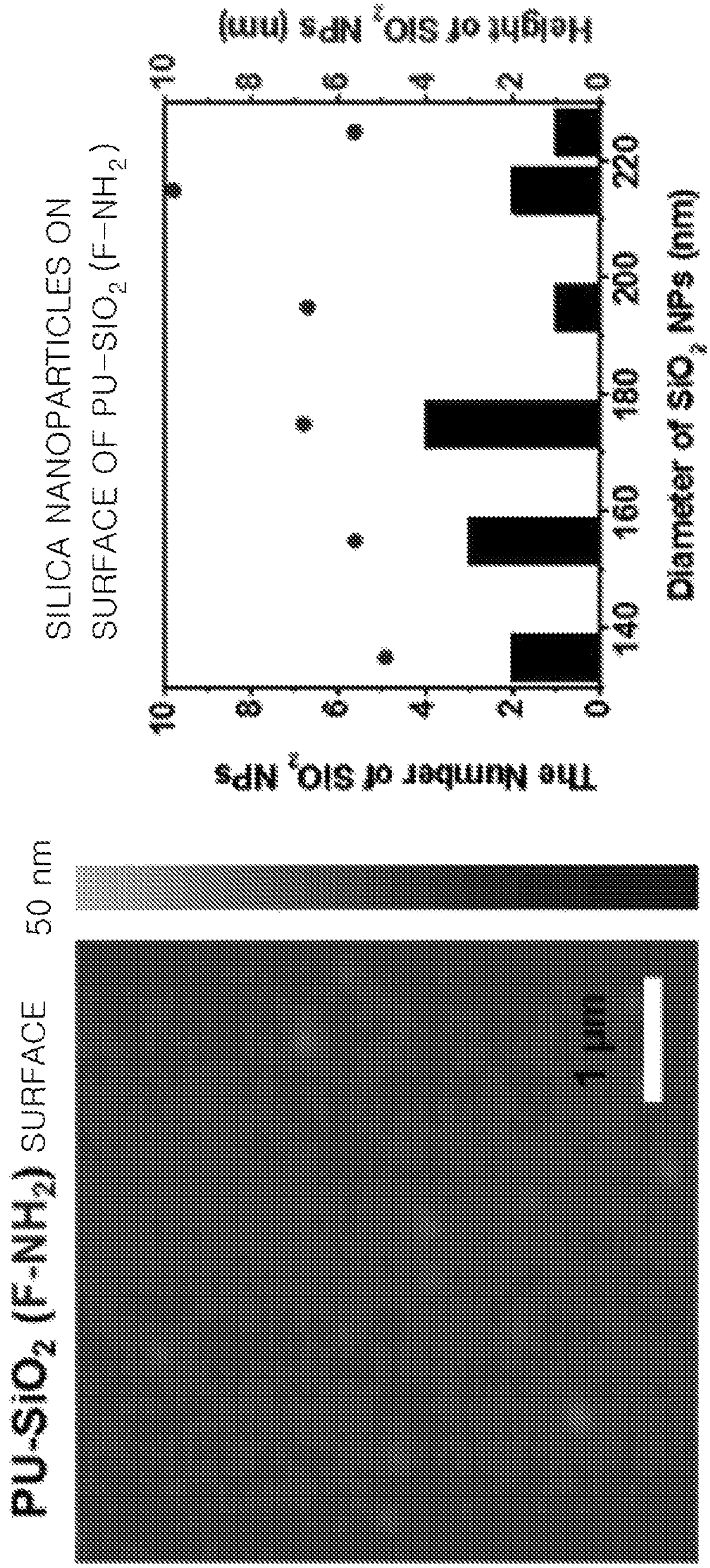

FIG. 17A shows the polyurethane-silica composite film prepared by curing the polyurethane-silica composite-based heat-curable coating composition containing 0.3 wt % of amine-fluorine surface-treated amphiphilic silica nanoparticles ($NH_2$—F) at a temperature of 80° C., and FIG. 17B shows the polyurethane-silica composite film prepared by curing the polyurethane-silica composite-based heat-curable coating composition containing 0.3 wt % of fluorine-amine surface-treated amphiphilic silica nanoparticles (F—$NH_2$) at a temperature of 80° C.

As shown in FIGS. 17A-17B, on the surface of the polyurethane-silica composite film formed using the amine-fluorine surface-treated amphiphilic silica nanoparticles silica nanoparticles could not be observed, whereas, on the surface of the polyurethane-silica composite film formed using the fluorine-amine surface-treated amphiphilic silica nanoparticles (F—$NH_2$), silica nanoparticles could be observed, and at this time; the height of the silica nanoparticles on the film surface was measured to be 4 to 10 nm.

Figure 18A:
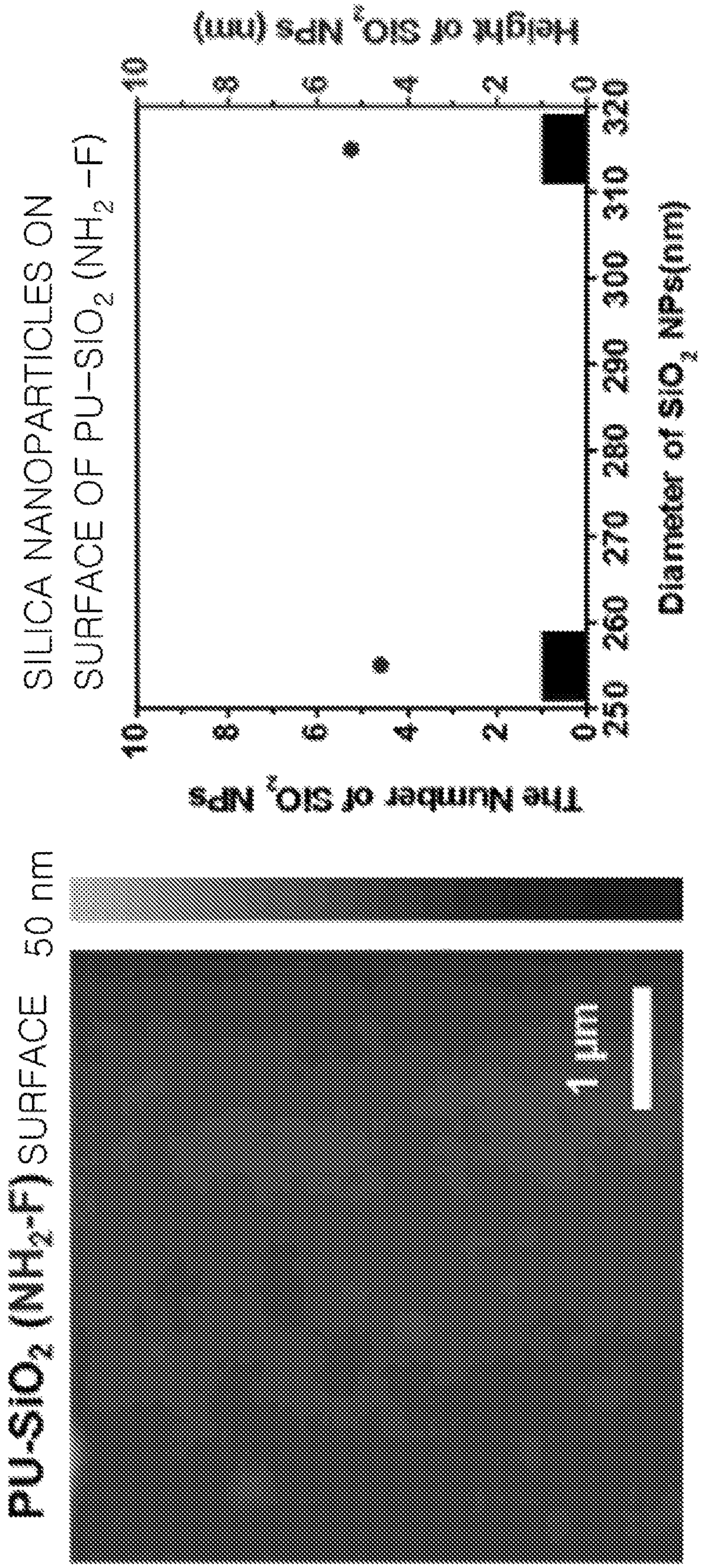
Figure 18B:
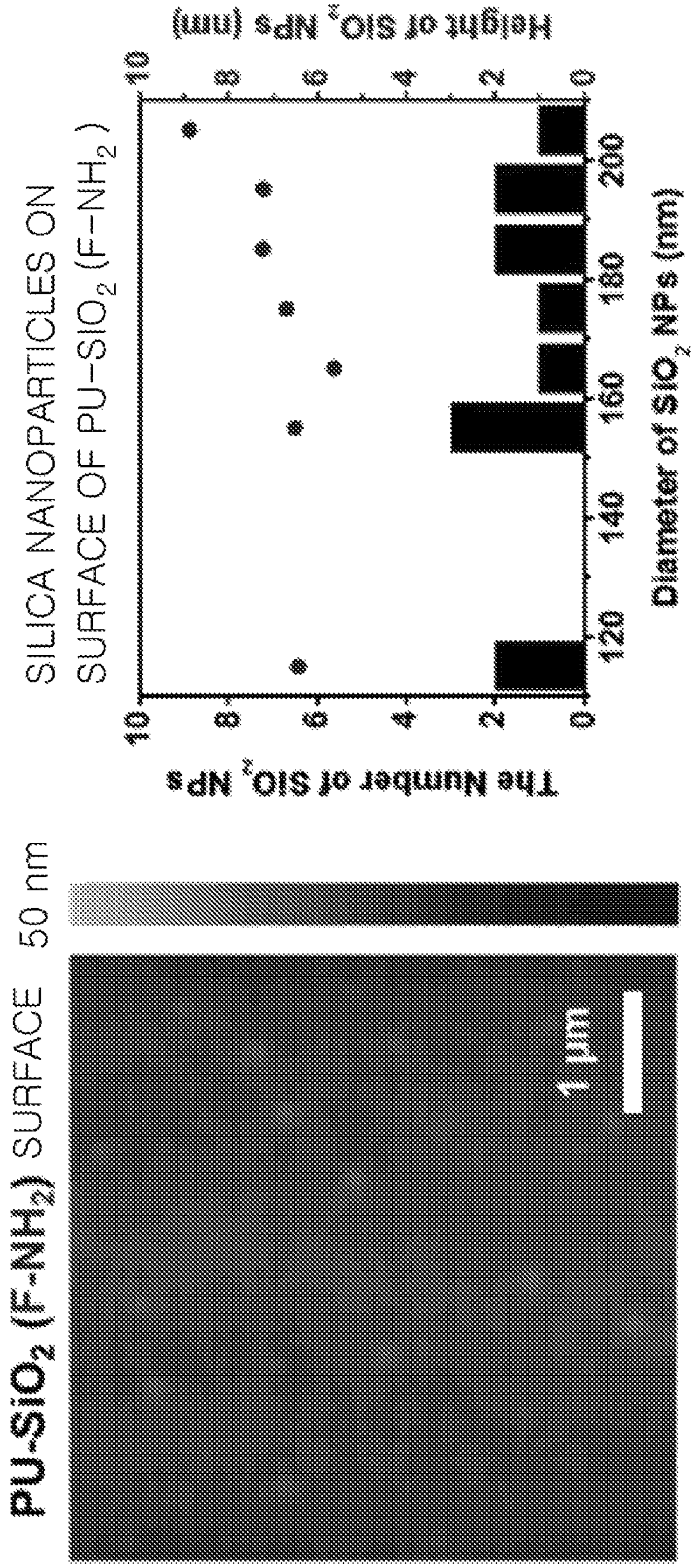

FIG. 18A shows the polyurethane-silica composite film prepared by curing the polyurethane-silica composite-based heat-curable coating composition containing 5.7 wt % of the amine-fluorine amphiphilic silica nanoparticles ($NH_2$—F) at a temperature of 80° C., and FIG. 18B shows the polyurethane-silica composite film prepared by curing the polyurethane-silica composite-based heat-curable coating composition containing 5.7 wt % of the fluorine-amine amphiphilic silica nanoparticles (F—$NH_2$) at a temperature of 50° C.

As shown in FIGS. 18A-18B, when the amount of the amphiphilic silica nanoparticles was increased, silica nanoparticles could be observed on the surfaces of both the polyurethane-silica composite film formed using the amine-fluorine surface-treated amphiphilic silica nanoparticles ($NH_2$—F) and the polyurethane-silica composite film formed using the fluorine-amine surface-treated amphiphilic silica nanoparticles (F—$NH_2$). In this case, the height of the silica nanoparticles observed on the film surface was measured to be about 4 to 6 nm for the polyurethane-silica composite film formed using the amine-fluorine surface-treated amphiphilic silica nanoparticles ($NH_2$—F), and was measured to be about 4 to 10 nm for the polyurethane-silica composite film formed using the fluorine-amine surface-treated amphiphilic silica nanoparticles (F—$NH_2$).

Figure 19:
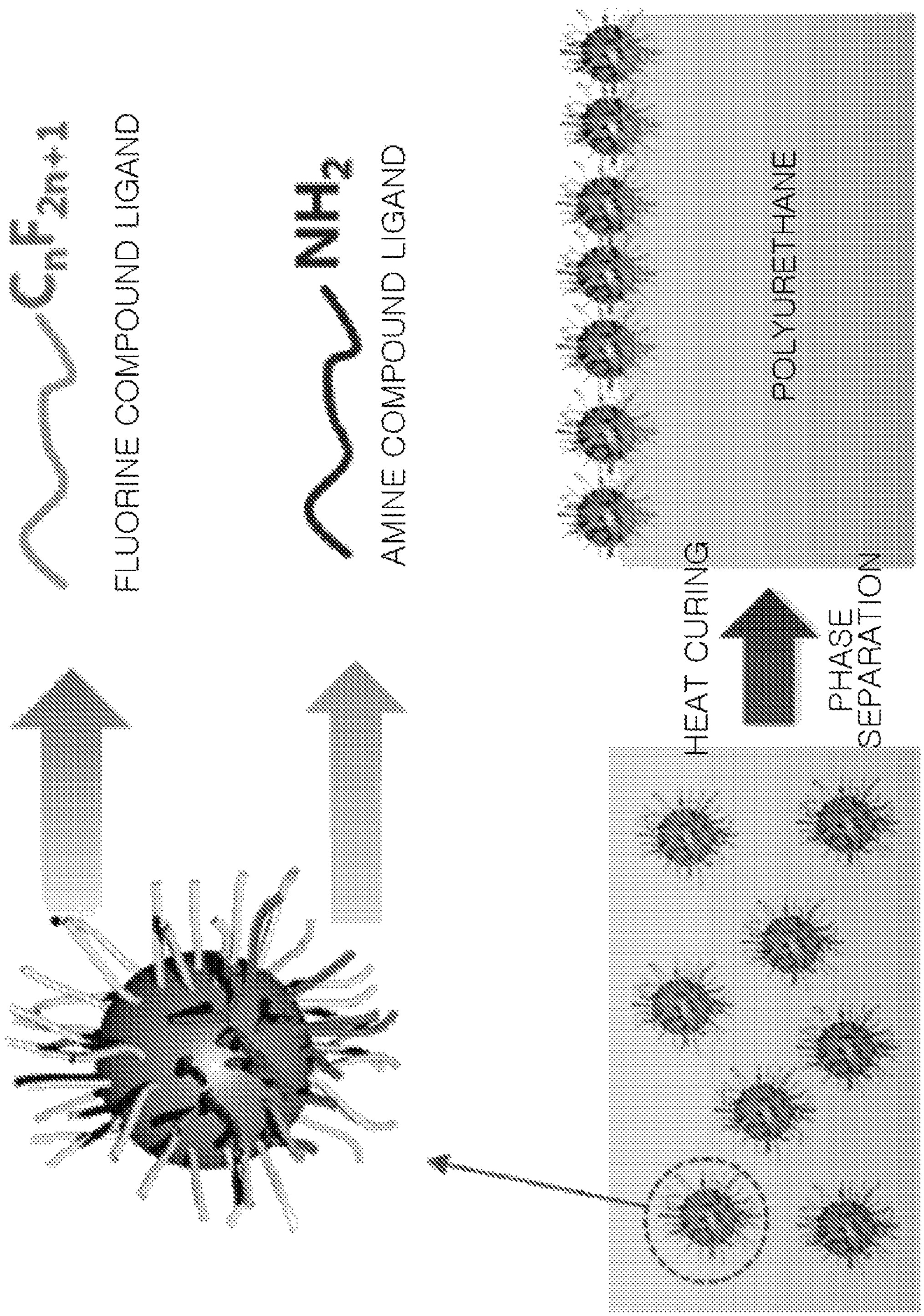
FIG. 19 shows phase separation of exemplary amphiphilic silica nanoparticles in a step of preparing a polyurethane-silica composite film according to an exemplary embodiment of the present invention.

These results suggest that the phase separation of amphiphilic silica nanoparticles in the polyurethane-silica composite film formed using the surface-treated amphiphilic silica nanoparticles may occur. In particular, the phase separation of silica nanoparticles in the polyurethane-silica composite film formed using the fluorine-amine surface-treated silica nanoparticles may occur easily. This phase separation in the polyurethane-silica composite film is illustrated in FIG. 19.

Figure 20A:
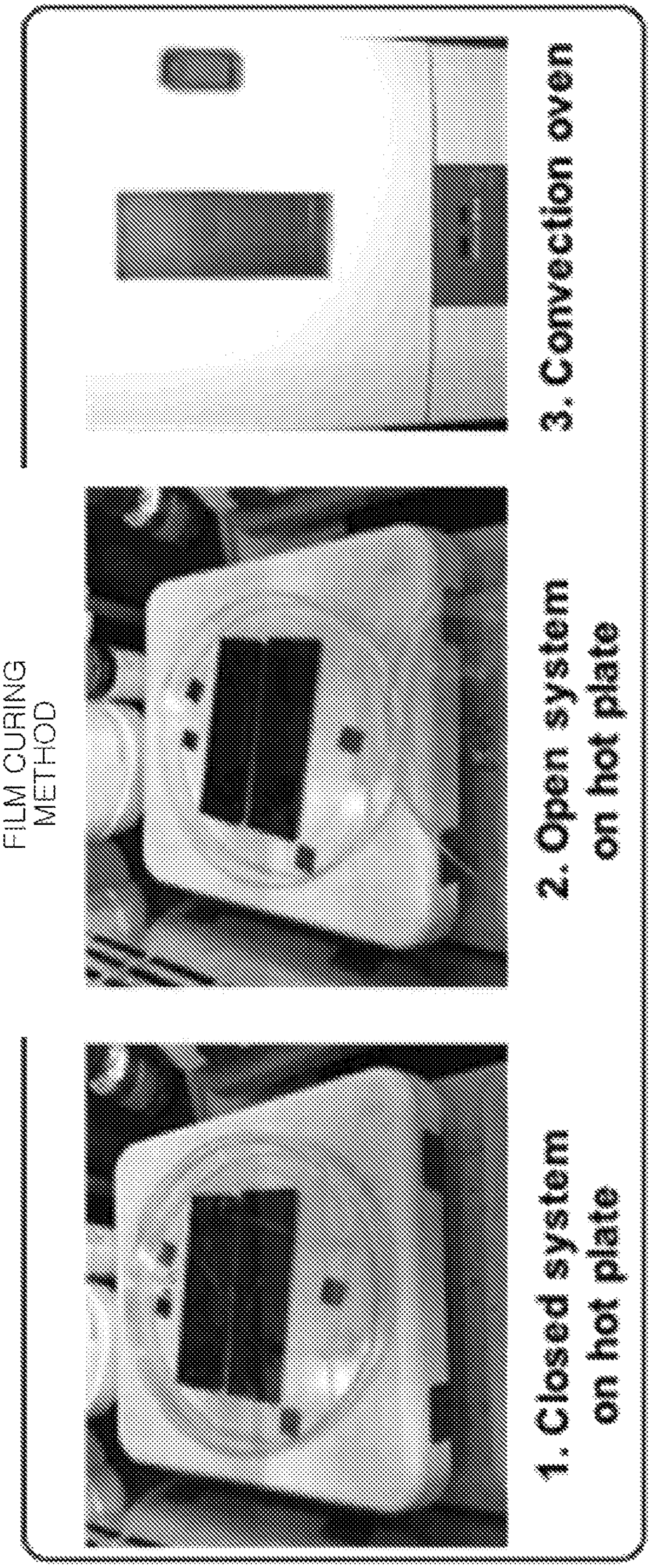
FIGS. 20A-20C show contact angle properties with varying kinds of exemplary amphiphilic silica nanoparticles and varying curing methods according to an exemplary embodiment of the present invention.

In addition, in order to compare effective phase separation between various curing methods in the step (S500) of preparing the polyurethane-silica composite film, as shown in FIG. 20A, polyurethane-silica composite films were prepared using 5.7 wt % of the fluorine-amine surface-treated amphiphilic silica nanoparticles (F—$NH_2$) and various curing methods. As the curing methods (1-3), a close system on a hot plate, an open system on a hot plate, and a convection oven were used for measurement.

Although not shown in the figures, when comparing the contact angle properties of the polyurethane-silica composite films prepared by the various preparation methods, the polyurethane-silica composite film cured by the open system on the hot plate was measured to have a relatively high contact angle.

In addition, in order to examine contact angle properties in various silica nanoparticle sizes, silica nanoparticles having sizes of about 20 nm and 50 nm were subjected to amphiphilic surface treatment, and these particles were mixed according to the composition of composite 3, thereby preparing polyurethane-silica composite films. The contact angle properties of the prepared films were measured.

As a result, the size of the silica nanoparticle sizes had no great effect on the contact angle because an uneven surface structure may not be formed due to the agglomeration of the phase-separated silica nanoparticles as shown in the atomic force microscopy (AFM) of FIGS. 18A-18B.

Furthermore, in order to examine the effect of the fluorine-amine surface-treated or fluorine-hydroxy surface-treated silica nanoparticles on phase separation, polyurethane-silica composite films may be prepared using the fluorine-amine surface-treated amphiphilic silica nanoparticles (F—$NH_2$) and the fluorine-hydroxy surface-treated amphiphilic silica nanoparticles (F—OH), respectively. The contact angle properties of the prepared films were compared, and the results are shown in 20B and 20C, respectively.

Figure 20B:
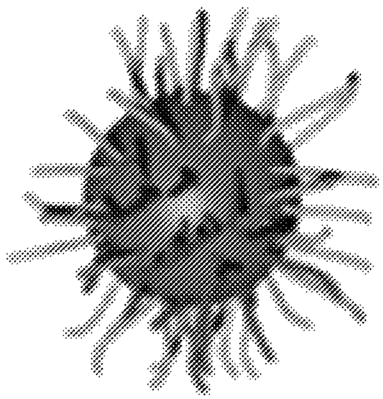
Figure 20C:
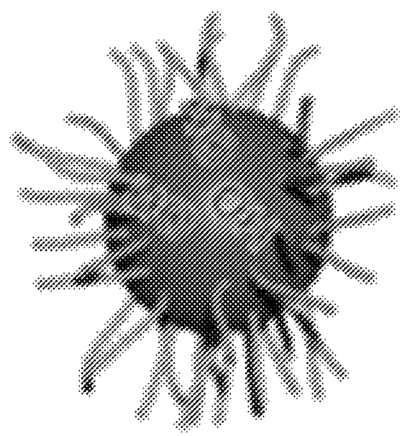

As shown in FIGS. 20B and 20C, the polyurethane-silica composite film prepared using the fluorine-amine surface-treated amphiphilic silica nanoparticles was measured to have a relatively high contact angle.

Figure 21A:
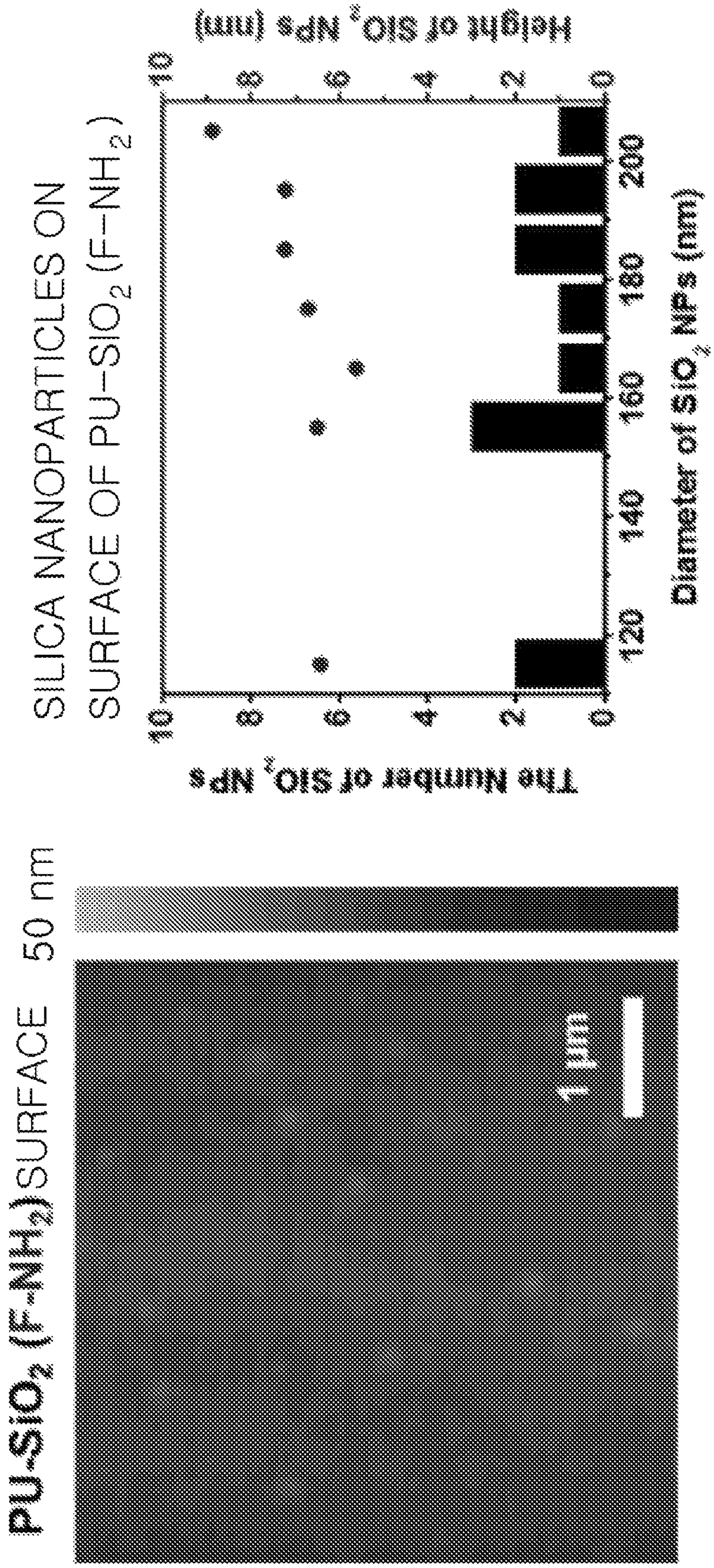
FIGS. 21A-21B show atomic force microscopy (AFM) photographs of exemplary, polyurethane-silica composite films according to an exemplary embodiment of the present invention.
Figure 21B:
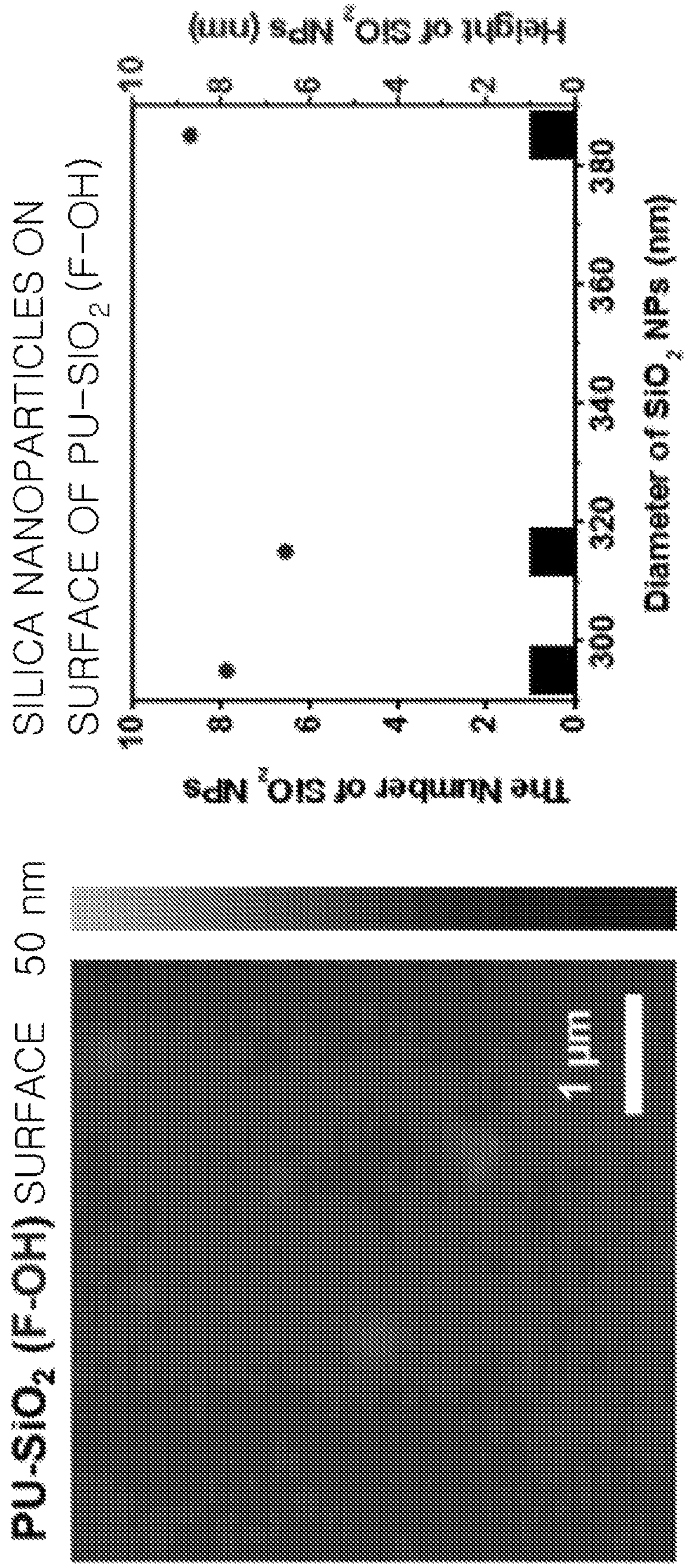

FIGS. 21A-21B show the atomic force microscopy (AFM) images of the surfaces of the polyurethane-silica composite films prepared using the fluorine-amine surface-treated amphiphilic silica nanoparticles (F—$NH_2$) and the fluorine-hydroxy surface-treated amphiphilic silica nanoparticles (F—OH), respectively.

As shown in FIG. 21A, silica nanoparticles could be observed on the surfaces of both the polyurethane-silica composite film prepared using the fluorine-amine amphiphilic silica nanoparticles (F—$NH_2$) and the polyurethane-silica composite film prepared using the fluorine-hydroxy surface-treated amphiphilic silica nanoparticles (F—OH). When comparing the amount of the silica nanoparticles observed on the film surface, a relatively large amount of the silica nanoparticles was observed on the polyurethane-silica composite film prepared using the fluorine-amine surface-treated amphiphilic silica nanoparticles (F—$NH_2$). In addition, the height of the silica nanoparticles observed on the film surface was measured to be about 4 to 10 nm for the polyurethane-silica composite film prepared using the fluorine-amine surface-treated amphiphilic silica nanoparticles (F—$NH_2$), but was measured to be about 6 to 19 nm for the polyurethane-silica composite film prepared using the fluorine-hydroxy surface-treated amphiphilic silica nanoparticles (F—OH).

This suggests that the fluorine-amine surface-treated silica nanoparticles may be effective in the preparation of an anti-fingerprint film using the phase separation of a polyurethane film.

In addition, the section of a polyurethane-silica composite film prepared using the composition of composite 3 comprising the fluorine-amine surface-treated amphiphilic silica nanoparticles (F—$NH_2$) or the fluorine-hydroxy surface-treated amphiphilic silica nanoparticles (F—OH) was observed with a scanning electron microscope (SEM) in order to confirm phase separation of the polyurethane-silica composite film. The results are shown in FIGS. 22A-22F.

Figure 22A:
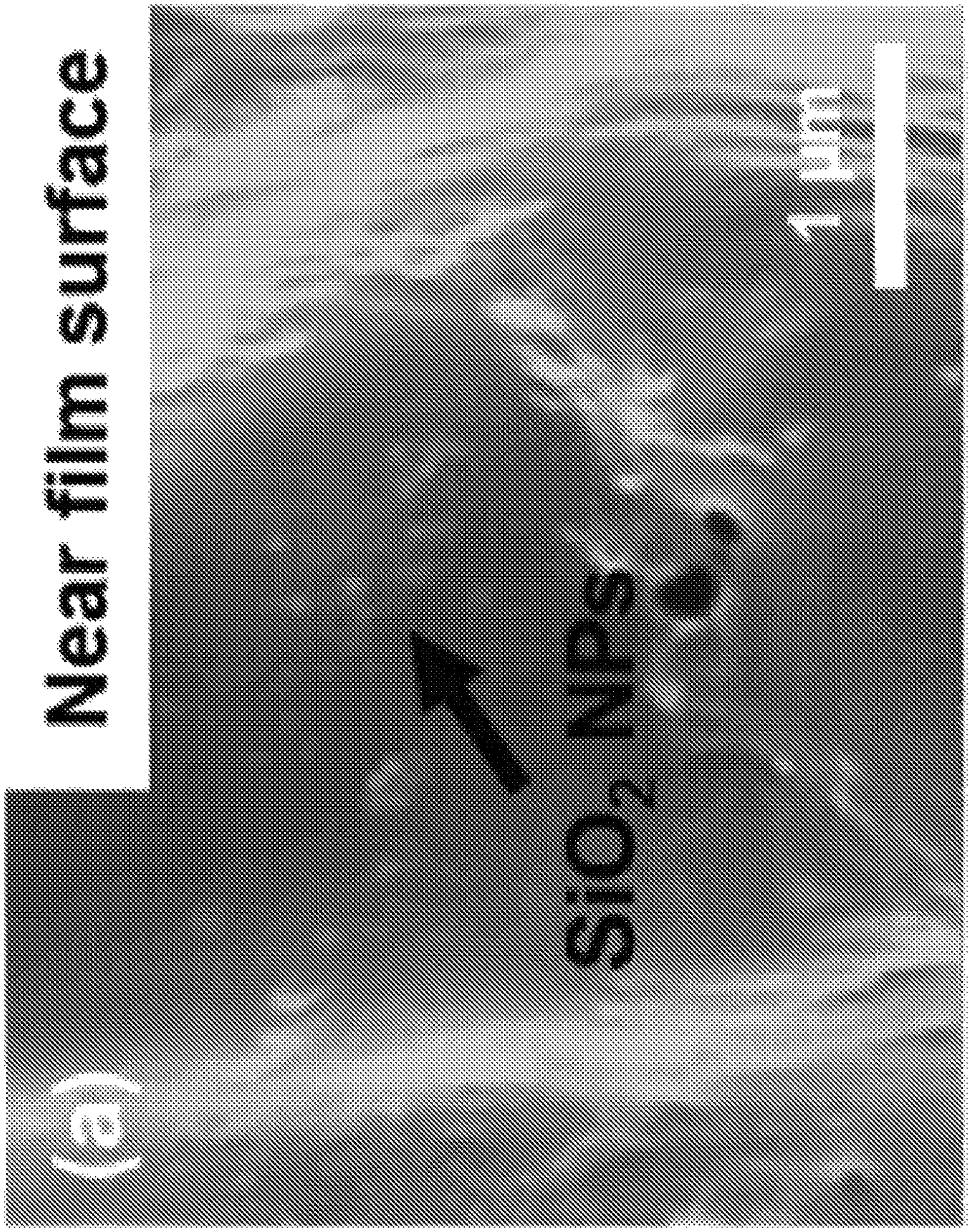
FIGS. 22A-22F show scanning electron microscope (SEM) photographs of the sections of exemplary polyurethane-silica composite films according to an exemplary embodiment of the present invention.
Figure 22A:
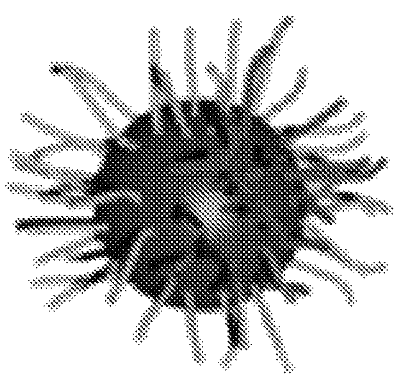
Figure 22B:
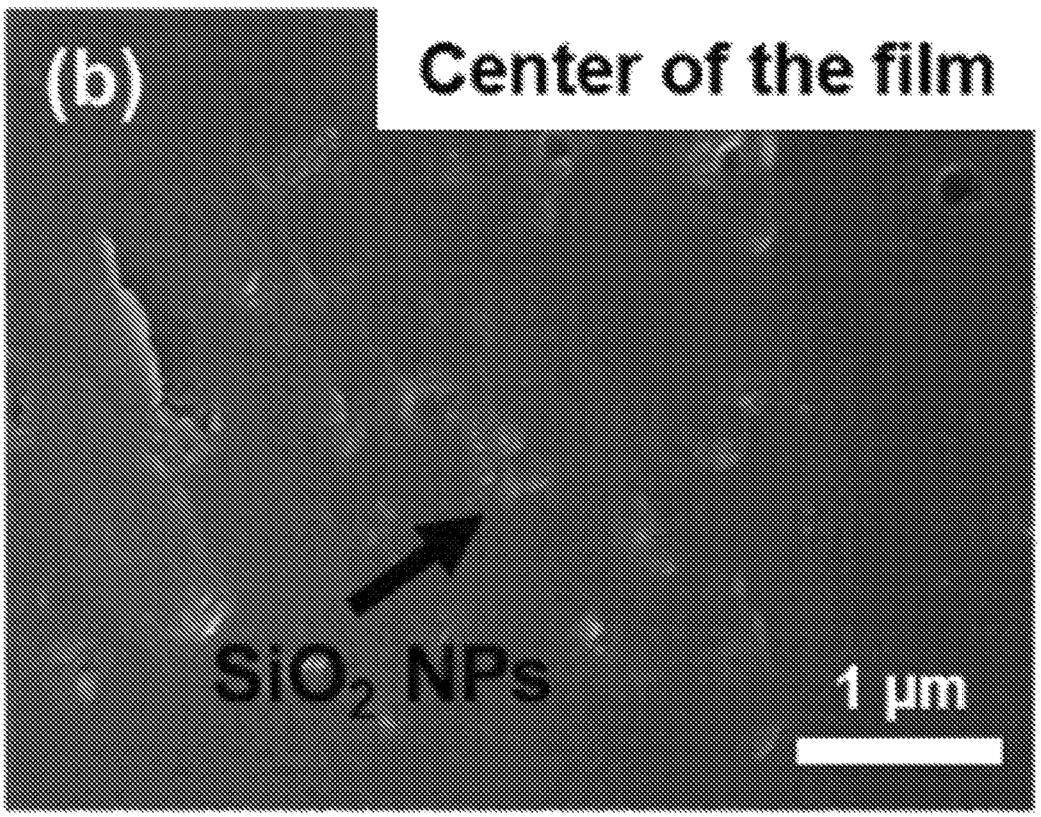
Figure 22C:
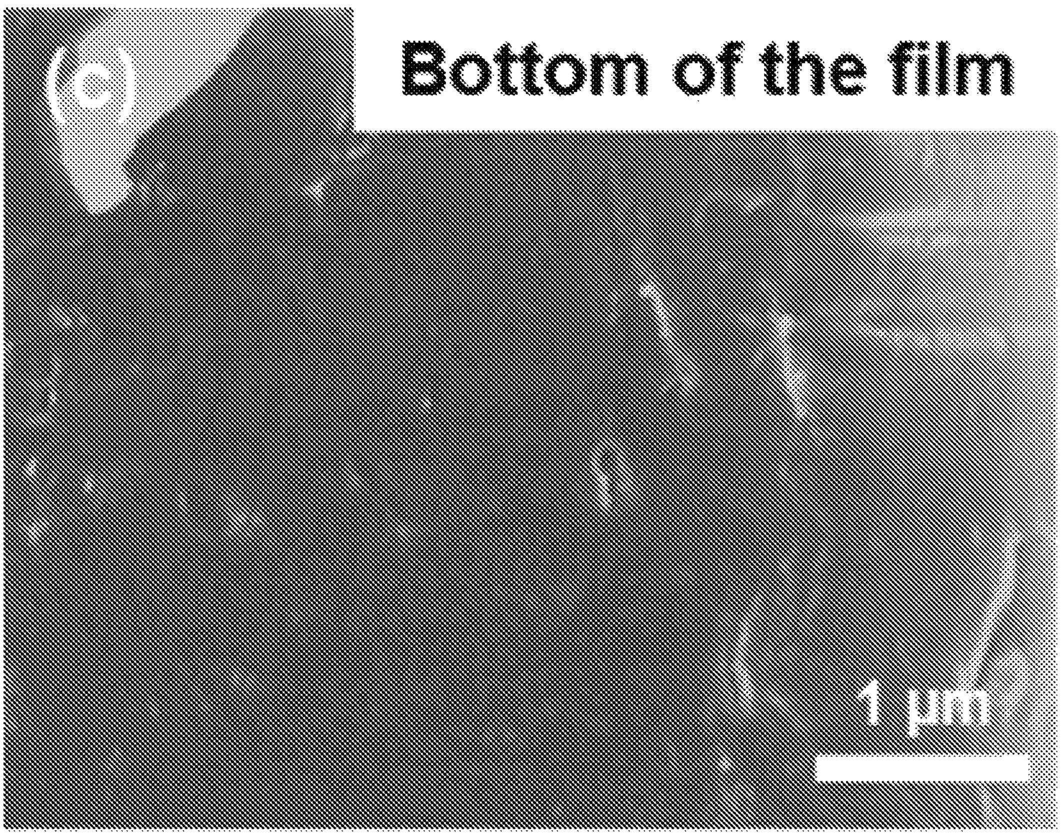
Figure 22D:
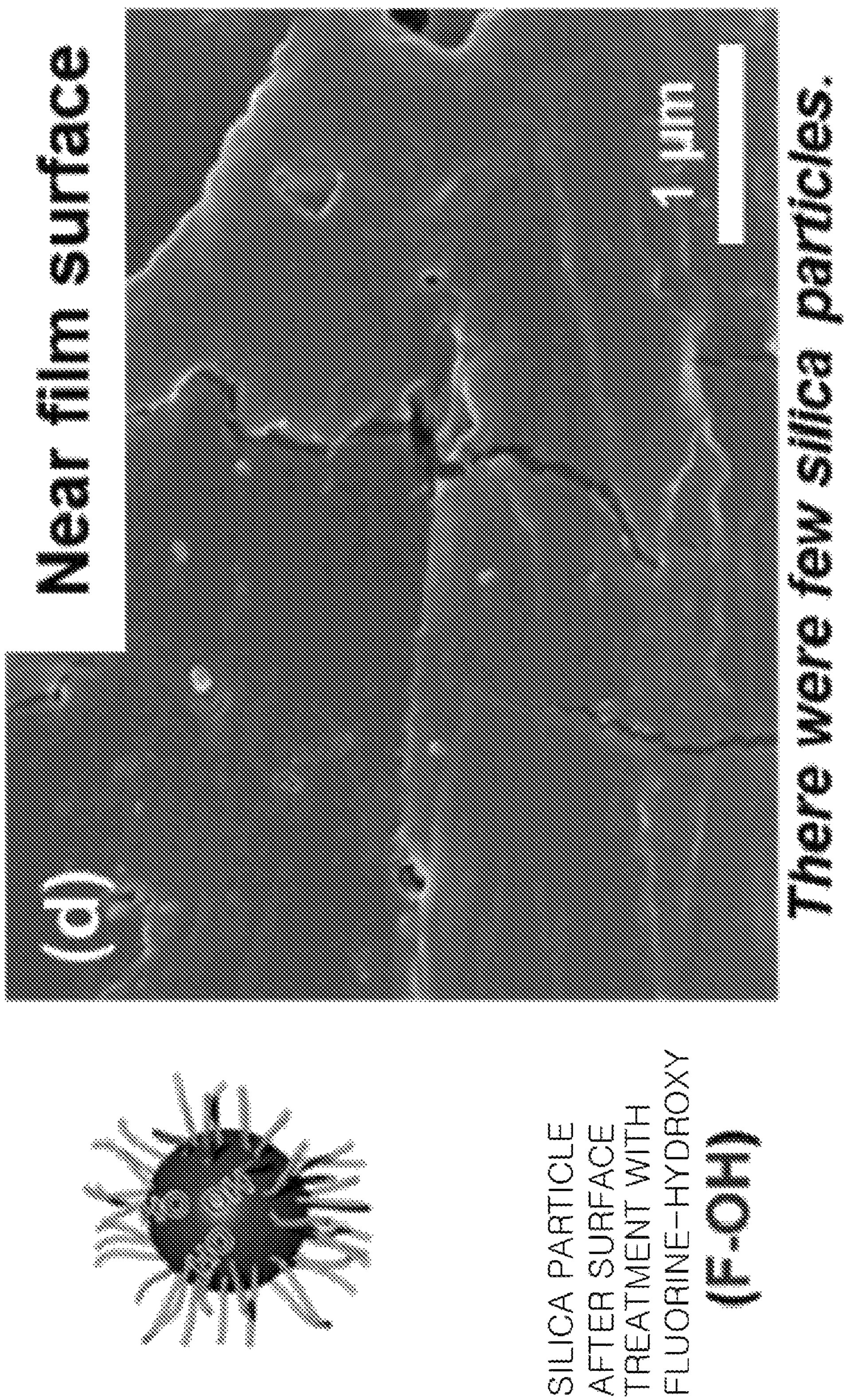
Figure 22E:
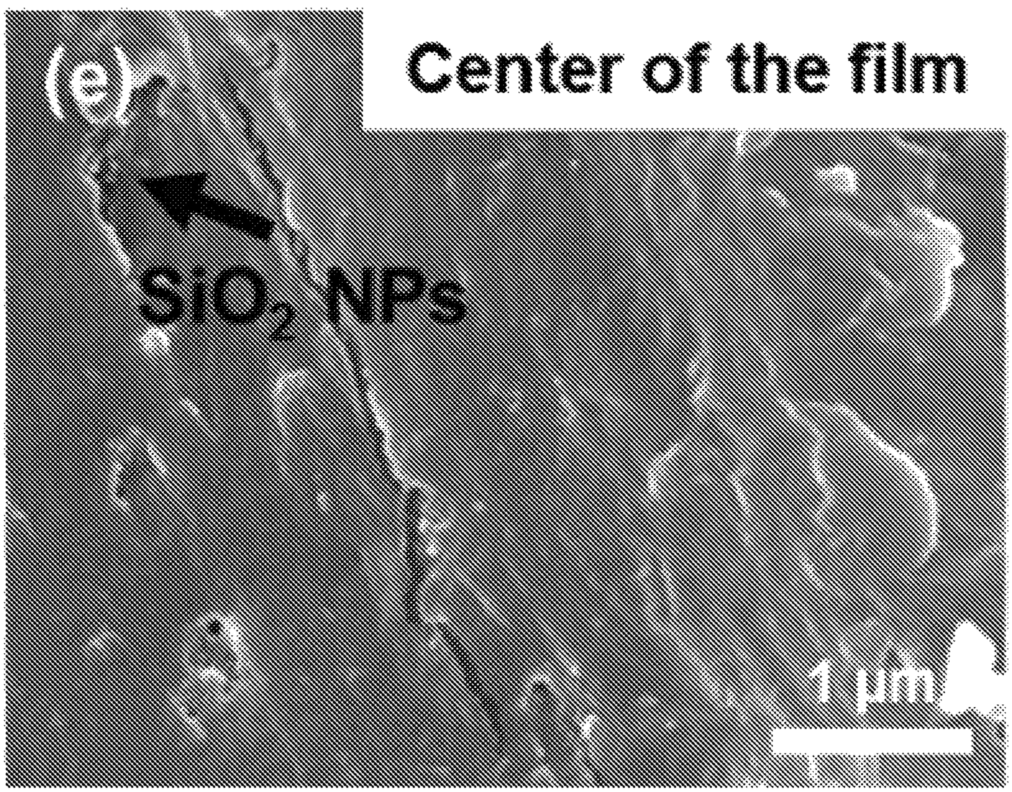
Figure 22F:
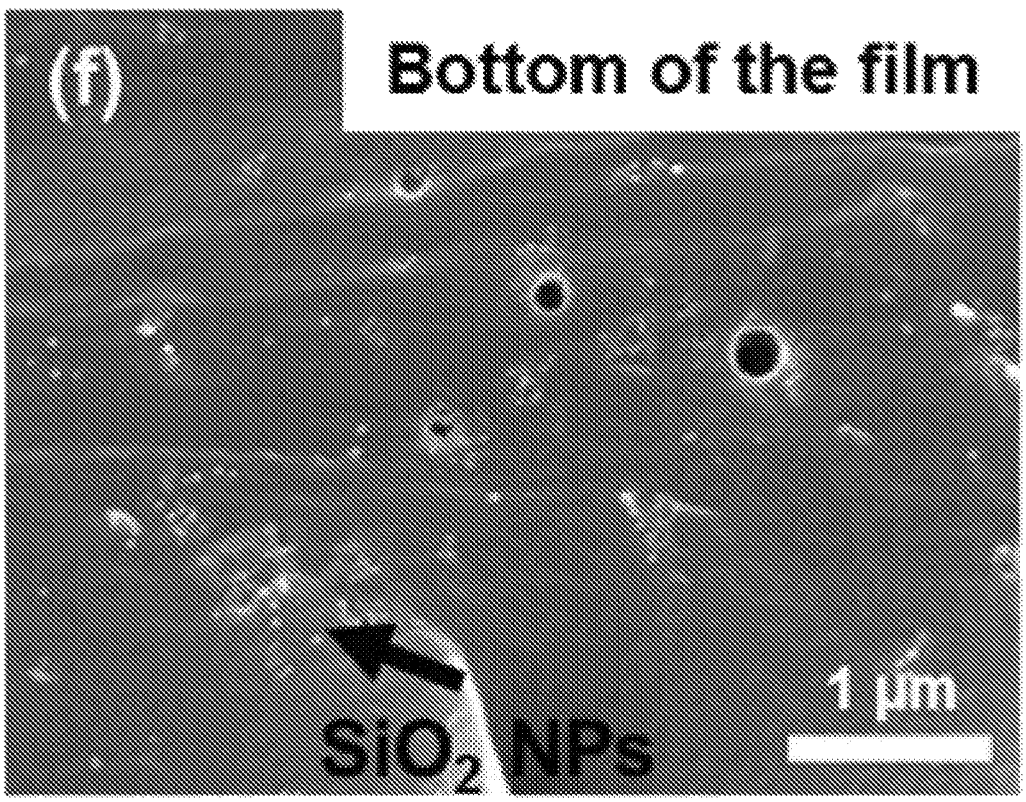
Figure 23A:
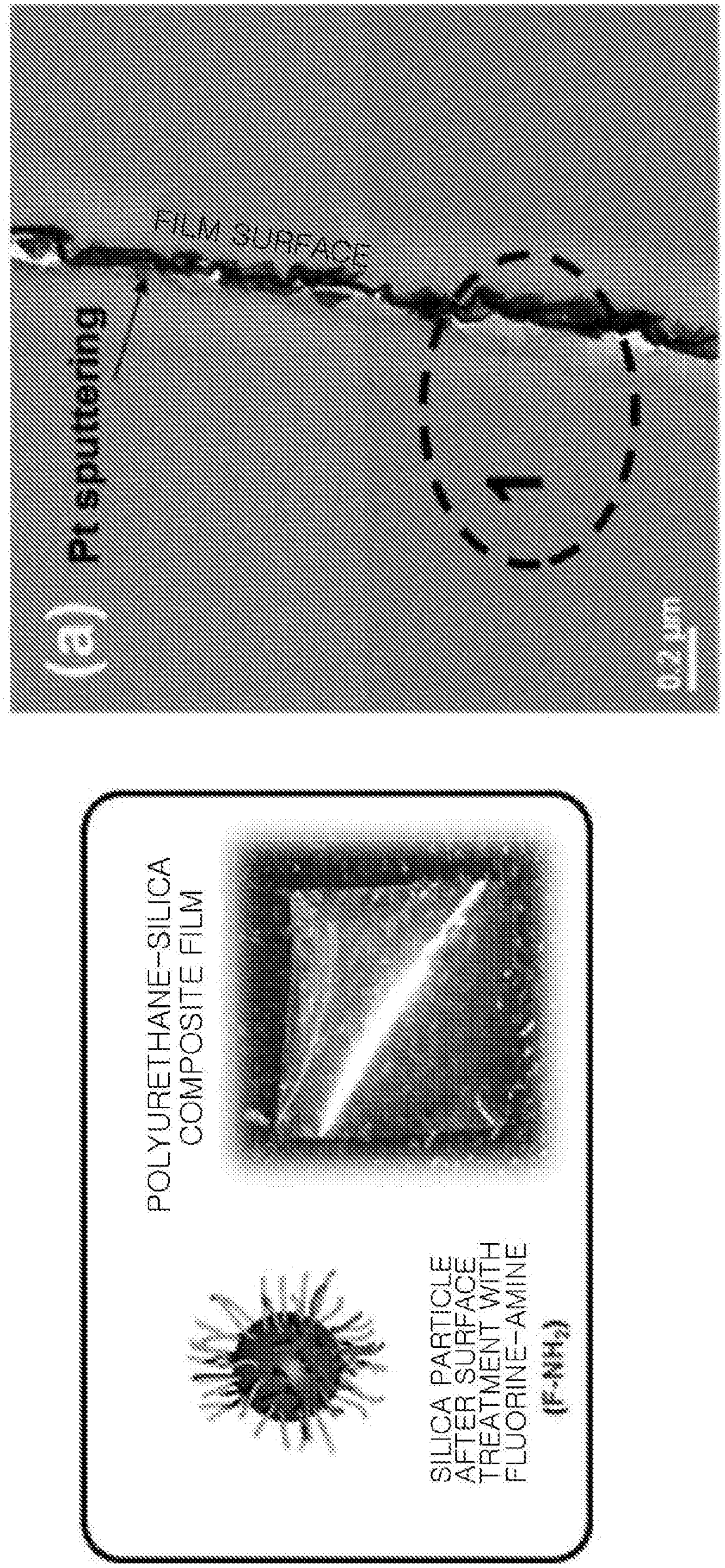
FIGS. 23A-23G show transmission electron microscopy (TEM) photographs of the sections of exemplary polyurethane-silica composite films according to an exemplary embodiment of the present invention.
Figure 23B:
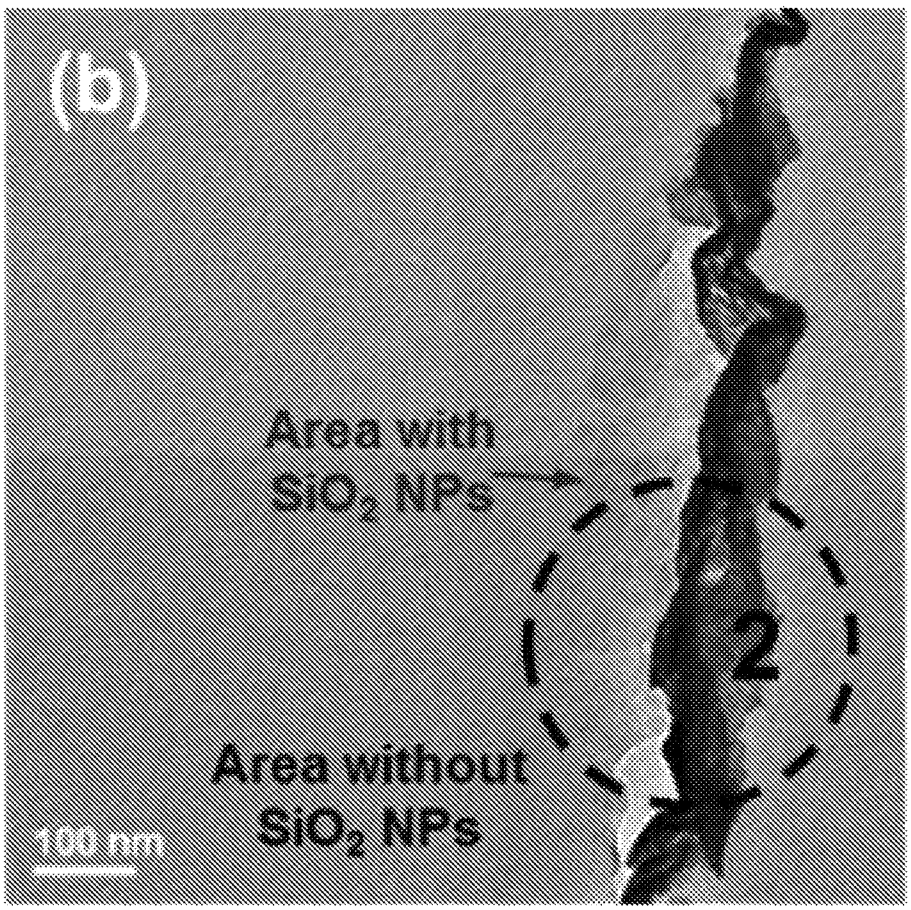
Figure 23C:
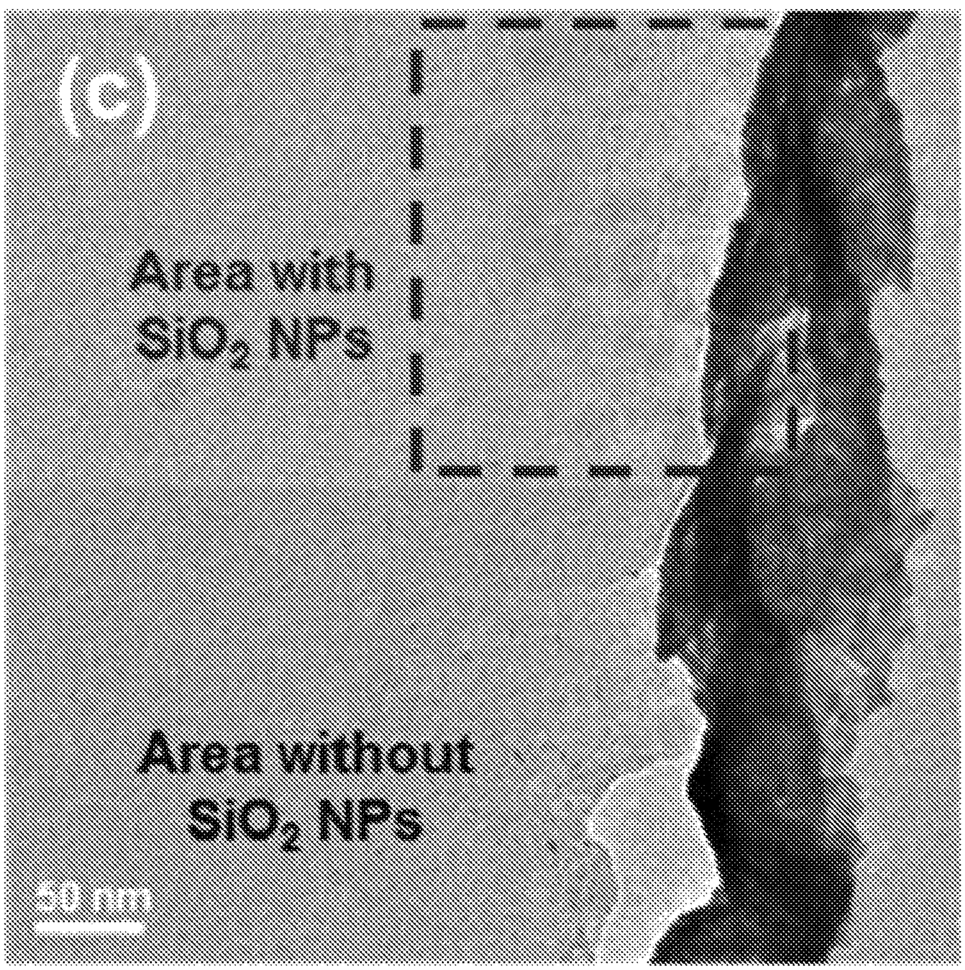
Figure 23D:
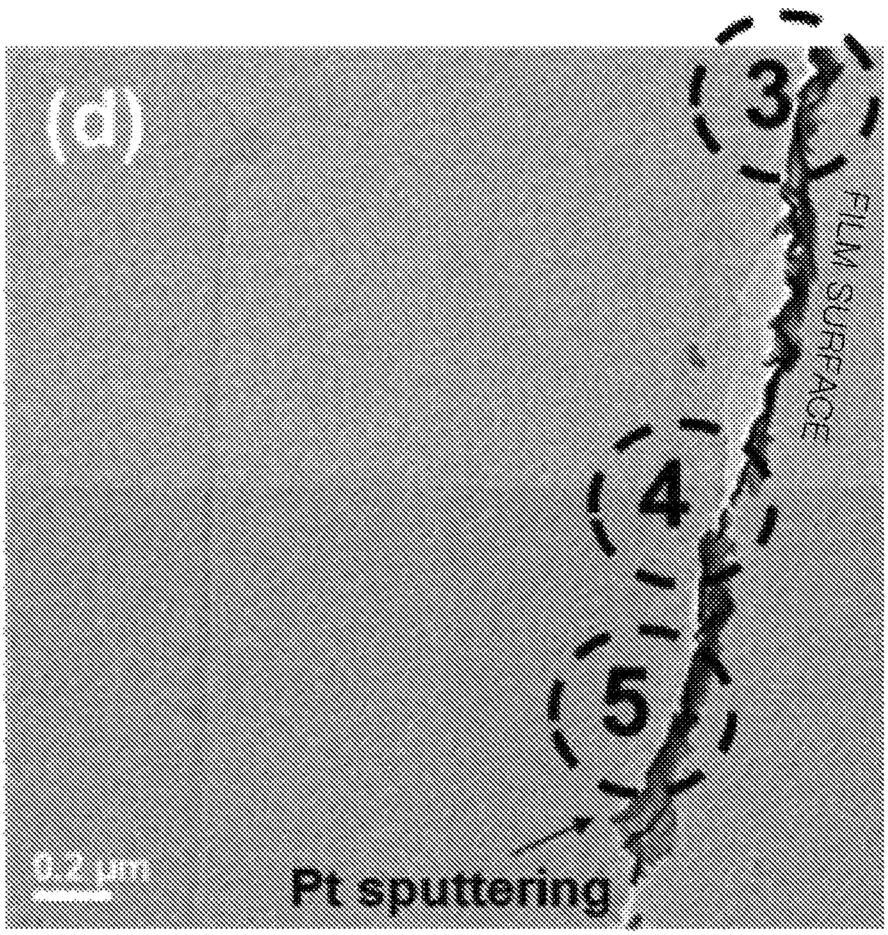
Figure 23E:
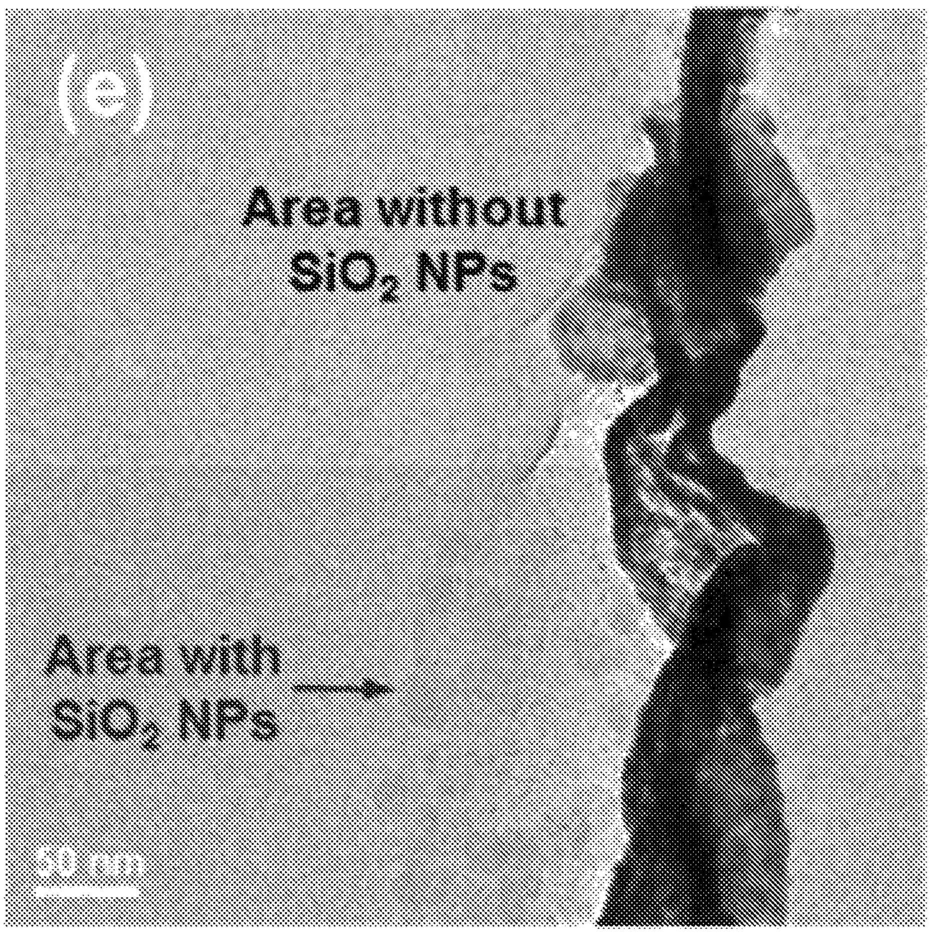
Figure 23F:
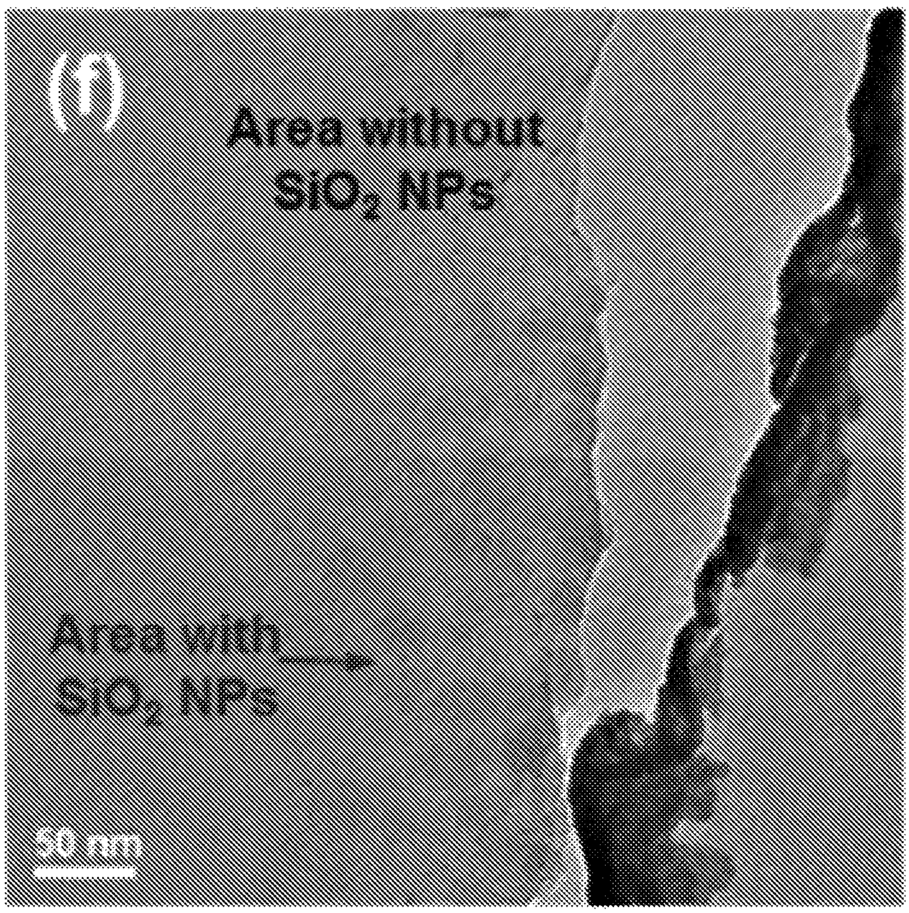
Figure 23G:
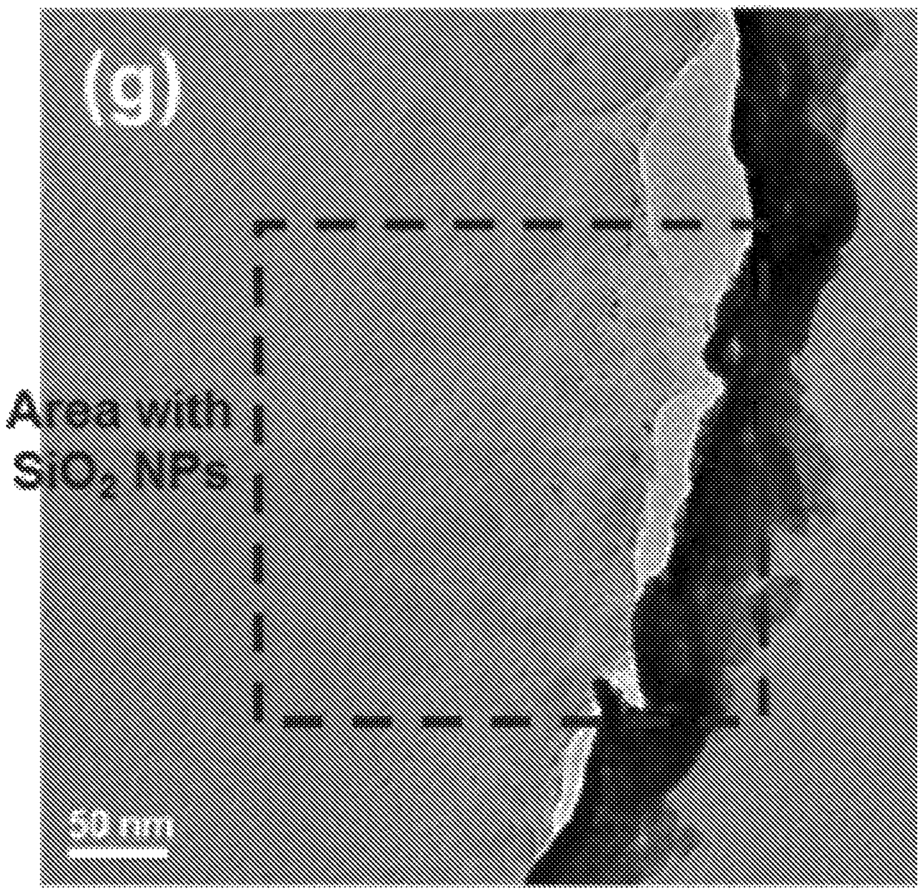
Figure 24A:
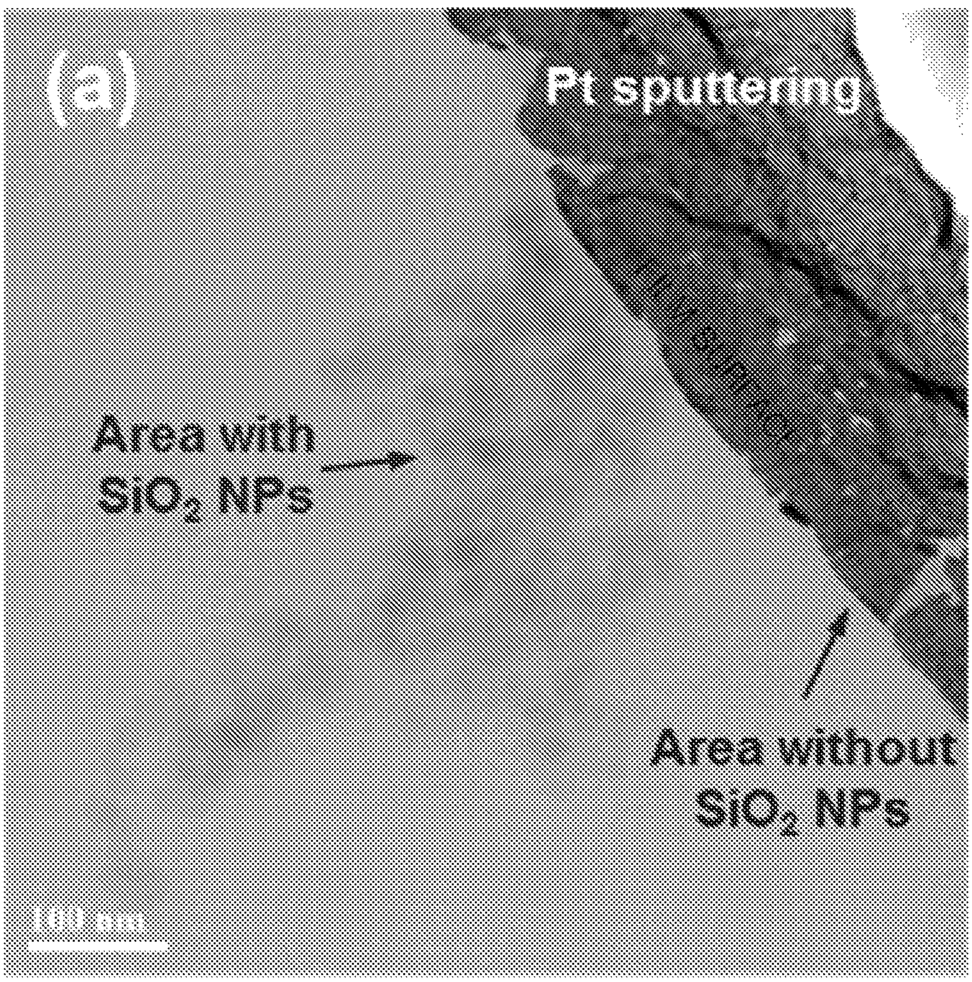
FIGS. 24A-24E show energy-dispersive X-ray spectroscopy (EDS) photographs of the sections of exemplary polyurethane-silica composite films according to an exemplary embodiment of the present invention.
Figure 24B:
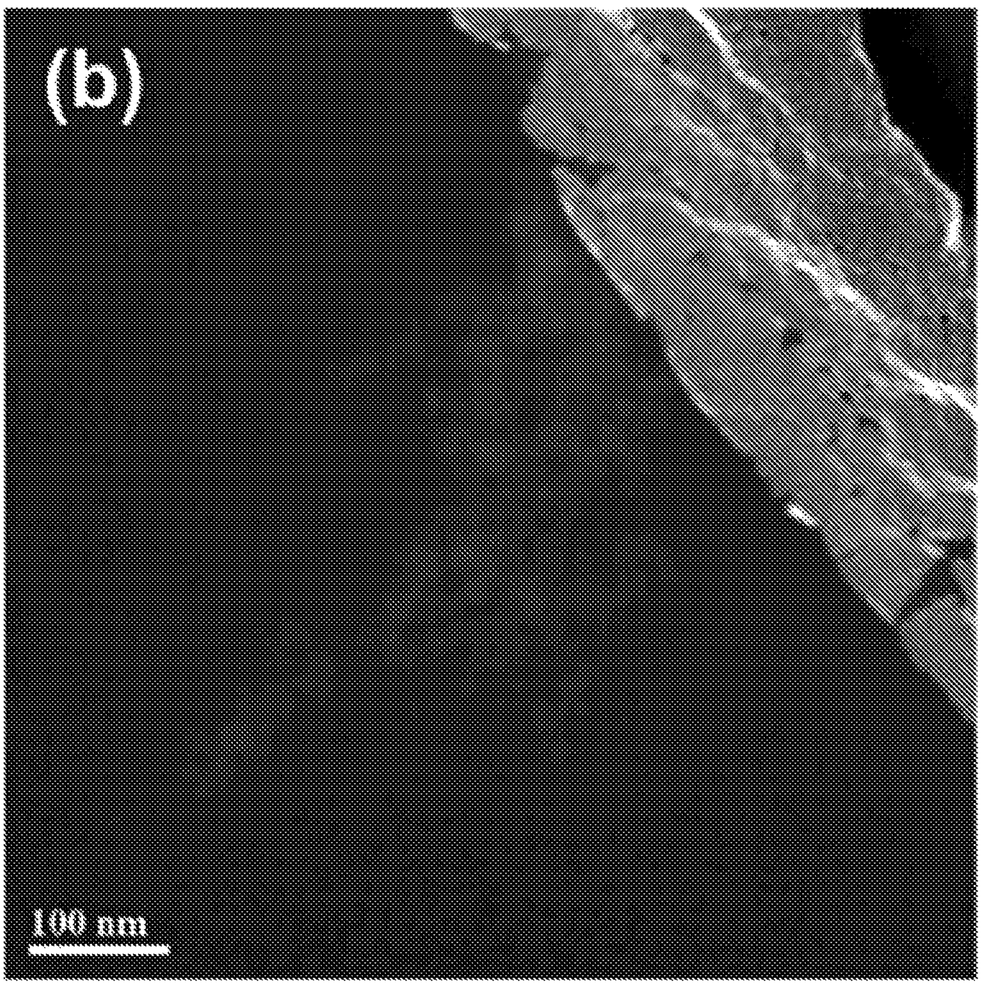
Figure 24C:
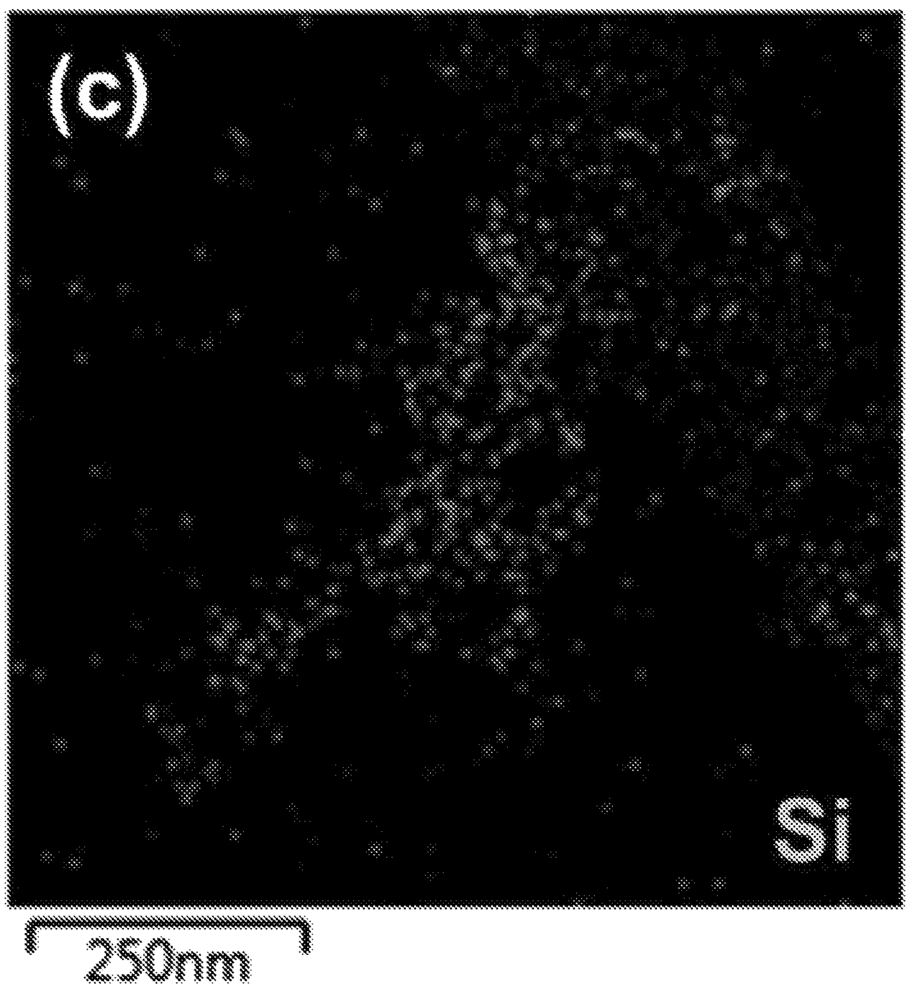
Figure 24D:
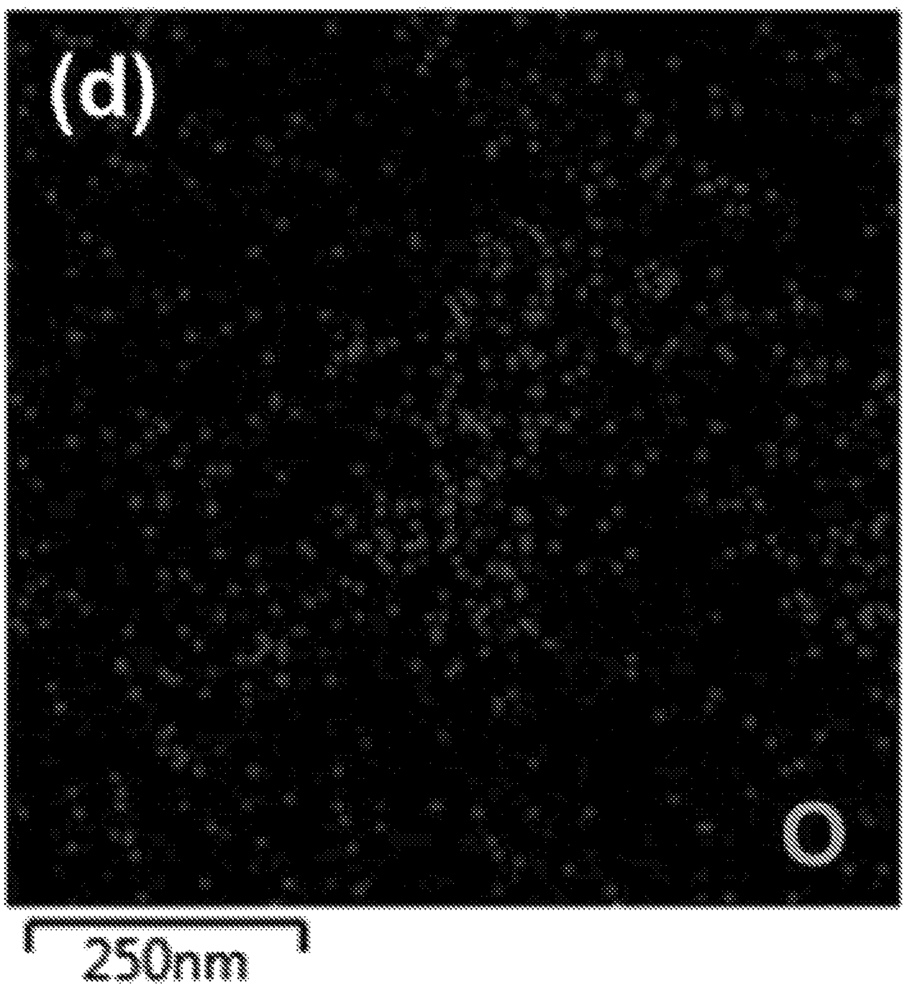
Figure 24E:
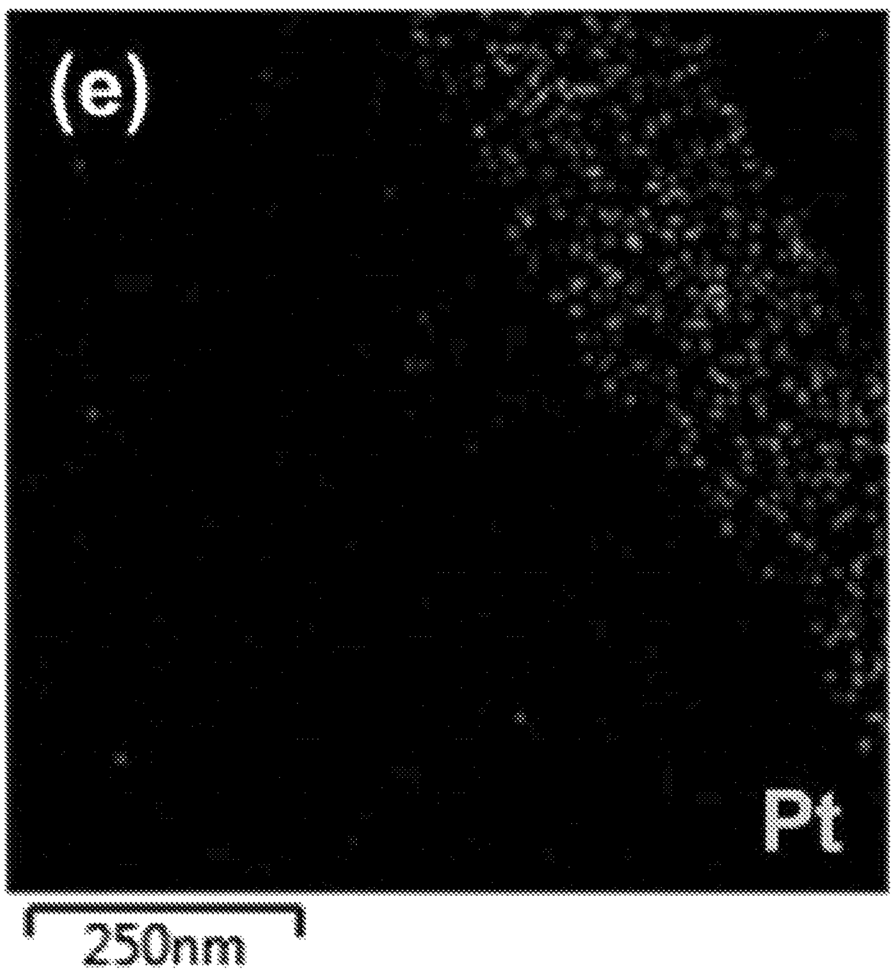

As a result, as shown in FIG. 22A, many silica nanoparticles were observed on the surface of the polyurethane-silica composite film formed using the fluorine-amine surface-treated amphiphilic silica nanoparticles (F—$NH_2$). However, as shown in FIG. 22F, in the case of the polyurethane-silica composite film comprising the fluorine-hydroxy surface-treated amphiphilic silica nanoparticles (F—OH), silica nanoparticles were observed at the bottom of the film, not on the film surface.

Additionally, in order to confirm whether the phase separation of the composite film would occur, the section of the composite film formed using the fluorine-amine surface-treated silica nanoparticles was observed by transmission electron microscopy (TEM). To this end, Pt sputtering was performed, and the film was microtomed to a thickness of about 50 nm, and the section was observed by transmission electron microscopy (TEM).

As a result, as shown in FIGS. 23A-23G, silica nanoparticles were found near the surface of the polyurethane-silica composite film. In addition, when observing the enlarged images of various areas (FIGS. 23B, 23C), 23E, 23F and 23G), there were areas with silica nanoparticles and areas without silica nanoparticles. These results are consistent with the atomic force microscopy (AFM) and scanning electron microscope (SEM) images showing that silica nanoparticles were observed partially on the film surface.

Accordingly, the phase separation of the surface-treated amphiphilic silica nanoparticles occurred in the process of preparing the polyurethane-silica composite film by curing the polyurethane-silica composite-based heat-curable coating composition of the present invention.

Furthermore, in order to observe element components in the transmission electron microscopy (TEM) image of the section of the polyurethane-silica composite film, energy-dispersive X-ray spectroscopy (EDS) was performed, and the results are shown in FIGS. 24A-24E.

As shown in FIGS. 24A-24E Si, O and Pt components could be detected, suggesting that silica nanoparticles were present on the film surface.

The polyurethane-silica composite-based heat-curable coating composition according to various exemplary embodiments of the present invention may have improved anti-fingerprint properties and the polyurethane-silica composite film may be obtained with improved anti-fingerprint properties. In addition, the composition and the film may undergo phase separation as a result of mixing the amphiphilic silica nanoparticles with polyurethane and thus provide improved contact angle properties by forming an uneven surface structure. In particular, among various types of amphiphilic silica nanoparticles, the fluorine-amine surface-treated silica nanoparticles may be suitable for inducing phase separation in the composite film.

As described above, for preparing the polyurethane-silica composite-based heat-curable coating composition of the present invention, amphiphilic silica nanoparticles may be prepared by selective surface treatment of silica-polystyrene particles which are composite particles of silica nanoparticles and polystyrene (PS) particles. In an exemplary embodiment, the prepared amphiphilic silica nanoparticles may be mixed with polyurethane, thereby preparing the polyurethane-silica composite-based heat-curable coating composition. As such, the stability of a coating layer formed of the composition and the phase separation of the silica nanoparticles may be optimized depending on the mixing ratio between the silica nanoparticles and the polyurethane and heat-curable conditions.

When the polyurethane-silica composite-based heat-curable coating composition having improved anti-fingerprint properties according to exemplary embodiments of the present invention is used, phase separation in a coating layer formed of the composition may occur, and thus two coating layers may be formed by only a single coating operation. In particular, since the layers formed by phase separation are substantially chemically bonded at their interface, delamination between the layers may be minimized. In addition, when the polyurethane-silica composite-based heat-curable coating composition according to the present invention is used, a polyurethane film having excellent anti-fingerprint and transparency properties may be prepared by a simpler method.

Furthermore, various embodiments of the present invention may provide an effect in that it uses polyurethane and silica nanoparticles, which may be widely used in various industrial fields and may be easily mass-produced at low costs.

Although the exemplary embodiments of the present invention has demonstrated its superiority through the above-described examples, the present invention is not necessarily limited only to this configuration, and various substitutions, modifications and alterations are possible without departing from the technical spirit of the present invention. Therefore, the foregoing description is not intended to limit the scope of the present invention as defined in the appended claims.

What is claimed:

1. A coating composition comprising:

polyurethane; and amphiphilic silica nanoparticles that are fluorine-amine surface-treated amphiphilic silica particles having (i) a fluorine functional group introduced in a first surface treatment and (ii) an amine functional group introduced in a second surface treatment, with a relatively large amount of fluorine functional group compared to amine functional group;

wherein the fluorine-amine surface-treated amphiphilic silica particles are mixed with polyurethane to form an uneven surface structure through phase separation, and wherein the coating composition comprises the amphiphilic silica nanoparticles in an amount of 0.3 wt % to 10.7 wt % based on the total weight of the coating composition.

2. The coating composition of claim 1, further comprising a curing agent.

3. The coating composition of claim 1, further comprising one or more additives selected from the group consisting of curing accelerators, surface conditioners, UV absorbers, adhesion promoters, and defoamers.

4. A polyurethane-silica composite film comprising:

a polyurethane film; and a silica layer formed on the polyurethane film, wherein the silica layer comprises amphiphilic silica nanoparticles that are fluorine-amine surface-treated amphiphilic silica particles having (i) a fluorine functional group introduced in a first surface treatment and (ii) an amine functional group introduced in a second surface treatment, and with a relatively large amount of fluorine functional group compared to amine functional group, wherein the fluorine-amine surface-treated amphiphilic silica particles are used to form an uneven surface structure on the film surface through phase separation in the polyurethane-silica composite film, and wherein the polyurethane-silica composite film comprises the amphiphilic silica nanoparticles in an amount of 0.3 wt % to 10.7 wt % based on the total weight of the polyurethane-silica composite film.

* * * * *